(12) United States Patent
Nakamura et al.

(10) Patent No.: US 9,390,466 B2
(45) Date of Patent: *Jul. 12, 2016

(54) IMAGE PROCESSING APPARATUS AND METHOD, IMAGE CAPTURING APPARATUS AND PROGRAM

(71) Applicant: Sony Corporation, Tokyo (JP)

(72) Inventors: Yusuke Nakamura, Chiba (JP); Shinichiro Gomi, Chiba (JP); Tomonori Masuno, Tokyo (JP); Masaru Suzuki, Tokyo (JP)

(73) Assignee: Sony Corporation, Tokyo (JP)

( * ) Notice: Subject to any disclaimer, the term of this patent is extended or adjusted under 35 U.S.C. 154(b) by 165 days.

This patent is subject to a terminal disclaimer.

(21) Appl. No.: 13/914,365

(22) Filed: Jun. 10, 2013

(65) Prior Publication Data

US 2013/0272611 A1  Oct. 17, 2013

Related U.S. Application Data

(66) Continuation of application No. 12/740,451, filed on Apr. 29, 2010, Substitute for application No. PCT/JP2009/065626, filed on Sep. 8, 2009, now Pat. No. 8,538,074.

(30) Foreign Application Priority Data

Sep. 8, 2008 (JP) ................................ 2008-229310

(51) Int. Cl.
  *G06T 3/00* (2006.01)
  *H04N 5/232* (2006.01)
  (Continued)

(52) U.S. Cl.
  CPC .............. *G06T 3/0056* (2013.01); *G06T 11/60* (2013.01); *H04N 1/3872* (2013.01); *H04N 5/232* (2013.01);
  (Continued)

(58) Field of Classification Search
  CPC ...... G06T 3/00; G06T 3/0056; G06T 2210/22; H04N 1/387; H04N 1/3872; H04N 1/3873
  USPC .......... 382/103, 173, 282, 283; 345/620, 625, 345/628
  See application file for complete search history.

(56) References Cited

U.S. PATENT DOCUMENTS

| 6,834,127 B1 | 12/2004 | Yamamoto ................... 382/282 |
| 8,538,074 B2 * | 9/2013 | Nakamura et al. ............ 382/103 |

(Continued)

FOREIGN PATENT DOCUMENTS

| JP | 2001-211315 A | 8/2001 | ............. H04N 1/387 |
| JP | 2004-274428 A | 9/2004 | ............... H04N 1/38 |

(Continued)

OTHER PUBLICATIONS

"Lead Room" /XP55020735, Retrieved from the Internet: URL:http:L//en.wikipedia.org/w/index.php? Title = Lead_Room &oldid=215208766 [retrieved on Mar. 1, 2012] p. 1.*

(Continued)

*Primary Examiner* — Andrew W Johns
(74) *Attorney, Agent, or Firm* — Chip Law Group

(57) ABSTRACT

The present invention relates to an image processing apparatus and method, an image capturing apparatus, and a program which make it possible to crop an image with an optimal composition even for a subject other than a person.

A composition pattern setting section 33 sets a composition pattern corresponding to an input image, on the basis of the number of salient regions to which attention is directed in the input image, and the scene of the input image. On the basis of the composition pattern set by the composition pattern setting section 33, a composition analyzing section 34 determines a crop region in the input image which is optimal for an image to be cropped in the composition pattern from the input image. The present invention is applicable to, for example, an image processing apparatus that adjusts the composition of a captured image.

23 Claims, 43 Drawing Sheets

(51) Int. Cl.
*G06T 11/60* (2006.01)
*H04N 1/387* (2006.01)
*H04N 5/262* (2006.01)
*H04N 101/00* (2006.01)

(52) U.S. Cl.
CPC ....... *H04N 5/23222* (2013.01); *H04N 5/23229* (2013.01); *H04N 5/23293* (2013.01); *H04N 5/2621* (2013.01); *G06T 2210/22* (2013.01); *H04N 2101/00* (2013.01)

(56) References Cited

U.S. PATENT DOCUMENTS

| | | | |
|---|---|---|---|
| 2002/0063725 A1 | 5/2002 | Tarbutton et al. | 345/629 |
| 2007/0076979 A1 | 4/2007 | Zhang et al. | 382/282 |
| 2008/0181512 A1 | 7/2008 | Gavin et al. | 382/209 |
| 2010/0329550 A1 | 12/2010 | Cheatle | 382/165 |

FOREIGN PATENT DOCUMENTS

| | | | | |
|---|---|---|---|---|
| JP | 2005-175684 A | 6/2005 | ............ | H04N 5/232 |
| JP | 2006-004287 A | 1/2006 | ............ | G06T 11/80 |
| JP | 2006-121298 A | 5/2006 | ............ | H04N 1/393 |
| JP | 2008-42800 A | 2/2008 | ............ | H04N 1/387 |
| JP | 2008-147997 A | 6/2008 | ............ | H04N 5/225 |
| WO | WO 2008-102897 A1 | 8/2008 | ............ | H04N 5/91 |

OTHER PUBLICATIONS

"Lead Room" /XP55020735, Retrieved from the Internet: URL: http:L//en.wikipedia.org/w/index.php? Title = Lead_Room& oldid=215208766 [retrieved on Mar. 1, 2012] p. 1.

English-language European Search Report in corresponding EP 09 81 1603, mailed Mar. 13, 2012.

* cited by examiner

FIG. 5

| NUMBER OF SALIENT REGIONS \ SCENE | COAST | RURAL LANDSCAPE | SKY | MOUNTAIN | EXPRESSWAY | STREET | CITY | HIGH-RISE BUILDING |
|---|---|---|---|---|---|---|---|---|
| 0 | HORIZONTAL COMPOSITION | RADIAL COMPOSITION | HORIZONTAL COMPOSITION | DIAGONAL COMPOSITION | RADIAL COMPOSITION | PERSPECTIVE COMPOSITION | VERTICAL COMPOSITION | VERTICAL COMPOSITION |
| 1 | THIRDS COMPOSITION HORIZONTAL COMPOSITION | THIRDS COMPOSITION RADIAL COMPOSITION | THIRDS COMPOSITION | THIRDS COMPOSITION DIAGONAL COMPOSITION | THIRDS COMPOSITION RADIAL COMPOSITION | THIRDS COMPOSITION PERSPECTIVE COMPOSITION | THIRDS COMPOSITION VERTICAL COMPOSITION | THIRDS COMPOSITION VERTICAL COMPOSITION |
| 2 TO 5 | CONTRASTING COMPOSITION HORIZONTAL COMPOSITION | CONTRASTING COMPOSITION RADIAL COMPOSITION | CONTRASTING COMPOSITION RADIAL COMPOSITION | CONTRASTING COMPOSITION DIAGONAL COMPOSITION | CONTRASTING COMPOSITION RADIAL COMPOSITION | CONTRASTING COMPOSITION PERSPECTIVE COMPOSITION | CONTRASTING COMPOSITION VERTICAL COMPOSITION | VERTICAL COMPOSITION RADIAL COMPOSITION |
| 6 OR MORE | CONTRASTING COMPOSITION HORIZONTAL COMPOSITION | RADIAL COMPOSITION PATTERN COMPOSITION | RADIAL COMPOSITION | CONTRASTING COMPOSITION DIAGONAL COMPOSITION | RADIAL COMPOSITION | PERSPECTIVE COMPOSITION | CONTRASTING COMPOSITION VERTICAL COMPOSITION | RADIAL COMPOSITION |

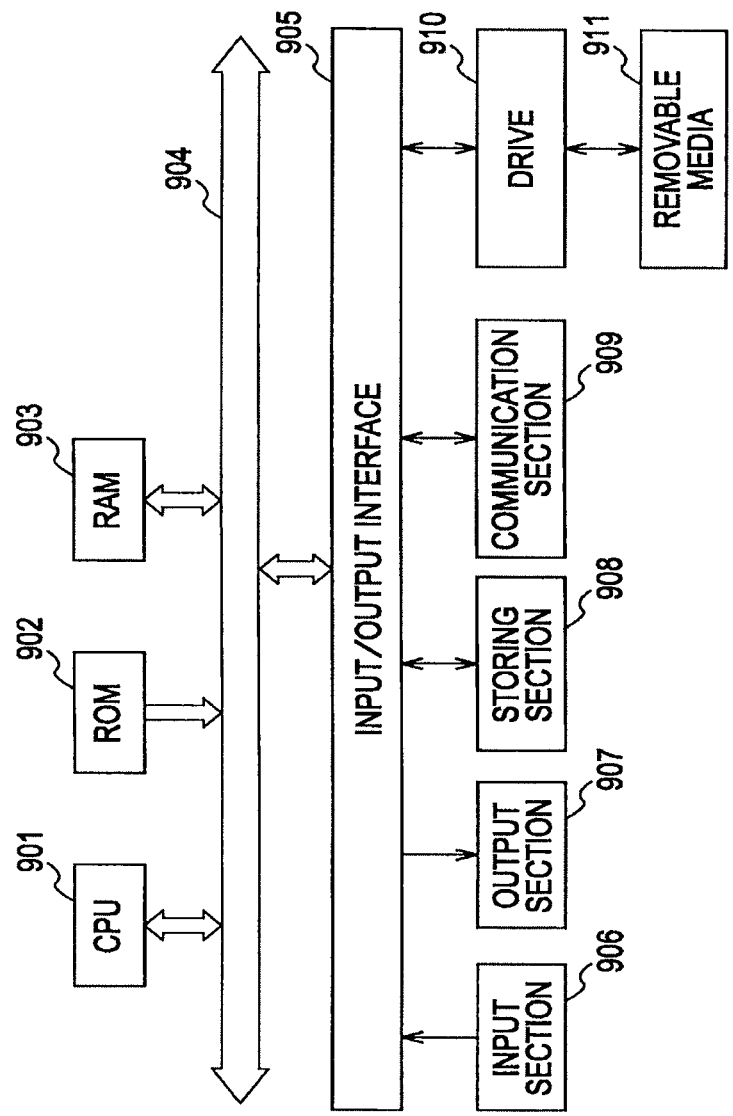

IMAGE PROCESSING APPARATUS AND METHOD, IMAGE CAPTURING APPARATUS AND PROGRAM

This application is a continuation of U.S. application Ser. No. 12/740,451, filed Apr. 29, 2010 and entitled "Image Processing and Method, Image Capturing Apparatus, and Program."

TECHNICAL FIELD

The present invention relates to an image processing apparatus and method, an image capturing apparatus, and a program, in particular, an image processing apparatus and method, an image capturing apparatus, and a program which make it possible to crop an image with an optimal composition even for a subject other than a person.

BACKGROUND ART

When shooting a subject with an image capturing apparatus such as a digital camera, shooting is done so as to achieve a favorable composition. Since setting the composition appropriately when shooting requires skill, an image acquired by shooting may not always have a desired composition. In such a case, a technique exists which performs trimming on the image to achieve a desired composition.

For example, it has been proposed to perform trimming without causing loss of the human body or important background (see, for example, Patent Document 1).

Patent Document 1: Japanese Unexamined Patent Application Publication No. 2008-42800

DISCLOSURE OF INVENTION

Technical Problem

However, the technique according to Patent Document 1 is based on the assumption that a person is included in the subject, and there is a fear that optimal trimming may not be possible for images including a subject other than a person.

The present invention has been made in view of the above circumstances, and makes it possible to crop an image with an optimal composition even for a subject other than a person.

Technical Solution

An image processing apparatus according to a first aspect of the present invention includes setting means for setting a composition pattern corresponding to an input image, on the basis of the number of salient regions to which attention is directed in the input image, and a scene of the input image, and determining means for determining a crop region in the input image which is optimal for an image to be cropped in the composition pattern from the input image, on the basis of the composition pattern set by the setting means.

The image processing apparatus may further include cropping means for cropping the crop region determined by the determining means, from the input image.

The determining means may determine a plurality of candidates of a crop region in the input image which is optimal for an image to be cropped in the composition pattern from the input image, on the basis of the composition pattern set by the setting means, the image processing apparatus may further include display means for displaying the plurality of candidates of the crop region, on the input image, and selecting means for selecting one of the plurality of candidates of the crop region displayed by the display means, and the cropping means may crop the crop region selected by the selecting means, from the input image.

The image processing apparatus may further include extracting means for extracting each of the salient regions to which attention is directed in the input image, and discriminating means for discriminating the scene of the input image.

The determining means may determine the crop region so that a center position of the smallest rectangular region including all of the salient regions to which attention is directed in the input image approaches a center of the crop region in the input image.

The determining means may determine the crop region so that the crop region becomes larger, and that a common region between the smallest rectangular region including all of the salient regions to which attention is directed in the input image, and the crop region becomes larger.

The determining means may determine the crop region so that the crop region does not lie off the input image.

The image processing apparatus may further include judging means for judging whether or not the input image is a panoramic image, by comparing an aspect ratio of the input image with a predetermined threshold, and the determining means may determine a plurality of candidates of a crop region in the input image which is optimal for an image to be cropped in the composition pattern from the input image, on the basis of the composition pattern set by the setting means, if it is judged by the judging means that the input image is a panoramic image.

The image processing apparatus may further include adding means for adding information indicating the crop region determined by the determining means, to the input image as EXIF information.

A subject to which attention is directed in the input image may be included in each of the salient regions, the image processing apparatus may further include detecting means for detecting an orientation of the subject, and the determining means may determine a crop region in the input image which is optimal for an image to be cropped in the composition pattern from the input image, on the basis of the composition pattern set by the setting means, and the orientation of the subject detected by the detecting means.

A subject to which attention is directed in the input image may be included in each of the salient regions, the image processing apparatus may further include motion direction determining means for determining a direction of motion of the subject, and the determining means may determine a crop region in the input image which is optimal for an image to be cropped in the composition pattern from the input image, on the basis of the composition pattern set by the setting means, and the direction of motion of the subject determined by the motion direction determining means.

The image processing apparatus may further include overall motion calculating means for finding overall motion of the input image, and local motion calculating means for finding motion of each of the salient regions, and the motion direction determining means may determine a direction of motion of the subject on the basis of an orientation of the overall motion of the input image found by the overall motion calculating means, and an orientation of the motion of each of the salient regions found by the local motion calculating means.

An image processing method according to a first aspect of the present invention includes a setting step of setting a composition pattern corresponding to the input image, on the basis of the number of salient regions to which attention is directed in the input image, and a scene of the input image, and a determining step of determining a crop region in the input image which is optimal for an image to be cropped in the composition pattern from the input image, on the basis of the composition pattern set in the setting step.

A program according to a first aspect of the present invention causes a computer to execute processing including a setting step of setting a composition pattern corresponding to the input image, on the basis of the number of salient regions to which attention is directed in the input image, and a scene of the input image, and a determining step of determining a crop region in the input image which is optimal for an image to be cropped in the composition pattern from the input image, on the basis of the composition pattern set in the setting step.

An image capturing apparatus according to a second aspect of the present invention includes image capturing means for capturing a subject, acquiring means for acquiring a scene of a captured image captured by the image capturing means, setting means for setting a composition pattern corresponding to the captured image, on the basis of the number of salient regions including subjects to which attention is directed in the captured image, and the scene acquired by the acquiring means, and determining means for determining a crop region in the captured image which is optimal for an image to be cropped in the composition pattern from the captured image, on the basis of the composition pattern set by the setting means.

In the first aspect of the present invention, a composition pattern corresponding to an input image is set on the basis of the number of salient regions to which attention is directed in the input image, and the scene of the input image, and a crop region in the input image which is optimal for an image to cropped in the composition pattern from the input image is determined on the basis of the set composition pattern.

In the second aspect of the present invention, a subject is captured, the scene of a captured image that has been captured is acquired, a composition pattern corresponding to the captured image is set on the basis of the number of salient regions including subjects to which attention is directed in the captured image, and the acquired scene, and a crop region in the captured image which is optimal for an image to cropped in the composition pattern from the captured image is determined on the basis of the set composition pattern.

Advantageous Effects

According to the first and second aspects of the present invention, it is possible to crop an image with an optimal composition even for a subject other than a person.

BRIEF DESCRIPTION OF DRAWINGS

FIG. 5 is a diagram illustrating composition patterns that are set on the basis of the numbers of salient regions and scenes.

FIG. 46 is a block diagram showing a hardware configuration example of a computer.

BEST MODES FOR CARRYING OUT THE INVENTION

Hereinbelow, embodiments of the present invention will be described with reference to the drawings. It should be noted that the description will be given in the following order.
1. First Embodiment
2. Second Embodiment
3. Third Embodiment
4. Fourth Embodiment
5. Fifth Embodiment
6. Sixth Embodiment
7. Seventh Embodiment
8. Eighth Embodiment
9. Ninth Embodiment
10. Tenth Embodiment First Embodiment

[Configuration Example of Image Processing Apparatus]

Figure 1:
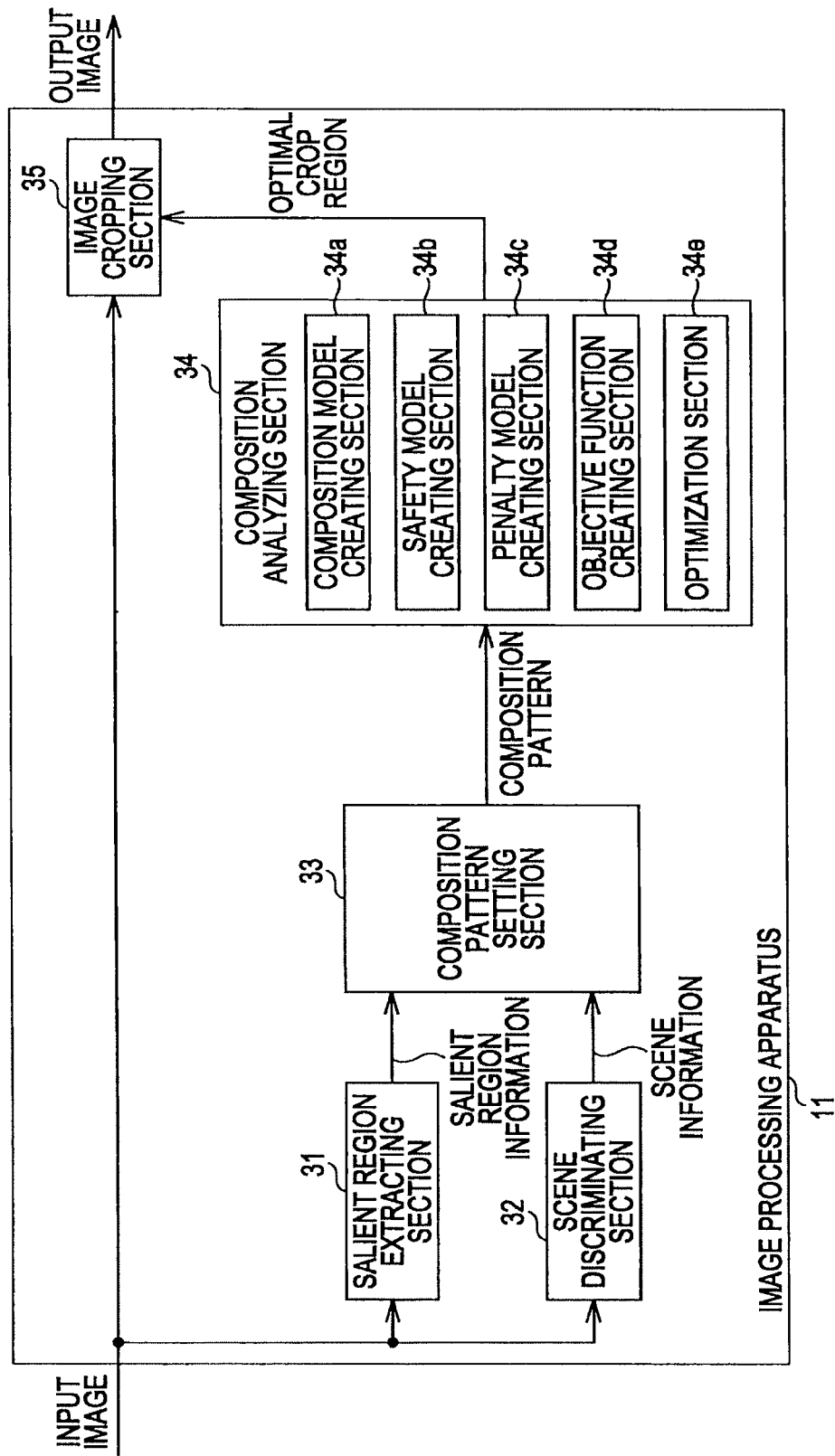
FIG. 1 is a block diagram showing a functional configuration example of an embodiment of an image processing apparatus to which the present invention is applied.

FIG. 1 shows a functional configuration example of an embodiment of an image processing apparatus to which the present invention is applied.

An image processing apparatus 11 in FIG. 1 sets a composition pattern according to a salient region and scene of an input image inputted from an image capturing apparatus such as a digital camera, and outputs an image cropped in an optimal crop region, as an output image on the basis of the composition pattern.

The image processing apparatus 11 includes a salient region extracting section 31, a scene discriminating section 32, a composition pattern setting section 33, a composition analyzing section 34, and an image cropping section 35.

An input image inputted to the image processing apparatus 11 is supplied to the salient region extracting section 31, the scene discriminating section 32, and the image cropping section 35.

The salient region extracting section 31 extracts a salient region to which attention is directed in an input image, and supplies salient region information indicating the salient region to the composition pattern setting section 33. A salient region is a rectangular region including (surrounding) a subject (object) in the input image. Salient regions are set and extracted for the number of subjects in an input image. Also, salient region information is, for example, the positions of the vertices of a rectangular region, or the like.

Figure 2:
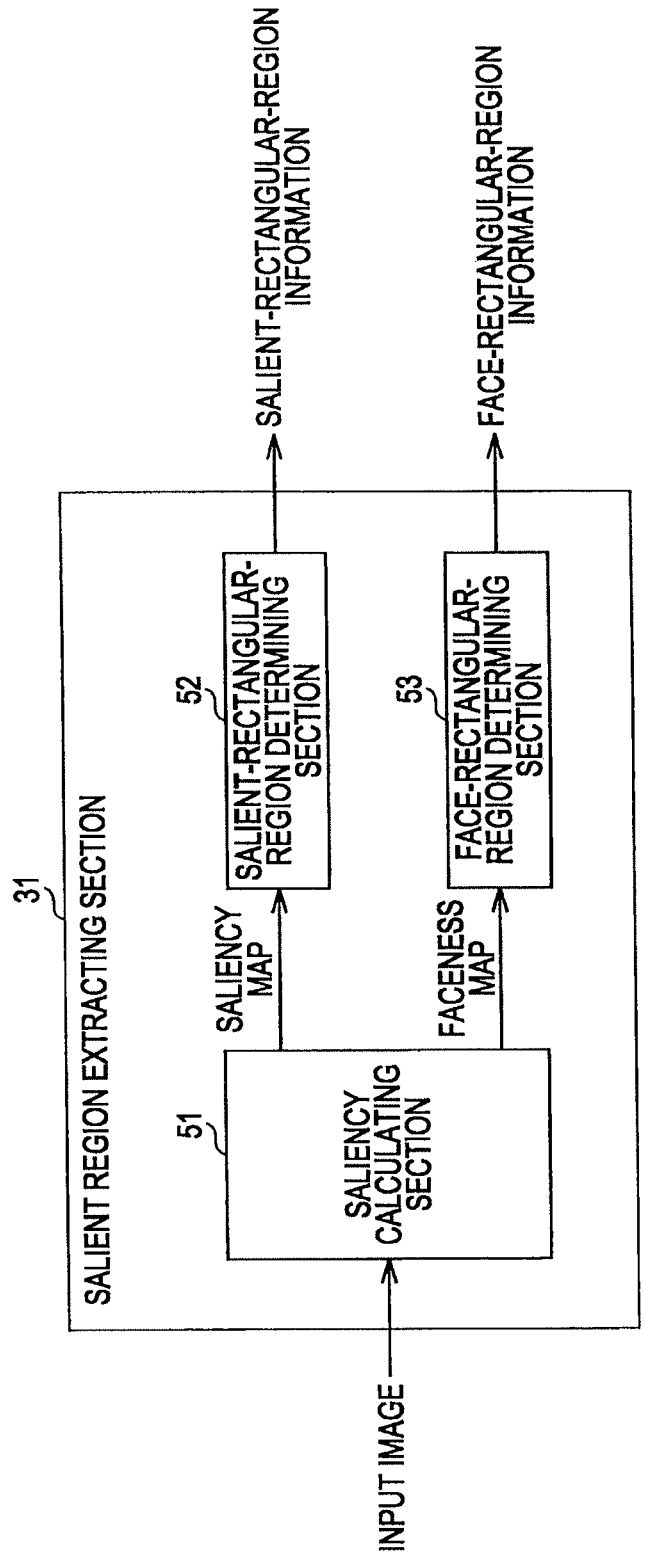
FIG. 2 is a block diagram showing a functional configuration example of a salient region extracting section.

FIG. 2 shows a functional configuration example of the salient region extracting section 31.

The salient region extracting section 31 includes a saliency calculating section 51, a salient-rectangular-region determining section 52, and a face-rectangular-region determining section 53.

The saliency calculating section 51 finds a feature quantity with respect to each pixel of an input image, and calculates a saliency at every pixel from the feature quantity. Here, a feature quantity is the size of the edge component of an image, a difference in hue from neighboring pixels, a color distribution in a predetermined region of the image, a difference between the average color of the overall image and the hue of each pixel, or the like. Further, the saliency calculating section 51 generates a saliency map corresponding to a single input image from the saliency (feature quantity) at every pixel, and supplies the saliency map to the salient-rectangular-region determining section 52. The saliency map generated by the saliency calculating section 51 is, so to speak, information indicating regions including subjects to which attention is directed in a single input image.

In addition, the saliency calculating section 51 calculates a faceness (face likelihood) from the feature quantity found with respect to each pixel of a single input image, generating a faceness map corresponding to a single input image, and supplies the faceness map to the face-rectangular-region determining section 53. The faceness map generated by the saliency calculating section 51 is, so to speak, information indicating regions including faces to which attention is directed in a single input image.

The salient-rectangular-region determining section 52 determines a salient rectangular region on the basis of the saliency map from the saliency calculating section 51, and supplies salient-rectangular-region information indicating the salient rectangular region to the composition pattern setting section 33. More specifically, in the saliency map, the salient-rectangular-region determining section 52 sets pixels (positions) with saliencies higher than a predetermined threshold as the center of a rectangle, and pixels (positions) in their neighborhood with saliencies lower than another threshold as the endpoints (vertices) of the rectangle, thereby determining a salient rectangular region.

Also, if a plurality of salient rectangular regions are determined, when the distance between the centers of the rectangles is smaller than a predetermined distance, the smallest rectangular region including those altogether is set as the salient rectangular region.

The face-rectangular-region determining section 53 determines a face rectangular region on the basis of the faceness map from the saliency calculating section 51, and supplies face-rectangular-region information indicating the face rectangular region to the composition pattern setting section 33. More specifically, in the faceness map, the face-rectangular-region determining section 53 sets pixels (positions) of the nose of a face as the center of a rectangle, and pixels (positions) in their neighborhood where an abrupt change (drop) in faceness occurs as the endpoints (vertices) of the rectangle, thereby determining a face rectangular region.

It should be noted that the salient rectangular region obtained by the salient-rectangular-region determining section 52, and the face rectangular region obtained by the face-rectangular-region determining section 53 are collectively referred to as salient region information.

Returning to FIG. 1, the scene discriminating section 32 performs frequency conversion on the input image to extract frequency information, discriminates the scene of the input image with the frequency information as a feature quantity (vector), and supplies scene information indicating a scene, which is obtained as a result of the discrimination, to the composition pattern setting section 33. More specifically, the scene discriminating section 32 performs scene discrimination by using a preset image for learning and, for example, machine learning such as SVM (Support Vector Machines).

Two-class discrimination (one-to-one discrimination) is performed in SVM. For example, classes are judged to be the class "Coast" and the class of the others, the class "Rural Landscape" and the class of the others, the class "Sky" and the class of the others, the class "Mountain" and the class of the others, and so on, and their respective scores are compared, with the class having the highest score being the result of discrimination.

It should be noted that while the scene discriminating section 32 employs SVM, this is not restrictive. For example, pattern recognition using a neutral network, or pattern recognition based on pattern matching or the like may be employed.

The composition pattern setting section 33 sets a composition pattern corresponding to the input image on the basis of the number of pieces of salient region information from the salient region extracting section 31, and the scene information from the scene discriminating section 32, and supplies the composition pattern to the composition analyzing section 34. The composition pattern is previously determined in association with the number of salient regions (subjects), and the scene. Details about the composition pattern will be described later with reference to FIG. 5.

On the basis of the composition pattern from the composition pattern setting section 33, the composition analyzing section 34 determines a crop region in the input image which is optimal for an image to be cropped in the composition pattern, and supplies the optimal crop region to the image cropping section 35.

The composition analyzing section 34 includes a composition model creating section 34a, a safety model creating section 34b, a penalty model creating section 34c, an objective function creating section 34d, and an optimization section 34e.

The composition model creating section 34a creates a composition model representing a crop region based on the composition pattern from the composition pattern setting section 33. The composition model is represented by a predetermined energy function $E_c$.

The safety model creating section 34b creates a safety model for preventing the crop region from becoming too small. The safety model is represented by a predetermined energy function $E_s$.

The penalty model creating section 34c creates a penalty model for evaluating the area of a region of the crop region which lies off the input image. The penalty model is represented by a predetermined energy function $E_p$.

The objective function creating section 34d creates an objective function E from the energy function $E_c$ representing a composition model, the energy function $E_s$ representing a safety model, and the energy function $E_p$ representing a penalty model.

The optimization section 34e determines a crop region that minimizes the objective function E, and supplies the crop region as an optimal crop region to the image cropping section 35.

Details about the energy functions $E_c$, $E_s$, and $E_p$, and the objective function E will be described later in detail.

The image cropping section 35 crops an image of the optimal crop region from an inputted input image on the basis of the optimal crop region from the composition analyzing section 34, and outputs the cropped image.

[Image Cropping Process in Image Processing Apparatus]

Next, referring to the flowchart in FIG. 3, a description will be given of an image cropping process in the image processing apparatus 11 in FIG. 1.

In step S11, the salient region extracting section 31 generates a saliency map and a faceness map corresponding to an input image. More specifically, the saliency calculating section 51 generates a saliency map corresponding to an input image and supplies the saliency map to the salient-rectangular-region determining section 52, and also generates a faceness map corresponding to the input image and supplies the faceness map to the face-rectangular-region determining section 53.

In step S12, the salient region extracting section 31 extracts and determines a salient region to which attention is directed in the input image on the basis of the saliency map and the faceness map. More specifically, the salient-rectangular-region determining section 52 determines a salient rectangular region on the basis of the saliency map from the saliency calculating section 51, and supplies salient-rectangular-region information indicating the salient rectangular region to the composition pattern setting section 33. Also, the face-rectangular-region determining section 53 determines a face rectangular region on the basis of the faceness map from the saliency calculating section 51, and supplies face-rectangular-region information indicating the face rectangular region to the composition pattern setting section 33.

It should be noted that while in step S12 a salient rectangular region and a face rectangular region are each determined as a salient region, a face rectangular region may be handled collectively as a salient rectangular region.

Figure 4:
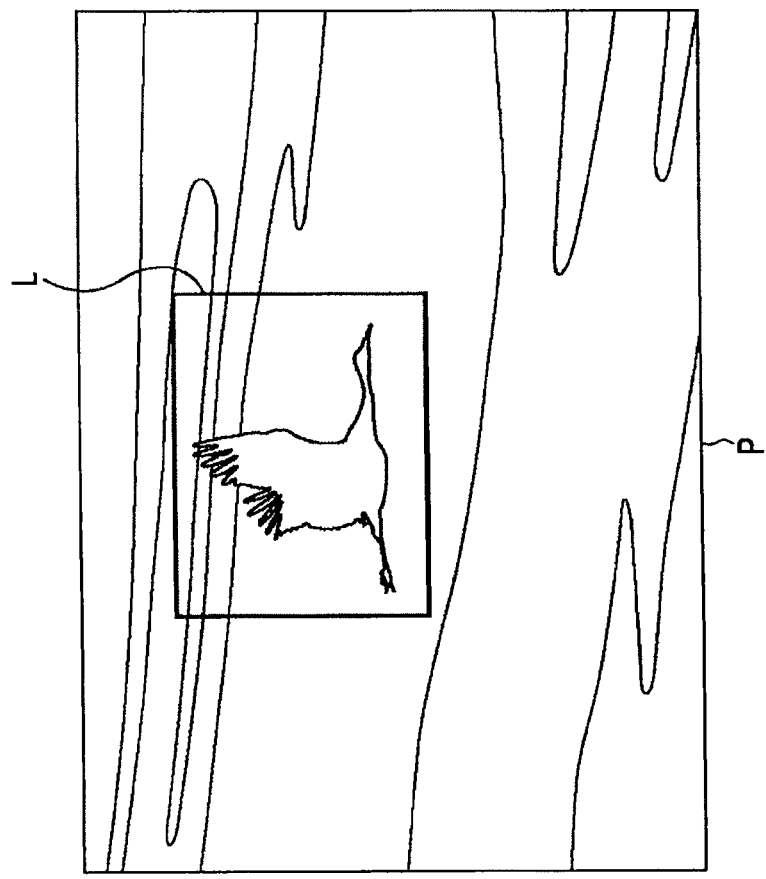
FIG. 4 is a diagram showing an example of a salient region.

An example of a salient region determined in this way is shown in FIG. 4.

In FIG. 4, an input image P is an image of a single bird (crane) flying in the sky. As shown in FIG. 4, according to the process in step S12, attention is directed to the single bird, and a single salient region L is determined so as to include the bird.

Figure 3:
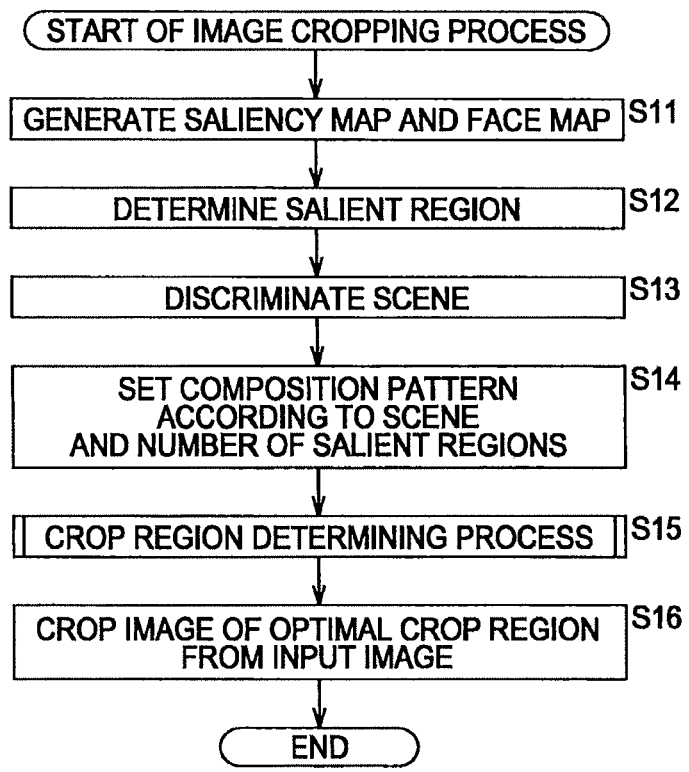
FIG. 3 is a flowchart illustrating an image cropping process in the image processing apparatus in FIG. 1.

Returning to the flowchart in FIG. 3, in step S13, the scene discriminating section 32 performs frequency conversion on the input image to extract frequency information, discriminates the scene of the input image with the frequency information as a feature quantity (vector), and supplies scene information indicating a scene, which is obtained as a result of the discrimination, to the composition pattern setting section 33.

In step S14, the composition pattern setting section 33 sets a composition pattern corresponding to the input image on the basis of the number of pieces of salient region information from the salient region extracting section 31, and the scene information from the scene discriminating section 32, and supplies the composition pattern to the composition analyzing section 34.

Here, referring to FIG. 5, a description will be given of composition patterns that are set on the basis of the numbers of salient regions (subjects), and scenes.

In FIG. 5, various composition patterns are each determined in association with the number of salient regions (subjects), and each of scenes that are "Coast", "Rural Landscape", "Sky", "Mountain", "Expressway", "Street", "City" and "High-rise Building".

According to FIG. 5, for example, when the number of salient regions is 0 in an input image whose scene is "Coast" (that is, when only the landscape of a coast is present), a horizontal composition is set as a composition pattern. When the number of salient regions is 1, a thirds composition and a horizontal composition are set as composition patterns. Also, when the number of salient regions is 2 to 5, a contrasting composition and a horizontal composition are set as composition patterns, and when the number of salient regions is 6 or more, a contrasting composition and a horizontal composition are set as composition patterns.

Also, when the number of salient regions is 0 in an input image whose scene is "Rural Landscape" (that is, when only a rural landscape is present), a radial composition is set as a composition pattern. When the number of salient regions is 1, a thirds composition and a radial composition are set as composition patterns. Also, when the number of salient regions is 2 to 5, a contrasting composition and a radial composition are set as composition patterns, and when the number of salient regions is 6 or more, a radial composition and a pattern composition are set as composition patterns.

Likewise, composition patterns are set in accordance with the numbers of salient regions in an input image whose scene is "Sky", an input image whose scene is "Mountain", an input image whose scene is "Expressway", and so on.

It should be noted that when two composition patterns are set, such a composition pattern that satisfies each of the compositions is set.

Also, the composition patterns associated with the numbers of salient regions and scenes described with reference to FIG. 5 may be set in advance, or may be set by the user as appropriate.

Here, referring to FIG. 6, a description will be given of an example of composition patterns set by the composition pattern setting section 33.

Figure 6:
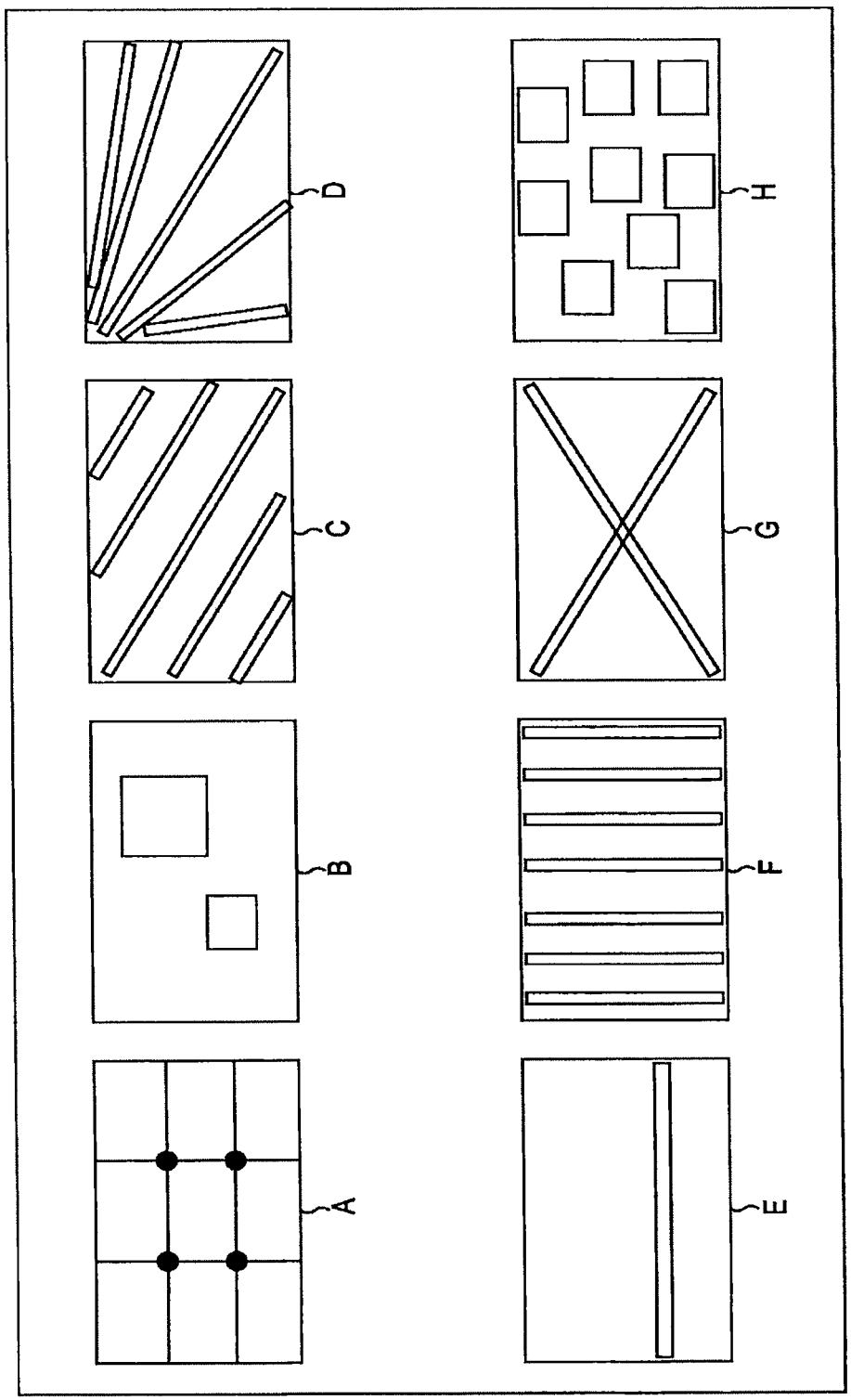
FIG. 6 is a diagram illustrating an example of composition patterns set by a composition pattern setting section.

Composition A in FIG. 6 indicates a thirds composition, in which the subject is placed on an intersection of a vertical line and a horizontal line, thereby providing a well-balanced image.

Composition B in FIG. 6 indicates a contrasting composition, which is a composition in which similar subjects or like subjects are arranged side by side. In Composition B, by placing the main subject so as to be large, and the other subject so as to be small, the main subject is made to stand out.

Composition C in FIG. 6 indicates a diagonal composition, which is used when it is desired to create a sense of rhythm. In addition, Composition C is a composition that makes it possible to make efficient use of a narrow area.

Composition D in FIG. 6 indicates a radial composition, which is used when it is desired to create a sense of openness or expanse. Examples of subject include tree branches and sunlight through a break in the clouds.

Composition E in FIG. 6 is a horizontal composition, which is used when it is desired to give a sense of lateral expanse. The main theme can be changed by shifting the position of the horizontal line in the vertical direction.

Composition F in FIG. 6 is a vertical composition, which is used when it is desired to accentuate the vertical direction of an image. Examples of subject include a tree trunk and a road.

Composition G in FIG. 6 is a perspective composition, which is used when it is desired to create a sense of expanse from the vanishing point (the intersection of diagonals in the drawing).

Composition H in FIG. 6 is a pattern composition, in which a plurality of similar subjects are placed regularly and which is used when it is desired to create a sense of rhythm or a sense of unity.

That is, on the basis of the number of salient regions and scene information, the composition pattern setting section 33 sets a composition pattern associated with the number of salient regions and the scene in FIG. 5, among the composition patterns shown in FIG. 6. It should be noted that the kinds of composition patterns are not limit to the eight kinds shown in FIG. 6, but there may be more kinds of pattern.

For example, as for the input image P shown in FIG. 4, since the number of salient regions is 1, and the scene is "Sky", the composition pattern setting section 33 sets the thirds composition (Composition A) with which these are associated in FIG. 5.

It should be noted that in the following description, it is assumed that the thirds composition is set as the composition pattern for the input image P in step S14.

Returning to the flowchart in FIG. 3, in step S15, the composition analyzing section 34 executes a crop region determining process on the basis of the composition pattern from the composition pattern setting section 33, and determines a crop region in the input image which is optimal for an image to be cropped in the composition pattern.

[Crop Region Determining Process in Composition Analyzing Section]

Here, referring to the flowchart in FIG. 7, a description will be given of a crop region determining process in step S15 in the flowchart in FIG. 3.

In step S31, the composition model creating section 34a of the composition analyzing section 34 creates a composition model representing a crop region based on a composition pattern from the composition pattern setting section 33. In other words, the composition model creating section 34a finds the energy function $E_c$ with respect to the composition model. The energy function $E_c$ is given by Equation (1) below.

[Eq. 1]

$$E_C = \frac{1}{\sum_{n=0}^{N_{VA}} S_{VAn}} \sum_{n=0}^{N_{VA}} S_{VAn}(\alpha_{hn} \cdot G_{DLhn} + \alpha_{vn} \cdot G_{DLvn} + \alpha_{pn} \cdot G_{DPn}) \quad (1)$$

In Equation (1), $S_{VA}$ represents the area of a salient region, and $G_{DLhn}$, $G_{DLvn}$, and $G_{DPn}$ are given by Equation (2) below.

[Eq. 2]

$$G_{DLhn} = \exp\left(-\frac{\min\|L_{Dh} - P_n\|}{d}\right)$$
$$G_{DLvn} = \exp\left(-\frac{\min\|L_{Dv} - P_n\|}{d}\right) \quad (2)$$
$$G_{DPn} = \exp\left(-\frac{\min\|P_D - P_n\|}{d}\right)$$

In Equation (2), $L_{Dh}$, $L_{Dv}$, and $P_D$ indicate a line (horizontal thirds line) dividing the horizontal direction in thirds, a line (vertical thirds line) dividing the horizontal direction in thirds, and an intersection (thirds line intersection) of a horizontal thirds line and a vertical thirds line, respectively, in the input image, and $P_n$ indicates the center position of the salient region. Also, d is the length of the diagonals of a crop region, which is given by Equation (3) below.

[Eq. 3]

$$d = \sqrt{(\text{Crop\_width})^2 + (\text{Crop\_height})^2} \quad (3)$$

Therefore, $G_{DLhn}$, $G_{DLvn}$, and $G_{DPn}$ in Equation (1) become larger in value as the center position of the salient region approaches a horizontal thirds line, a vertical thirds line, and a thirds line intersection, respectively.

Also, coefficients $\alpha_{hn}$, $\alpha_{vn}$, and $\alpha_{pn}$ in Equation (1) are parameters that vary as shown in the top to bottom diagrams of FIG. 8, respectively, in accordance with the aspect ratio $VA\_aspect\_ratio_n$ of the salient region which is given by Equation (4) below, assuming that the width and height of the salient region are Crop_width and Crop_height, respectively. In the top to bottom diagrams of FIG. 8, the horizontal axis indicates the aspect ratio $VA\_aspect\_ratio_n$, and the vertical axis indicates the value of each of the coefficients $\alpha_{hn}$, $\alpha_{vn}$, and $\alpha_{pn}$.

[Eq. 4]

$$VA\_aspect\_ratio_n = VA\_width_n / VA\_height_n \quad (4)$$

Figure 8:
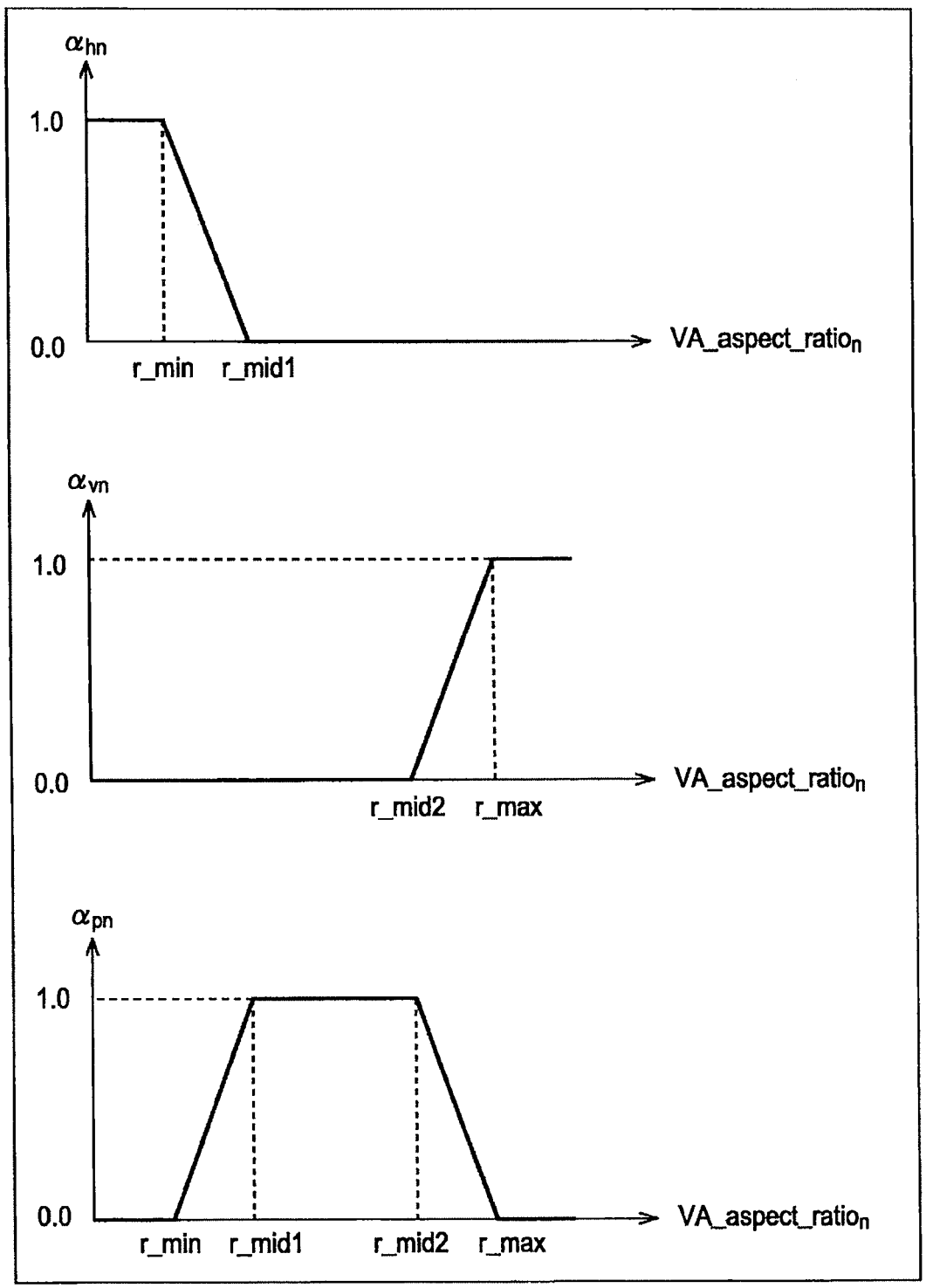
FIG. 8 is a diagram illustrating coefficients of an energy function $E_c$.

According to the top diagram of FIG. 8, when the aspect ratio $VA\_aspect\_ratio_n$ is 0 to r_min, the coefficient $\alpha_{hn}$ becomes 1.0, and when the aspect ratio $VA\_aspect\_ratio_n$ is larger than r_mid1, the coefficient $\alpha_{hn}$ becomes 0.0. Also, when the aspect ratio $VA\_aspect\_ratio_n$ is r_min to r_mid1, the coefficient $\alpha_{hn}$ decreases with an increase in the aspect ratio $VA\_aspect\_ratio_n$. That is, in Equation (1), the coefficient $\alpha_{hn}$ becomes valid when the salient region is vertically elongated.

According to the middle diagram of FIG. 8, when the aspect ratio $VA\_aspect\_ratio_n$ is 0 to r_mid2, the coefficient $\alpha_{vn}$ becomes 0.0, and when the aspect ratio $VA\_aspect\_ratio_n$ is larger than r_max, the coefficient $\alpha_{vn}$ becomes 1.0. Also, when the aspect ratio $VA\_aspect\_ratio_n$ is r_mid2 to r_max, the coefficient $\alpha_{vn}$ increases with an increase in the aspect ratio $VA\_aspect\_ratio_n$. That is, in Equation (1), the coefficient $\alpha_{vn}$ becomes valid when the salient region is horizontally elongated.

According to the bottom diagram of FIG. 8, when the aspect ratio $VA\_aspect\_ratio_n$ is 0 to r_min or larger than r_max, the coefficient $\alpha_{pn}$ becomes 0.0, and when the aspect ratio $VA\_aspect\_ratio_n$ is r_mid1 to r_mid2, the coefficient $\alpha_{pn}$ becomes 1.0. Also, when the aspect ratio $VA\_aspect\_ratio_n$ is r_min to r_mid1, the coefficient $\alpha_{pn}$ increases with an increase in the aspect ratio $VA\_aspect\_ratio_n$, and when the aspect ratio $VA\_aspect\_ratio_n$ is r_mid2 to r_max, the coefficient $\alpha_{vn}$ decreases with an increase in the aspect ratio $VA\_aspect\_ratio_n$. That is, in Equation (1), the coefficient $\alpha_{pn}$ becomes valid when the salient region has a shape close to a square.

From the above, Equation (1) indicates that the value of the energy function $E_c$ becomes larger as the salient region approaches a horizontal thirds line, a vertical thirds line, and a thirds line intersection, if the salient region is vertically elongated, is horizontally elongated, or has a shape close to a square, respectively.

Figure 9:
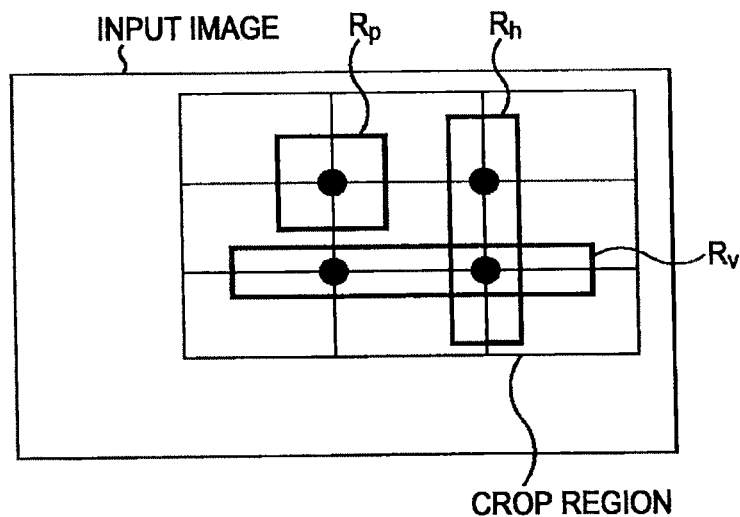
FIG. 9 is a diagram illustrating salient regions in a thirds composition.

For example, in the example in FIG. 9, since a salient region $R_h$ is vertically elongated and close to a horizontal thirds line, a salient region $R_v$ is horizontally elongated and close to a vertical thirds line, and a salient region $R_p$ has a shape close to a square and is close to a thirds line intersection, the energy function $E_c$ becomes large.

Figure 10:
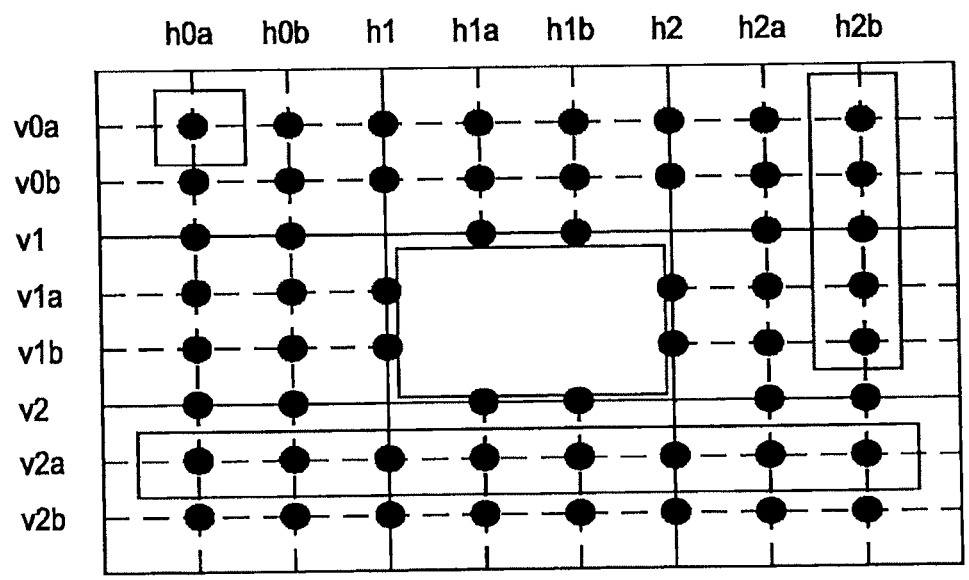
FIG. 10 is a diagram illustrating a ninths composition.

While in the foregoing the description is directed to the case in which a thirds composition is employed as a composition pattern, for example, as shown in FIG. 10, it is also possible to employ a composition (ninths composition) obtained by further dividing a single divided region in the thirds composition into thirds. According to the ninths composition, it is expected that the composition provides depth in comparison to the thirds composition.

The energy function $E_c$ with respect to the ninths composition is given by Equation (5) below.

[Eq. 5]

$$E_C = \frac{1}{\sum_{n=0}^{N_{VA}} S_{VAn}} \sum_{n=0}^{N_{VA}} S_{VAn} \{\alpha_{3rd} \cdot (\alpha_{hn} \cdot G_{DLhn} + \alpha_{vn} \cdot G_{DLvn} + \alpha_{pn} \cdot G_{DPn}) + (1 - \alpha_{3rd}) \cdot (\alpha_{hn} \cdot G_{dLhn} + \alpha_{vn} \cdot G_{dLvn} + \alpha_{pn} \cdot G_{dPn})\} \quad (5)$$

In Equation (5), $G_{dLhn}$, $G_{dLvn}$, and $G_{dPn}$ are given by Equation (6) below.

[Eq. 6]

$$G_{dLhn} = \exp\left(-\frac{\min\|L_{dh} - P_n\|}{d}\right) \quad (6)$$

$$G_{dLvn} = \exp\left(-\frac{\min\|L_{dv} - P_n\|}{d}\right)$$

$$G_{dPn} = \exp\left(-\frac{\min\|P_d - P_n\|}{d}\right)$$

In Equation (6), $L_{dh}$, $L_{dv}$, and $P_d$ indicate a line (horizontal ninths line) dividing the horizontal direction in ninths in the ninths composition, a line (vertical ninths line) dividing the vertical direction in ninths, and an intersection (ninths line intersection) of a horizontal ninths line and a vertical ninths line, respectively. It should be noted, however, that as shown in FIG. 10, the intersections between horizontal ninths lines h1a, h1b and vertical ninths lines v1a, v1b inside the divided region at the center in the thirds composition are not included.

Also, in Equation (5), the coefficient $\alpha_{3rd}$ takes a value of 0 to 1, and is a parameter that determines the ratio between the value of the energy function with respect to the thirds composition, and the value of the energy function with respect to the ninths composition. For example, when the composition pattern to be applied is the ninths composition only, the coefficient may be set as $\alpha_{3rd}=0$.

Figure 7:
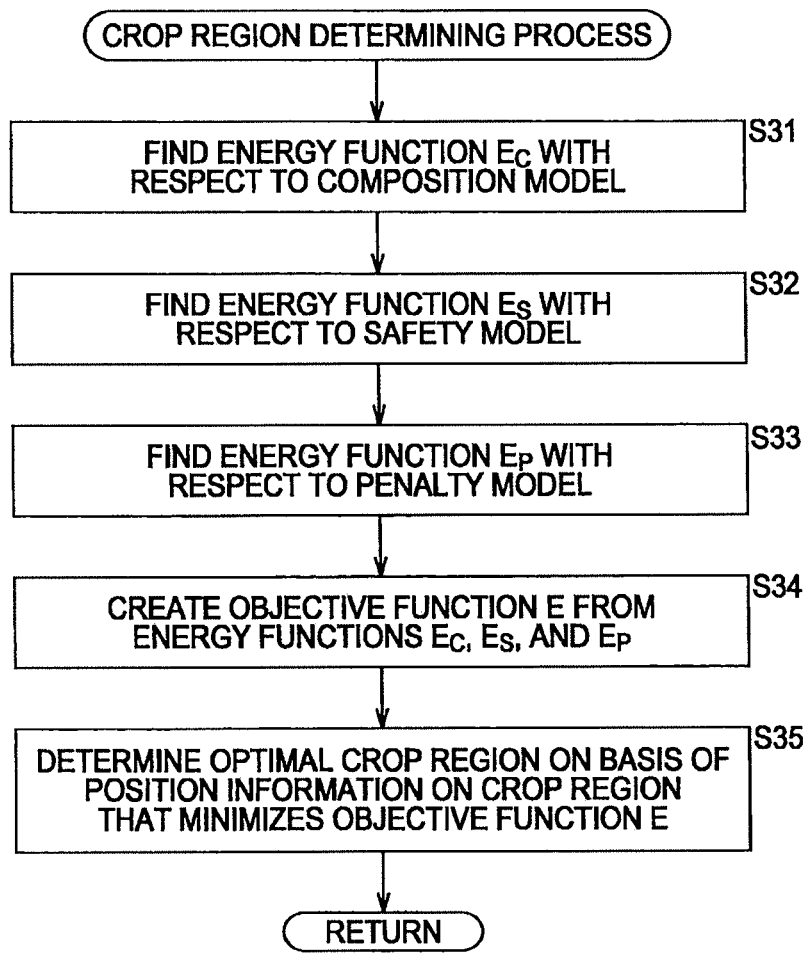
FIG. 7 is a flowchart illustrating a crop region determining process.

Returning to the flowchart in FIG. 7, in step S32, the safety model creating section 34b creates a safety model for preventing the crop region from becoming too small. In other words, the safety model creating section 34b creates an energy function $E_s$ with respect to the safety model. The energy function $E_s$ is given by Equation (7) below.

[Eq. 7]

$$E_S = \alpha \cdot \frac{S_{WVA\&Crop} \cdot S_{Crop}}{S_{WVA} \cdot S_{in}} + \beta \cdot \exp\left(-\frac{\|P_{Crop} - P_{WVA}\|}{d}\right) \quad (7)$$

Figure 11:
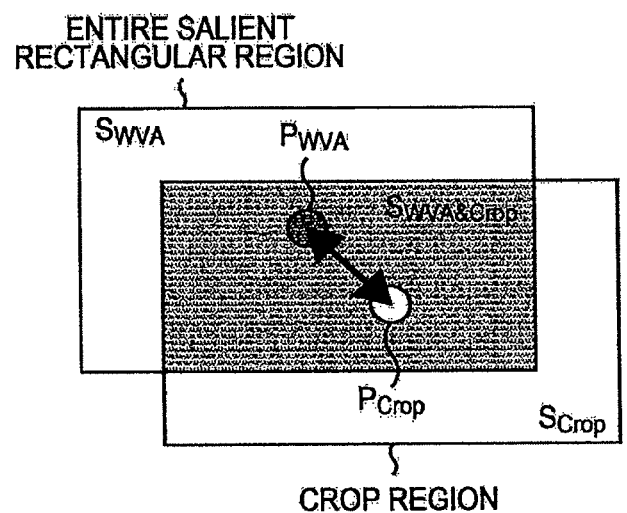
FIG. 11 is a diagram illustrating creation of an energy function $E_s$.

Here, as shown in FIG. 11, let the smallest rectangle including all salient regions within an input image be entire salient rectangular region, its area be $S_{WVA}$, and the center position be $P_{WVA}$. Also, let the area of the crop region be $S_{Crop}$, and the center position be $P_{Crop}$. Further, let the area of a common region between the entire salient rectangular region and the crop region be $S_{WVA\&Crop}$.

At this time, the energy function $E_s$ of Equation (7) becomes larger in value as the area $S_{WVA\&Crop}$ of the common region between the entire salient rectangular region and the crop region becomes larger (the first term of Equation (7)).

Also, the energy function $E_s$ of Equation (7) becomes larger in value as the distance between the center position $P_{Crop}$ of the crop region and the center position $P_{WVA}$ of the entire salient rectangular region becomes closer (the second term of Equation (7)).

In step S33, the penalty model creating section 34c creates a penalty model for evaluating the area of a region of the crop region which lies off the input image. In other words, the penalty model creating section 34c creates an energy function $E_p$ with respect to the penalty model. The energy function $E_p$ is given by Equation (8) below.

[Eq. 8]

$$E_P = \frac{S_{Over}}{S_{Crop}} \quad (8)$$

Figure 12:
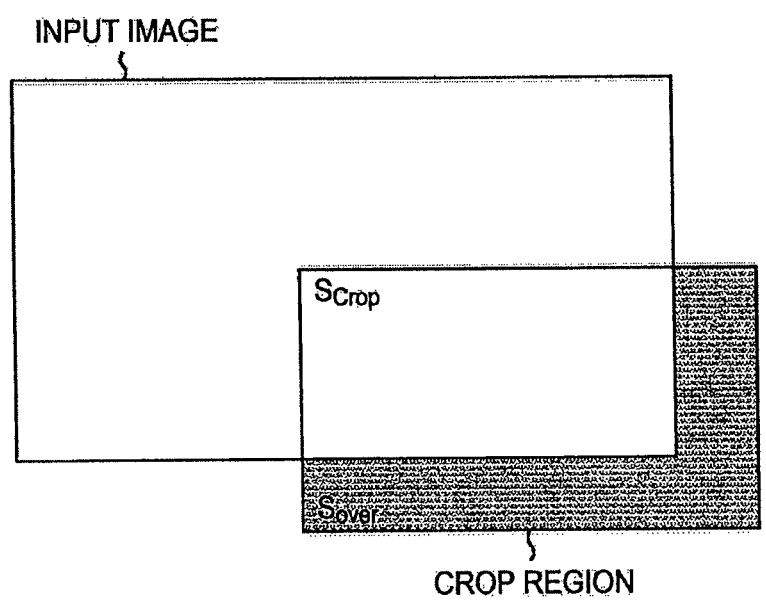
FIG. 12 is a diagram illustrating creation of an energy function $E_p$.

Here, as shown in FIG. 12, let the area of the crop region be $S_{Crop}$, and the area of the crop region which lies off the input image region be $S_{Over}$.

At this time, the energy function $E_p$ of Equation (8) becomes larger in value as the area $S_{Over}$ of the crop region which lies off the input image region becomes larger. It should be noted that to reduce the amount of computation, the energy function may be set as $E_p=1$ at all times when the crop region lies off the input image region.

In step S34, the objective function creating section 34d creates an objective function E given by Equation (9) below, from the energy functions $E_c$, $E_s$, and $E_p$.

[Eq. 9]

$$E=1/(C_C \times E_C + C_S \times E_S) + C_P \times E_P \quad (9)$$

In Equation (9), coefficients $C_C$, $C_S$, and $C_P$ are adjustment functions with respect to the energy functions $E_c$, $E_s$, and $E_p$, respectively. Equation (9) indicates that the smaller the value of the objective function E, the closer the obtained crop region becomes to the optimal crop region.

In step S35, the optimization section 34e determines an optimal crop region on the basis of position information on the crop region that minimizes the objective function E, and supplies the optimal crop region to the image cropping section 35. More specifically, the optimization section 34e optimizes the objective function E by using particle swarm optimization (PSO).

In particle swarm optimization, while a plurality of variables are changing randomly, as one of the variables approaches an objective optimal value, the other variables also approach optimal values, and this is repeated so that the plurality of variables become their respective optimal values.

That is, by taking the start position (horizontal direction/vertical direction) of cropping of a crop region, and the size (width/height) of the crop region as variables, the optimization section 34e finds position information (the start position and size of the crop region) that minimizes the objective function E by particle swarm optimization. The optimization section 34e determines an optimal crop region on the basis of the found position information, and the processing returns to step S15.

It should be noted that in the case when the aspect ratio of the crop region is fixed, the optimization section 34e may set the start position (horizontal direction and vertical direction) of cropping of the crop region, and the size (width) of the crop region as variables. Further, the rotation angle of the crop region may be added as a variable.

Figure 13:
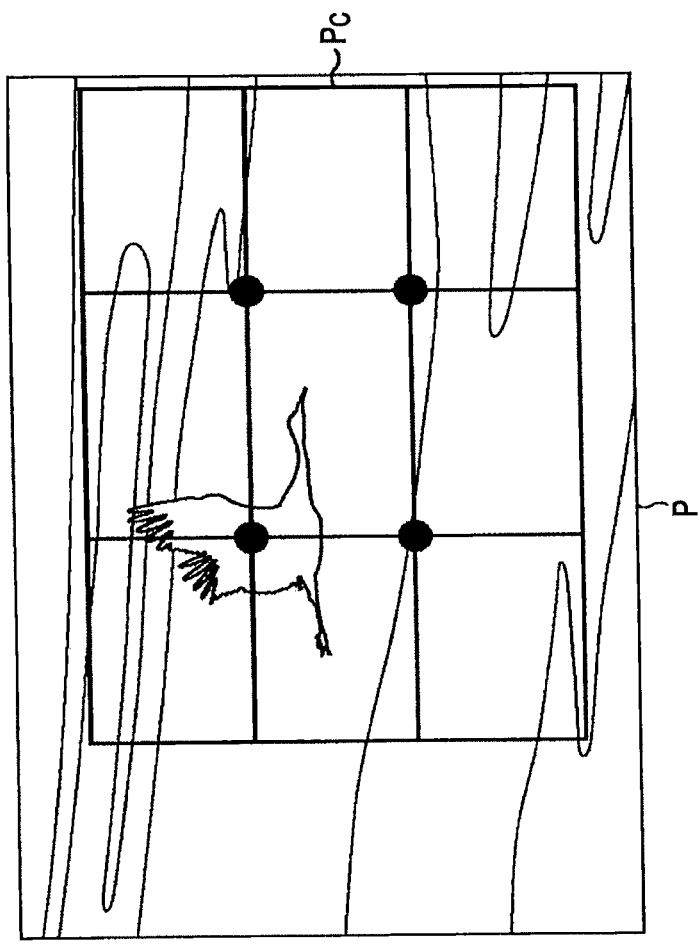
FIG. 13 is a diagram showing an example of an optimal crop region.

An example of an optimal crop region determined in this way is shown in FIG. 13.

As shown in FIG. 13, in the input image P, the optimal crop region $P_c$ is determined in such a way that a single bird is placed at the position of a thirds lines intersection in the thirds composition.

Figure 14:
FIG. 14 is a diagram showing an example of an image of an optimal crop region.

Returning to the flowchart in FIG. 3, in step S16, the image cropping section 35 crops an image of the optimal crop region from an inputted input image on the basis of the optimal crop region from the composition analyzing section 34, and outputs the cropped image. For example, the image cropping section 35 crops the image of the optimal crop region $P_c$ in the thirds composition as shown in FIG. 14, on the basis of the optimal crop region from the composition analyzing section 34.

According to the above process, a crop region can be determined on the basis of a composition pattern associated with the number of salient regions in an input image, and the scene of the input image. Since a salient region is determined even when the subject is other than a person, it is possible to crop an image with an optimal composition even for a subject other than a person. Also, since the composition pattern is set on the basis of the number of salient regions and the scene, it is possible to crop an image with an optimal composition irrespective of the category of an input image.

While in the foregoing the description is directed to the configuration in which the composition pattern is determined in advance in association with the number of salient regions and the scene, it is also possible to perform recognition of objects with respect to an input image, and set a composition pattern according to the objects.

2. Second Embodiment

[Configuration Example of Image Processing Apparatus]

Figure 15:
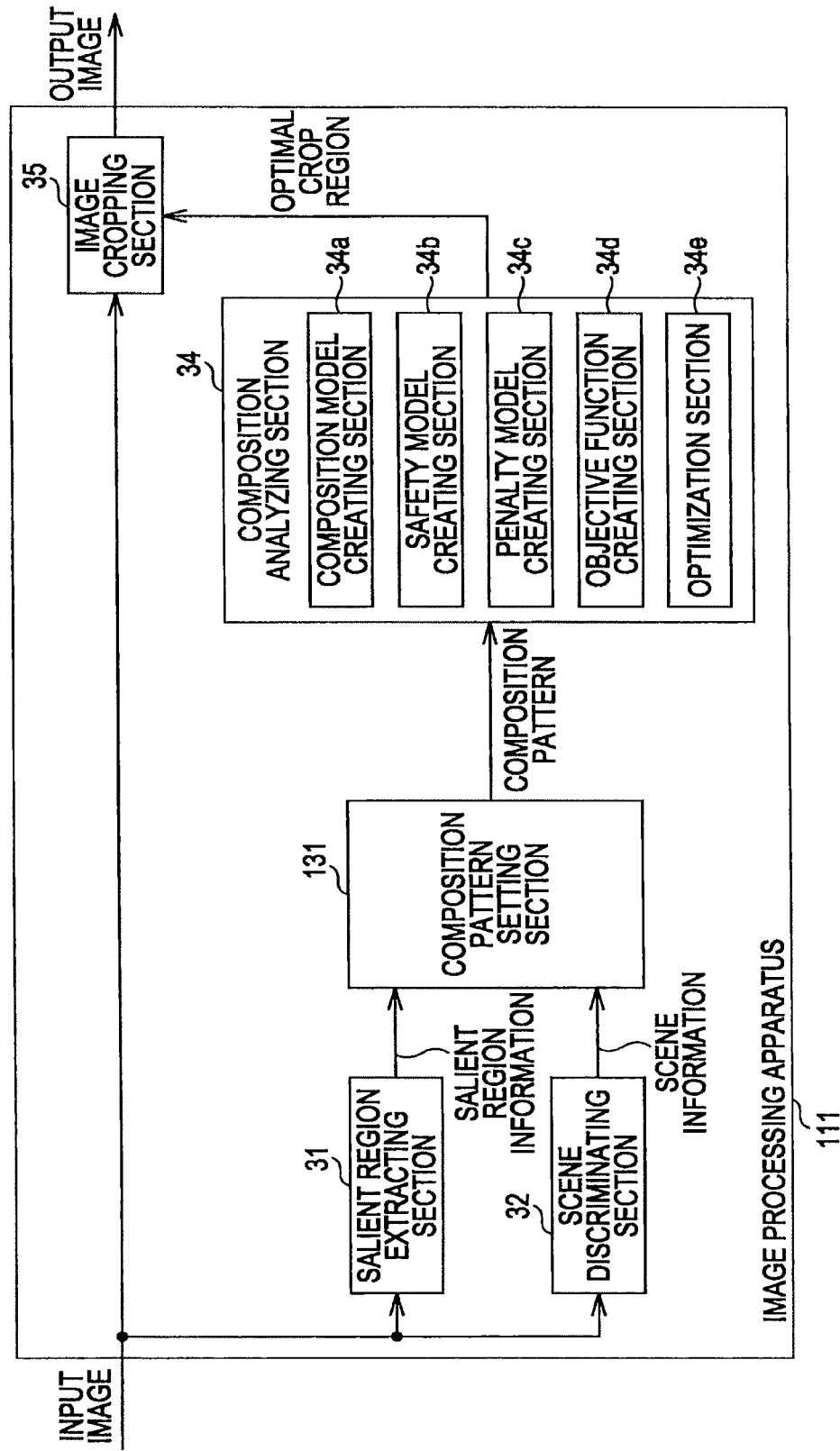
FIG. 15 is a block diagram showing another configuration example of an image processing apparatus.

FIG. 15 shows a configuration example of an image processing apparatus configured to perform recognition of objects with respect to an input image, and set a composition pattern according to the objects. It should be noted that in an image processing apparatus 111 in FIG. 15, components having the same functions as those provided in the image processing apparatus 11 in FIG. 1 are denoted by the same names and the same reference numerals, and description thereof is omitted as appropriate.

That is, the image processing apparatus 111 in FIG. 15 differs from the image processing apparatus 11 in FIG. 1 in that a composition pattern setting section 131 is provided instead of the composition pattern setting section 33.

It should be noted that in FIG. 15, the scene discriminating section 32 discriminates the scene of an input image, and supplies scene information indicating a scene, which is obtained as a result of the discrimination, to the composition pattern setting section 131.

The composition pattern setting section 131 recognizes objects in the input image from the scene discriminating section 32. Also, the composition pattern setting section 131 sets a composition pattern corresponding to the input image on the basis of the scene indicated by the scene information from the scene discriminating section 32, and the recognized objects, and supplies the composition pattern to the composition analyzing section 34. The composition pattern setting section 131 stores, for every scene, a composition pattern for which the placement and proportions of objects within a composition are determined in advance, and sets a composition pattern by selecting a composition pattern according to the scene and objects from among stored composition patterns. The placement and proportions of objects within a composition can be set in such a way as to enhance the balance of the composition. It should be noted that the composition pattern with the placement and proportions of objects within the composition determined in advance for every scene may be stored in an unillustrated database or the like.

[Image Cropping Process in Image Processing Apparatus]

Figure 16:
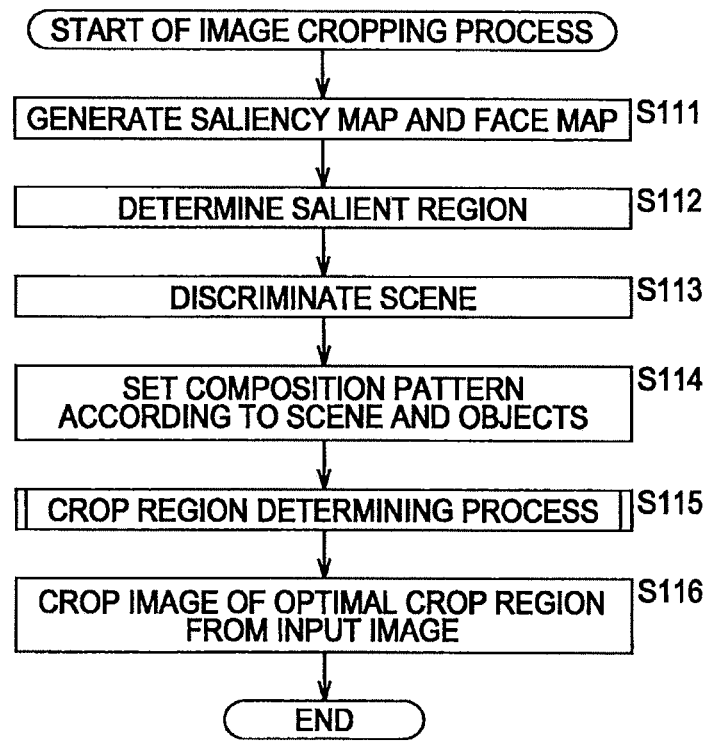
FIG. 16 is a flowchart illustrating an image cropping process in the image processing apparatus in FIG. 15.

Next, referring to the flowchart in FIG. 16, a description will be given of an image cropping process in the image processing apparatus 111 in FIG. 15. It should be noted that since the processes in steps S111 to S113, S115, and S116 in the flowchart in FIG. 16 are the same as the processes in steps S11 to S13, S15, and S16 described with reference to the flowchart in FIG. 3, description thereof is omitted.

That is, in step S114, the composition pattern setting section 131 recognizes objects in an input image from the scene discriminating section 32. Also, the composition pattern setting section 131 sets a composition pattern corresponding to the input image on the basis of a scene indicated by scene information from the scene discriminating section 32, and the recognized objects, and supplies the composition pattern to the composition analyzing section 34.

Here, referring to FIG. 17, a description will be given of an example of a composition pattern according to objects.

Figure 17:
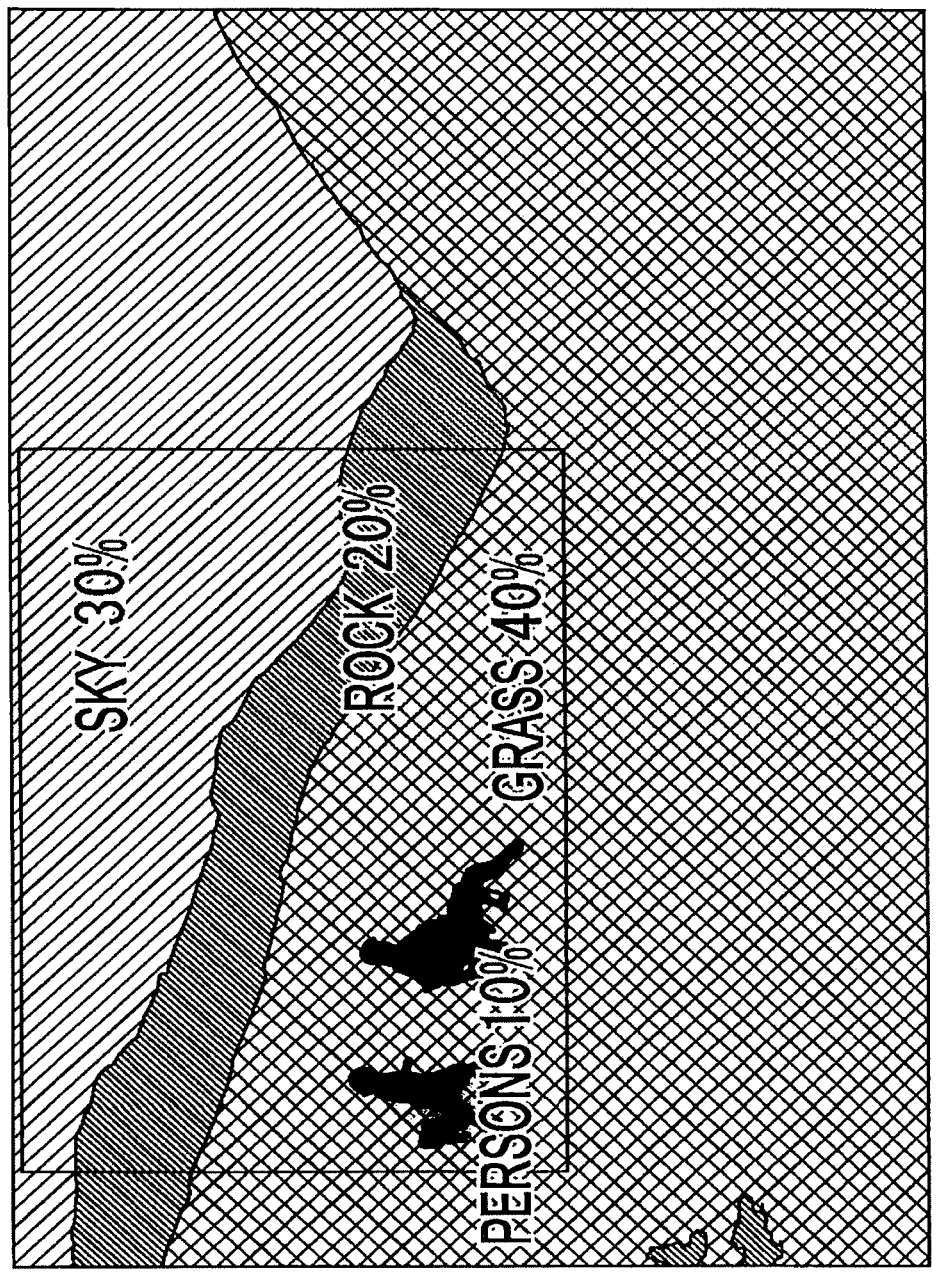
FIG. 17 is a diagram illustrating an example of a composition pattern according to objects.

In the input image shown in FIG. 17, the sky, rock, grass, and persons exist as objects. Upon recognizing these objects in the input image shown in FIG. 17, the composition pattern setting section 131 selects a composition pattern in which the proportions of the sky, rock, grass, and persons within the composition are 30%, 20%, 40%, and 10%, respectively, from among stored composition patterns. As a result, finally, an image of the composition indicated by the box on the input image in FIG. 17 is cropped.

According to the above process, it is possible to recognize objects in an input image, and set a composition pattern according to the objects and the scene. Since the placement and proportions of objects within a composition determined by the composition pattern are so set as to enhance the balance of the composition, it is possible to crop an image with an optimal composition.

While in the foregoing the description is directed to the configuration in which only one crop region in an input image is determined, a plurality of candidates of crop region in an input image may be determined.

3. Third Embodiment

[Configuration Example of Image Processing Apparatus]

Figure 18:
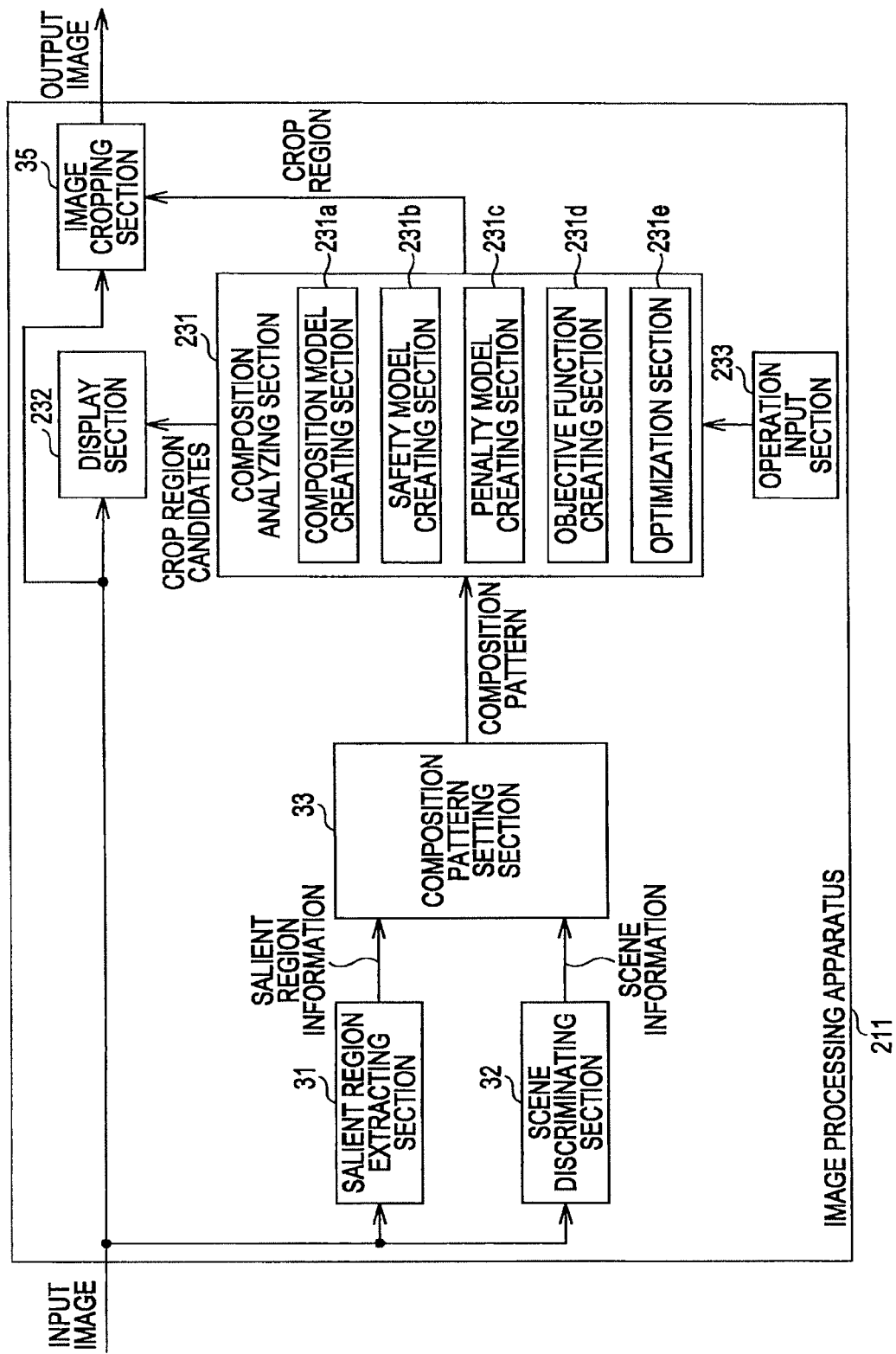
FIG. 18 is a diagram showing still another configuration example of an image processing apparatus.

FIG. 18 shows a configuration example of an image processing apparatus configured to determine a plurality of candidates of crop region in an input image. It should be noted that in an image processing apparatus 211 in FIG. 18, components having the same functions as those provided in the image processing apparatus 11 in FIG. 1 are denoted by the same names and the same reference numerals, and description thereof is omitted as appropriate.

That is, the image processing apparatus 211 in FIG. 18 differs from the image processing apparatus 11 in FIG. 1 in that a composition analyzing section 231 is provided instead of the composition analyzing section 34, and that a display section 232 and an operation input section 233 are additionally provided.

The composition analyzing section 231 determines, on the basis of a composition pattern from the composition pattern setting section 33, a plurality of candidates (crop region candidates) of optimal crop region in an input image, for an image to be cropped in the composition pattern, and supplies the crop region candidates to the display section 232. Also, on the basis of an operation signal from the operation input section 233 which indicates that one of the crop region candidates has been selected, the composition analyzing section 231 supplies the selected crop region to the image cropping section 35.

The composition analyzing section 231 includes a composition model creating section 231a, a safety model creating section 231b, a penalty model creating section 231c, an objective function creating section 231d, and an optimization section 231e. It should be noted that since the composition model creating section 231a through the objective function creating section 231d have the same functions as the composition model creating section 34a through the objective function creating section 34d in FIG. 1, description thereof is omitted.

The optimization section 231e determines crop regions that give the top n smallest objective functions E, and supplies the crop regions as crop region candidates to the display section 232.

The display section 232 is configured as a monitor with the operation input section 231 as a touch panel stacked thereon, and displays boxes indicating the crop region candidates from the composition analyzing section 231 or displays an operation image for instructing an operation to the user, on the input image.

The operation input section 233 is configured as a touch panel stacked on the display surface of the display section 232, and supplies an operation signal according to a user's operation to the composition analyzing section 231.

[Image Cropping Process in Image Processing Apparatus]

Next, referring to the flowchart in FIG. 19, a description will be given of an image cropping process in the image processing apparatus 211 in FIG. 18. It should be noted that since the processes in steps S211 to S114 in the flowchart in FIG. 16 are the same as the processes in steps S11 to S14 described with reference to the flowchart in FIG. 3, description thereof is omitted.

That is, in step S215, the composition analyzing section 231 performs a crop-region-candidate determining process of determining, on the basis of a composition pattern from the composition pattern setting section 33, a plurality of candidates of optimal crop region in an input image, for an image to be cropped in the composition pattern.

[Crop-Region-Candidate Determining Process in Composition Analyzing Section]

Here, referring to the flowchart in FIG. 20, a description will be given of the crop-region-candidate determining process in step S215 in the flowchart in FIG. 19. It should be noted that since the processes in steps S231 to S234 in the flowchart in FIG. 20 are the same as the processes in steps S31 to S34 described with reference to the flowchart in FIG. 7, description thereof is omitted.

That is, in step S235, the optimization section 231e determines crop regions that give the top n smallest objective functions E, and supplies the crop regions as crop region candidates to the display section 232.

More specifically, for example, upon performing optimization of the objective function E by using particle swarm optimization, the optimization section 231e holds local minimum values and the position information at that time, and supplies the top n sets with greatly varying position information, as ranked in increasing order of the value of objective function E, to the display section 232, and the processing returns to step S15.

In this way, the composition analyzing section 231 can determine crop region candidates.

Figure 19:
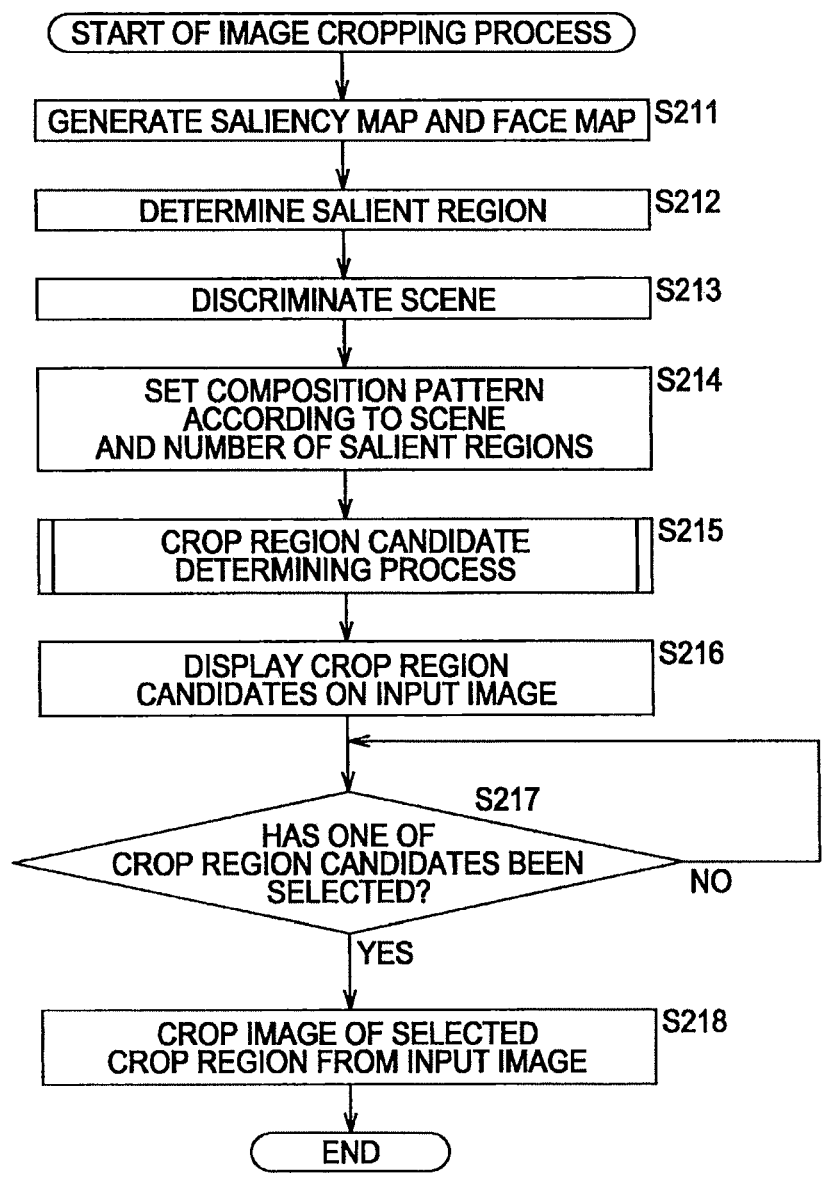
FIG. 19 is a flowchart illustrating an image cropping process in the image processing apparatus in FIG. 18.
Figure 20:
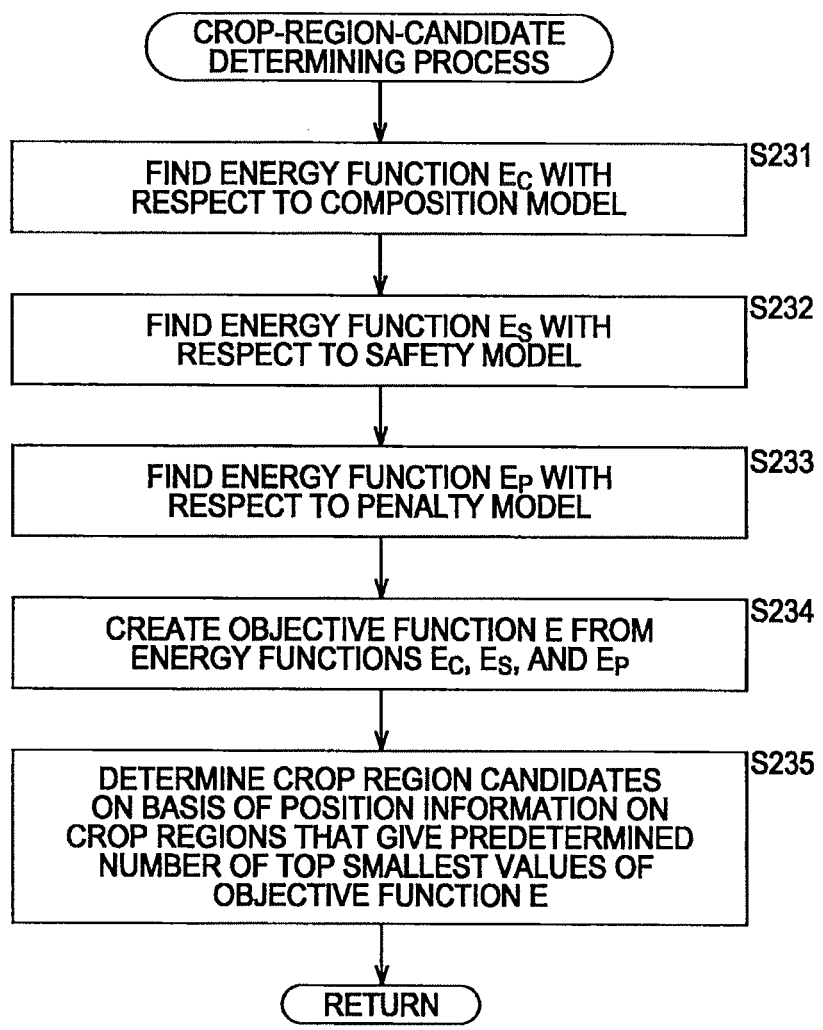
FIG. 20 is a flowchart illustrating a crop-region-candidate determining process.
Figure 21:
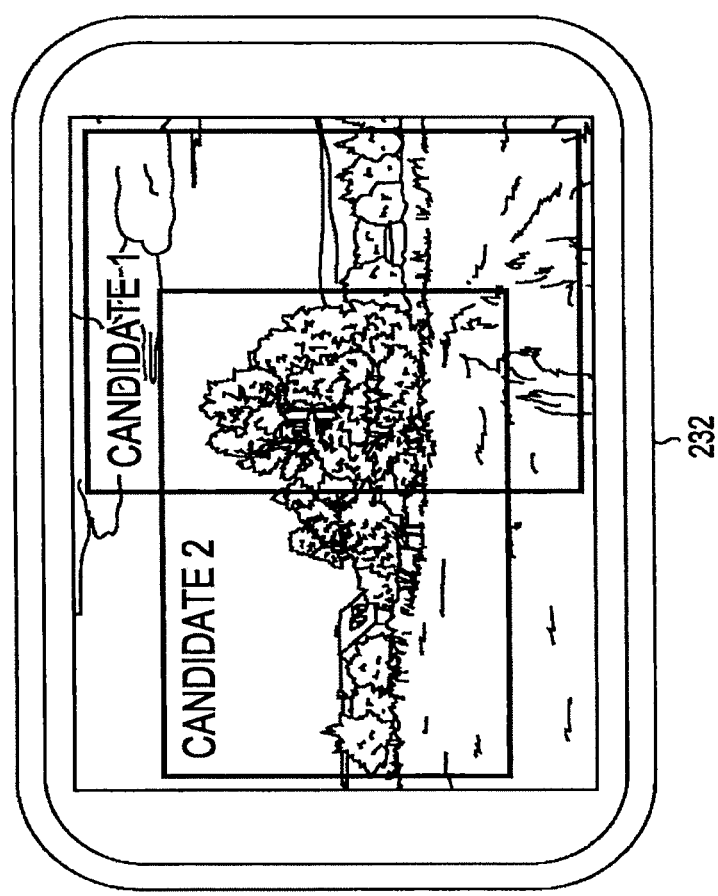
FIG. 21 is a diagram showing a display example of crop region candidates.

Returning to the flowchart in FIG. 19, in step S216, the display section 232 displays boxes indicating the crop region candidates from the composition analyzing section 231, on the input image in the manner as shown in FIG. 21, for example.

The display section 232 shown in FIG. 21 displays boxes indicating two crop region candidates, and names "Candidate 1" and "Candidate 2" for identifying each of those. The user can select a crop region candidate indicated by "Candidate 1" or "Candidate 2", by means of the operation input section 233 as a touch panel stacked on the display section 232.

In step S217, the composition analyzing section 231 judges whether or not one of the crop region candidates has been selected. That is, the composition analyzing section 231 judges whether or not an operation signal indicating that one of the crop region candidates has been selected has been supplied from the operation input section 233.

Figure 22:
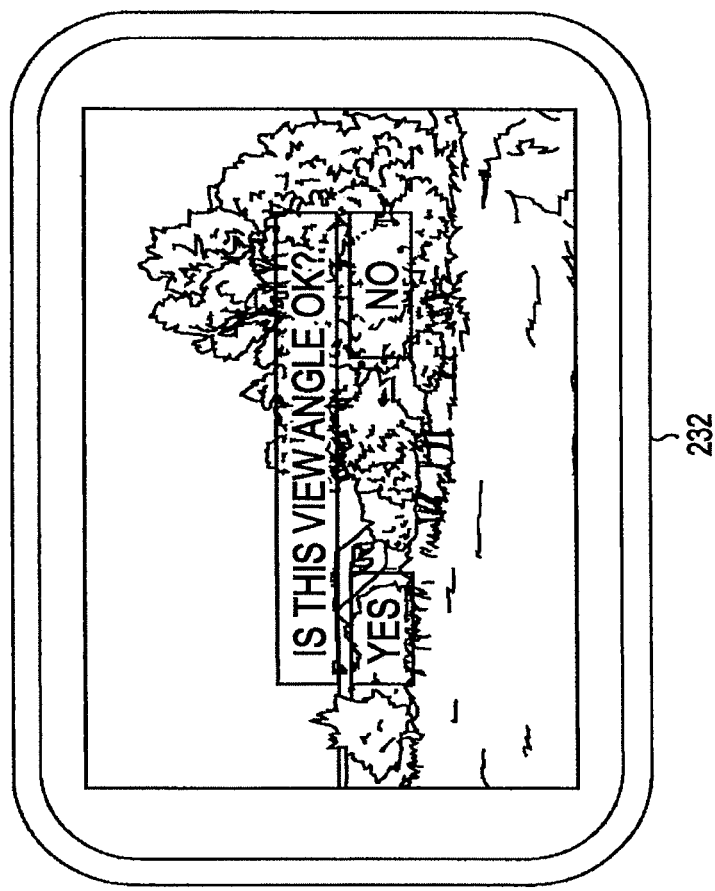
FIG. 22 is a diagram showing a display example of a confirmation screen.

At this time, when one of the crop region candidates indicated by "Candidate 1" and "Candidate 2" shown in FIG. 21 is selected by the user, a confirmation screen including the words "Is this view angle OK?" "Yes" "No" as shown in FIG. 22 is displayed. When "Yes" is selected by a user's operation on the operation input section 233 as a touch panel on the display section 232 in FIG. 22, an operation signal indicating that one of the crop region candidates has been selected is supplied to the composition analyzing section 231.

If it is judged in step S217 that neither of the crop region candidates has been selected, the process is repeated until an operation signal from the operation input section 233 indicating that one of the crop region candidates has been selected is supplied.

On the other hand, if it is judged in step S217 that one of the crop region candidates has been selected, the composition analyzing section 231 supplies the selected crop region to the image cropping section 35, on the basis of the operation signal from the operation input section 233 indicating that one of the crop region candidates has been selected.

In step S218, the image cropping section 35 crops the image of the selected crop region from an inputted input image, on the basis of the crop region from the composition analyzing section 231.

According to the above process, since a plurality of candidates of optimal crop region can be displayed for selection, the user can check the candidates of crop region and make a selection. Therefore, it is possible to crop an image with an optimal composition that matches the user's preference.

While no mention of the size of an input image has been made in the foregoing, a panoramic image may be inputted as an input image.

4. Fourth Embodiment

[Configuration Example of Image Processing Apparatus]

Figure 23:
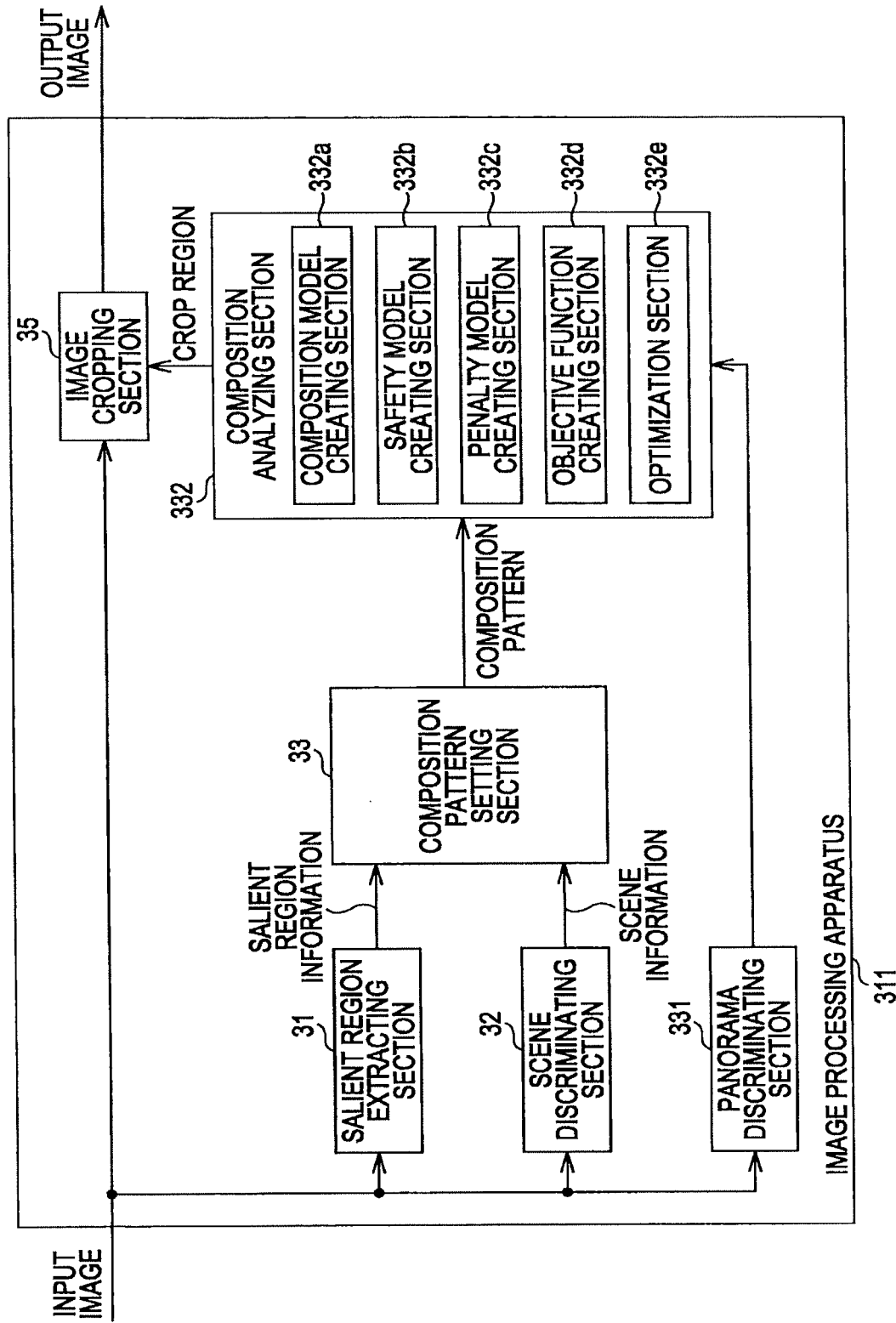
FIG. 23 is a block diagram showing another configuration example of an image processing apparatus.

FIG. 23 shows a configuration example of an image processing apparatus configured to input a panoramic image as an input image. It should be noted that in an image processing apparatus 311 in FIG. 23, components having the same functions as those provided in the image processing apparatus 11 in FIG. 1 are denoted by the same names and the same reference numerals, and description thereof is omitted as appropriate.

That is, the image processing apparatus 311 in FIG. 23 differs from the image processing apparatus 11 in FIG. 11 in that a panorama discriminating section 331 is additionally provided, and that a composition analyzing section 332 is provided instead of the composition analyzing section 34.

The panorama discriminating section 331 discriminates whether or not an input image is a panoramic image, and supplies the discrimination result to the composition analyzing section 332.

In accordance with the discrimination result from the panorama discriminating section 331, on the basis of a composition pattern from the composition pattern setting section 33, the composition analyzing section 332 determines a crop region in the input image, for an image to be cropped in the composition pattern, and supplies the crop region to the image cropping section 35.

The composition analyzing section 332 includes a composition model creating section 332a, a safety model creating section 332b, a penalty model creating section 332c, an objective function creating section 332d, and an optimization section 332e. It should be noted that since the composition model creating section 332a, the safety model creating section 332b, and the penalty model creating section 332c have the same functions as the composition model creating section 34a, the safety model creating section 34b, and the penalty model creating section 34c in FIG. 1, respectively, description thereof is omitted.

If the discrimination result from the panorama discriminating section 331 indicates that the input mage is a panoramic image, the objective function creating section 332d nullifies the term of the energy function $E_s$ in the objective function E.

If the discrimination result from the panorama discriminating section 331 indicates that the input mage is not a panoramic image, the optimization section 332e determines a crop region that minimizes the objective function E, and supplies the crop region as an optimal crop region to the image cropping section 35. Also, if the discrimination result from the panorama discriminating section 331 indicates that the input mage is a panoramic image, the optimization section 231e determines crop regions that give the top n smallest objective functions E, and supplies the crop regions as crop region candidates to the image cropping section 35.

[Image Cropping Process in Image Processing Apparatus]

Figure 24:
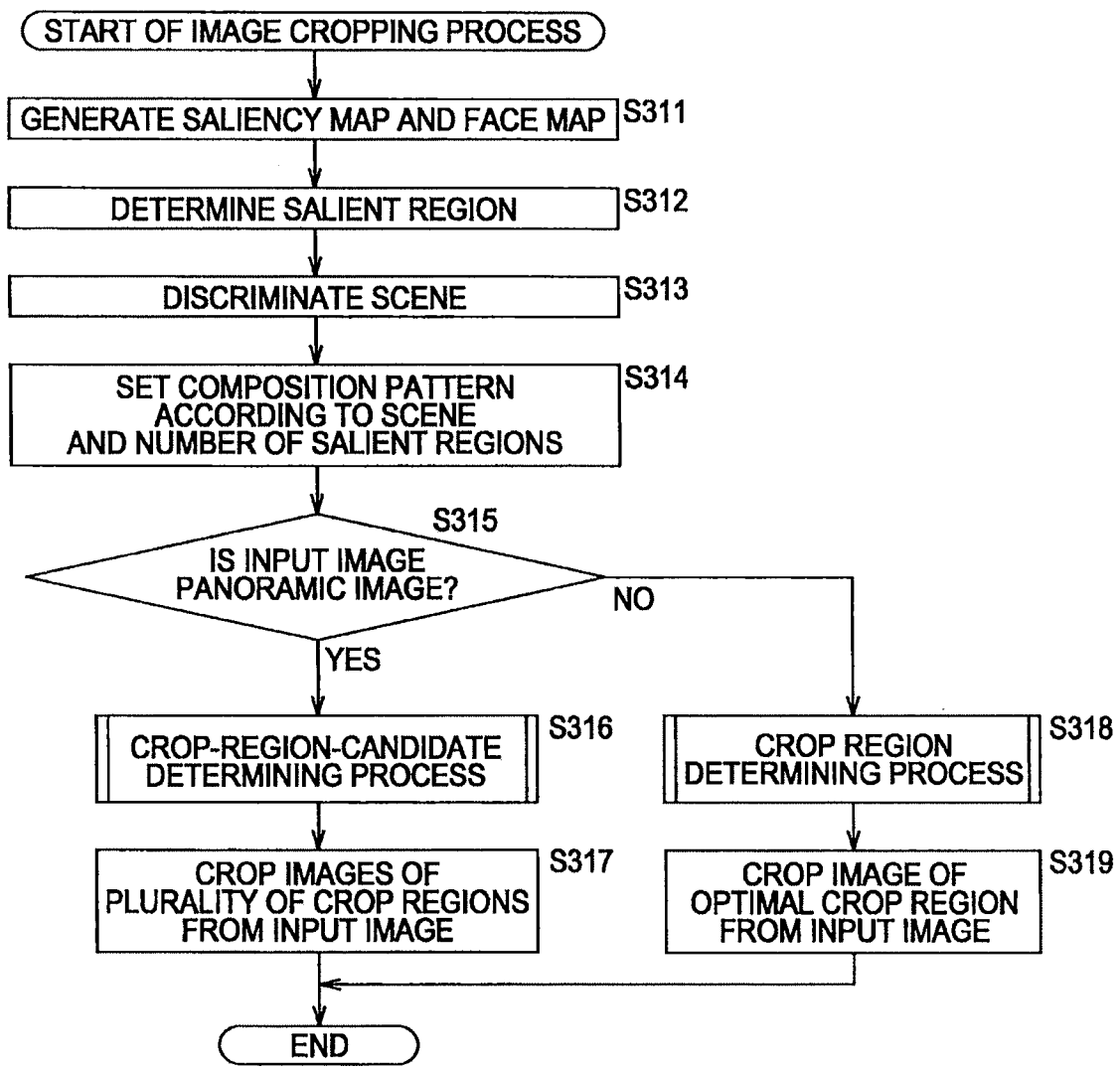
FIG. 24 is a flowchart illustrating an image cropping process in the image processing apparatus in FIG. 23.

Next, referring to the flowchart in FIG. 24, a description will be given of an image cropping process in the image processing apparatus 311 in FIG. 23. It should be noted that since the processes in steps S311 to S314 in the flowchart in FIG. 24 are the same as the processes in steps S11 to S14 described with reference to the flowchart in FIG. 3, description thereof is omitted. Also, since the processes in steps S318 and S319 in the flowchart in FIG. 24 are the same as the processes in steps S15 and S16 described with reference to the flowchart in FIG. 3, description thereof is omitted.

That is, in step S315, the panorama discriminating section 331 discriminates whether or not an input image is a panoramic image. More specifically, letting the width and height of the input image be In_width and In_height, respectively, the panorama discriminating section 331 compares an aspect ratio In_aspect_ratio represented by Equation (10) below, with a predetermined threshold In_aspect_ratio_th.

[Eq. 10]
$$\text{In\_aspect\_ratio} = \frac{\text{In\_width}}{\text{In\_height}}. \tag{10}$$

If the input image is discriminated to be a panoramic image in step S315, the panorama discriminating section 331 supplies the aspect ratio In_aspect_ratio to the composition analyzing section 332 together with information indicating that the input image is a panoramic image, and the processing proceeds to step S316.

In step S316, the composition analyzing section 332 performs a crop-region-candidate determining process on the basis of the information from the panorama discriminating section 331 indicating that the input image is a panoramic image, and the aspect ratio In_aspect_ratio.

It should be noted that since the crop-region-candidate determining process by the image processing apparatus 311 in FIG. 23 is substantially the same as the process in the image processing apparatus 211 in FIG. 18 described above with reference to the flowchart in FIG. 20, description thereof is omitted.

It should be noted, however, that in step S234 that is a process in the flowchart in FIG. 20 corresponding to the crop-region-candidate determining process by the image processing apparatus 311, the objective function creating section 332d nullifies the term of the energy function $E_s$ in the objective function E. More specifically, the objective function creating section 332d changes the value of the coefficient $C_S$ in the objective function E represented by Equation (9), in accordance with the characteristic shown in FIG. 25.

Figure 25:
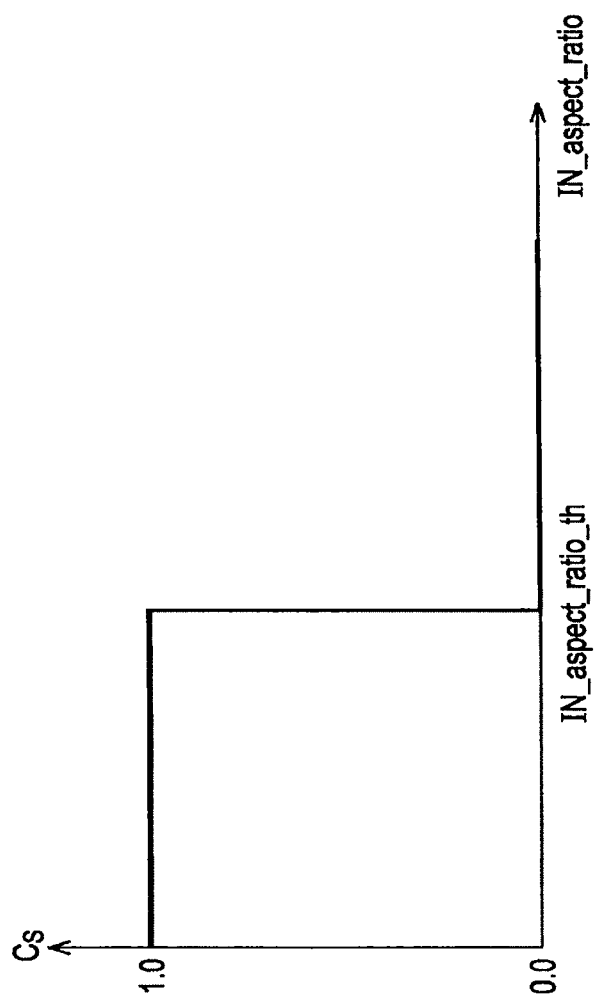
FIG. 25 is a diagram illustrating coefficients of an objective function E.

FIG. 25 shows the relationship between the aspect ratio In_aspect_ratio of an input image, and the coefficient $C_S$ in the objective function E.

According to FIG. 25, when the aspect ratio In_aspect_ratio is larger than the predetermined threshold In_aspect_ratio_th, the value of the coefficient $C_S$ in the objective function E becomes 0.0, and when the aspect ratio In_aspect_ratio is smaller than the predetermined threshold In_aspect_ratio_th, the value of the coefficient $C_S$ in the objective function E becomes 1.0. That is, when the input image is a panoramic image, in the objective function E, the energy function with respect to the safety model for preventing the crop region from becoming too small is set as 0.

Accordingly, crop region candidates are supplied to the image cropping section 35 as relatively small crop regions.

Figure 26:
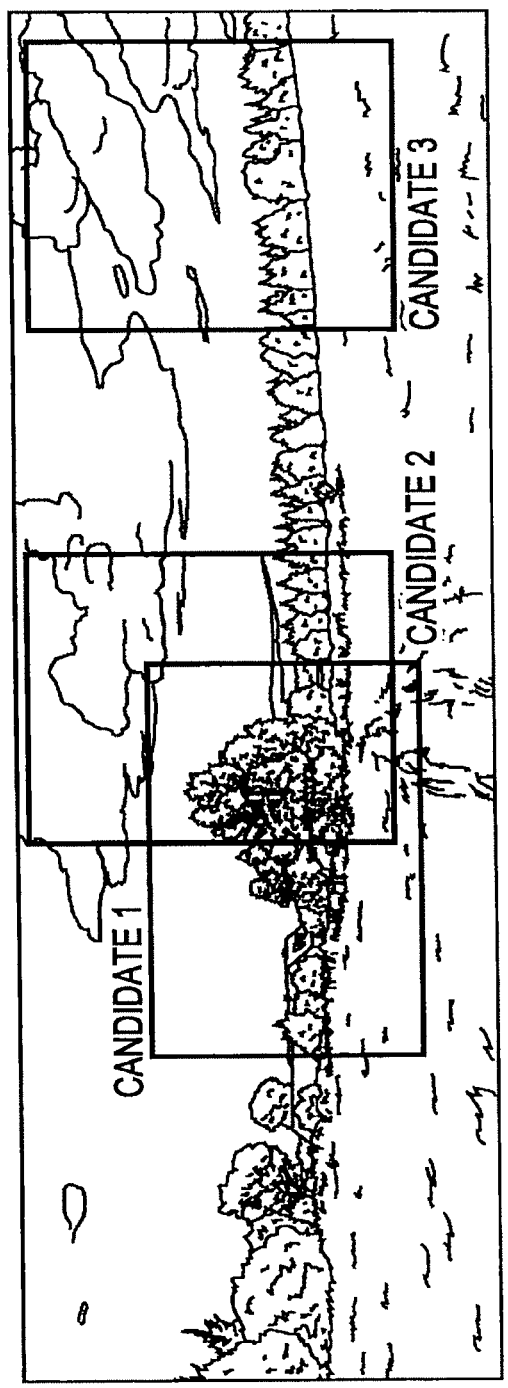
FIG. 26 is a diagram illustrating cropping of images of crop region candidates in a panoramic image.

Returning to the flowchart in FIG. 24, in step S317, on the basis of crop region candidates from the composition analyzing section 332, the image cropping section 35 crops images of the crop region candidates from an inputted input image (panoramic image) in the manner as shown in FIG. 26, and outputs the cropped images.

FIG. 26 shows examples of crop region candidate in a panoramic image. In FIG. 26, boxes indicating three crop region candidates, Candidates 1 through 3, are set on the panoramic image that is an input image.

Returning to the flowchart in FIG. 24, if the input image is discriminated not to be a panoramic image, the panorama discriminating section 331 supplies information indicating that the input image is not a panoramic image, to the composition analyzing section 332. Then, the processing proceeds to step S318, and an optimal crop region is determined. In step S319, the image of the optimal crop region is cropped from the input image.

According to the above process, when an input image is a panoramic image, a plurality of small crop region candidates can be determined. Therefore, it is possible for the user to select an image with an optimal composition that matches the user's preference, from among a plurality of compositions cropped from the panoramic image.

While in the foregoing the description is directed to the configuration in which only a crop region image is outputted as an output image, an input image may be outputted as it is together with the crop region image.

5. Fifth Embodiment

[Configuration Example of Image Processing Apparatus]

Figure 27:
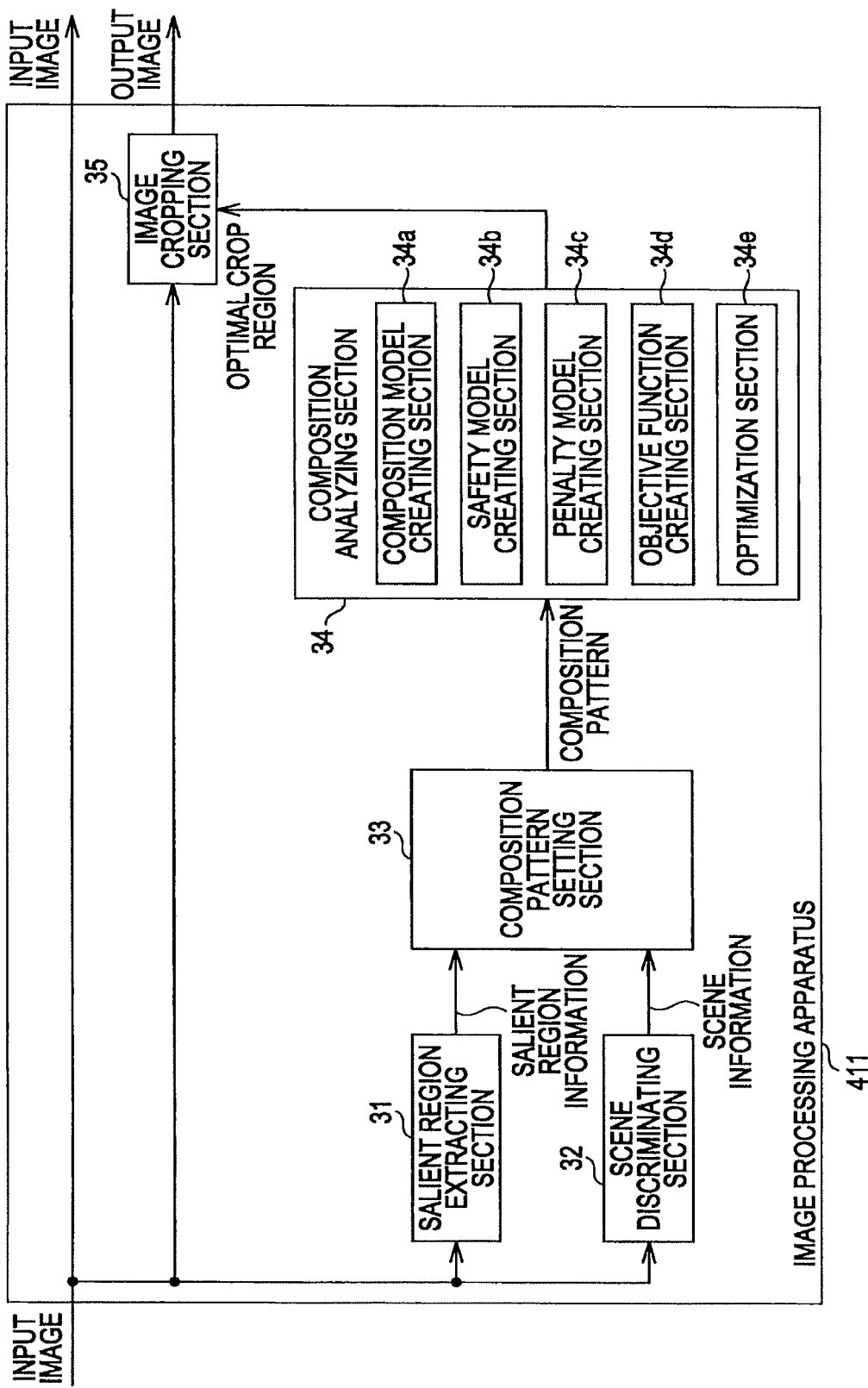
FIG. 27 is a block diagram showing still another configuration example of an image processing apparatus.

FIG. 27 shows a configuration example of an image processing apparatus configured to output an input image as it is together with a crop region image. It should be noted that in an image processing apparatus 411 in FIG. 27, components having the same functions as those provided in the image processing apparatus 11 in FIG. 1 are denoted by the same names and the same reference numerals, and description thereof is omitted as appropriate.

That is, the image processing apparatus 411 in FIG. 27 differs from the image processing apparatus 11 in FIG. 1 in that an input image is outputted as it is together with a crop region image.

According to the above configuration, since an input image can be outputted as it is together with a crop region image, when these images are outputted to a display apparatus, the user can compare the input image and the crop region image with each other. For example, if the input image is an image captured by the user with an image capturing apparatus, the user can check the difference between the composition of the image shot by the user himself/herself, and the composition of the cropped image.

It should be noted that since the crop-region-candidate determining process by the image processing apparatus 411 in FIG. 27 is substantially the same as the process in the image processing apparatus 11 in FIG. 1 described with reference to the flowchart in FIG. 3, description thereof is omitted.

While in the foregoing the description is directed to the configuration in which on the basis of a determined crop region, the image of the crop region is cropped from an input image and outputted, only information indicating a crop region may be outputted.

6. Sixth Embodiment

[Configuration Example of Image Processing Apparatus]

Figure 28:
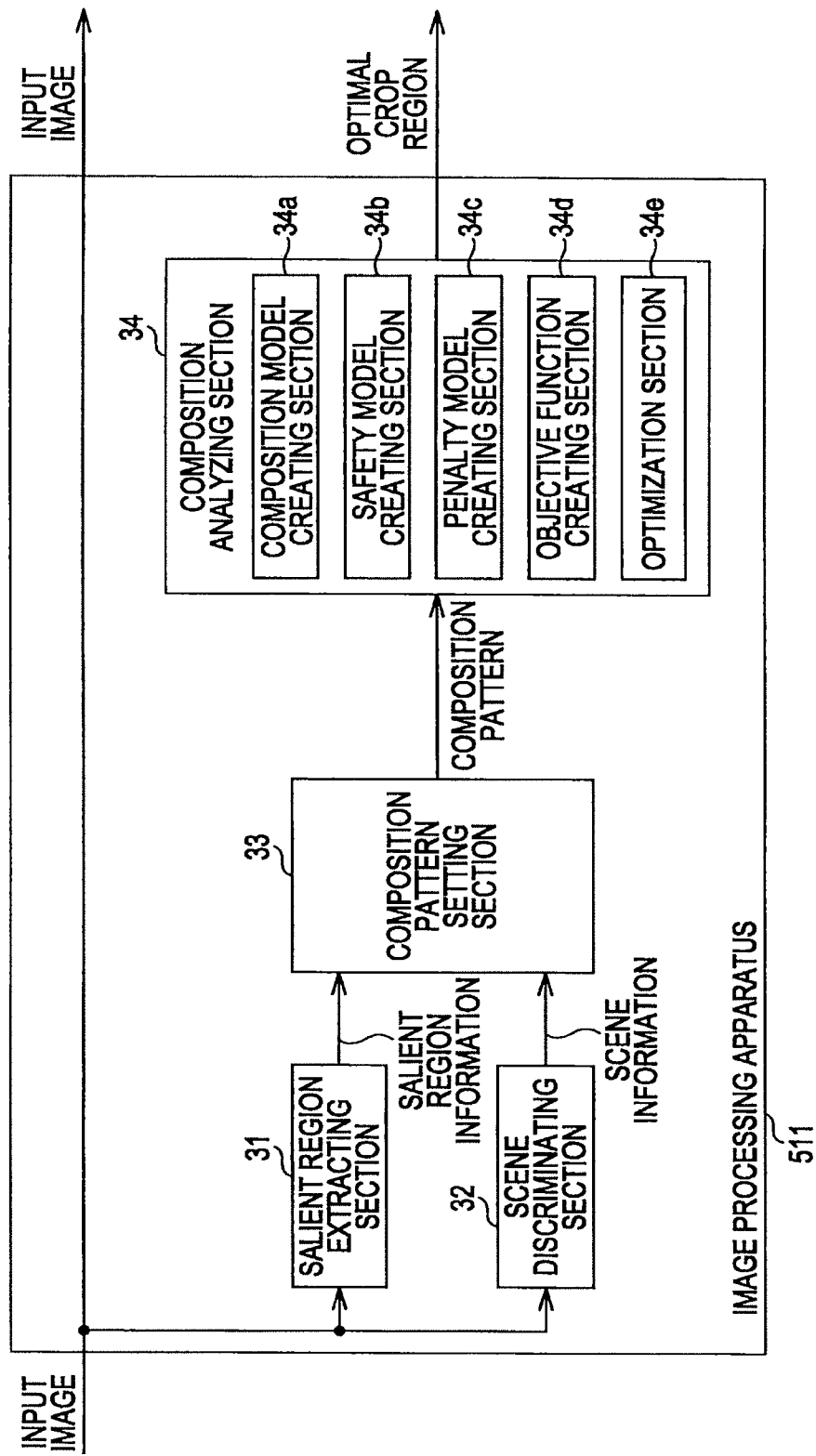
FIG. 28 is a block diagram showing still another configuration example of an image processing apparatus.

FIG. 28 shows a configuration example of an image processing apparatus configured to output only information indicating a crop region, together with a crop region image. It should be noted that in an image processing apparatus 511 in FIG. 28, components having the same functions as those provided in the image processing apparatus 11 in FIG. 1 are denoted by the same names and the same reference numerals, and description thereof is omitted as appropriate.

That is, the image processing apparatus 511 in FIG. 28 differs from the image processing apparatus 11 in FIG. 1 in that the image cropping section 35 is removed, and an input image is outputted as it is.

It should be noted that the composition analyzing section 34 in FIG. 28 determines, on the basis of a composition pattern from the composition pattern setting section 33, an optimal crop region in an input image, for the image to be cropped in the composition pattern, and outputs information indicating the optimal crop region to an external apparatus or the like.

[Image Cropping Process in Image Processing Apparatus]

Figure 29:
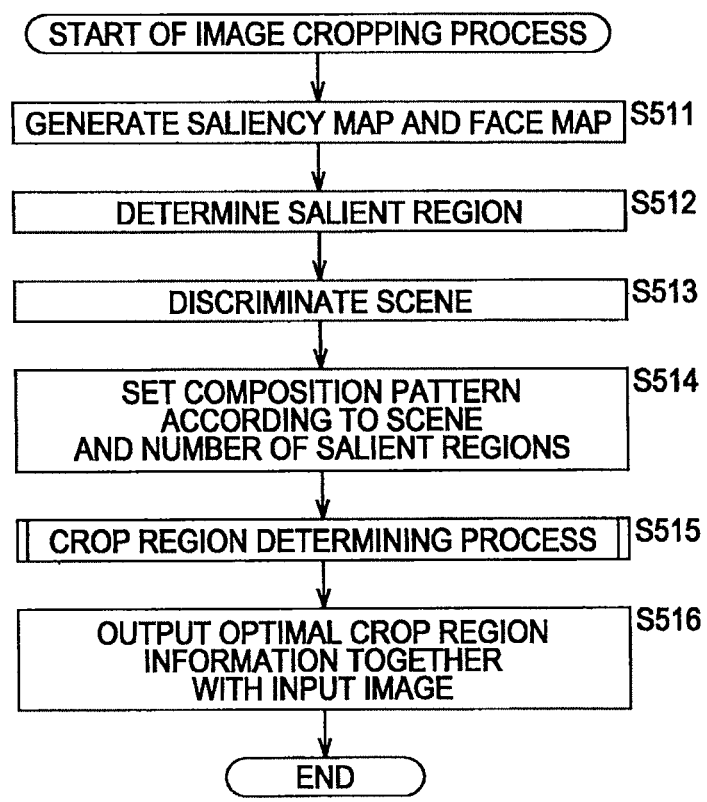
FIG. 29 is a flowchart illustrating an image cropping process in the image processing apparatus in FIG. 28.

Next, referring to the flowchart in FIG. 29, a description will be given of an image cropping process in the image processing apparatus 511 in FIG. 28. It should be noted that since the processes in steps S511 to S515 in the flowchart in FIG. 29 are the same as the processes in steps S11 to S15 described with reference to the flowchart in FIG. 3, description thereof is omitted.

That is, in step S516, the image processing apparatus 511 outputs an input image as it is, and the composition analyzing section 34 outputs information indicating a determined optimal crop region in the input image, to an external apparatus or the like.

According to the above process, since it is possible to output not the image of a crop region but information indicating an optimal crop region, together with the input image, the capacity of an unillustrated frame memory within the image processing apparatus 511 can be reduced.

While in the foregoing the description is directed to the configuration in which an input image and information indicating an optimal crop region are outputted separately, an input image and information indicating an optimal crop region may be outputted as a single piece of data.

7. Seventh Embodiment

[Configuration Example of Image Processing Apparatus]

Figure 30:
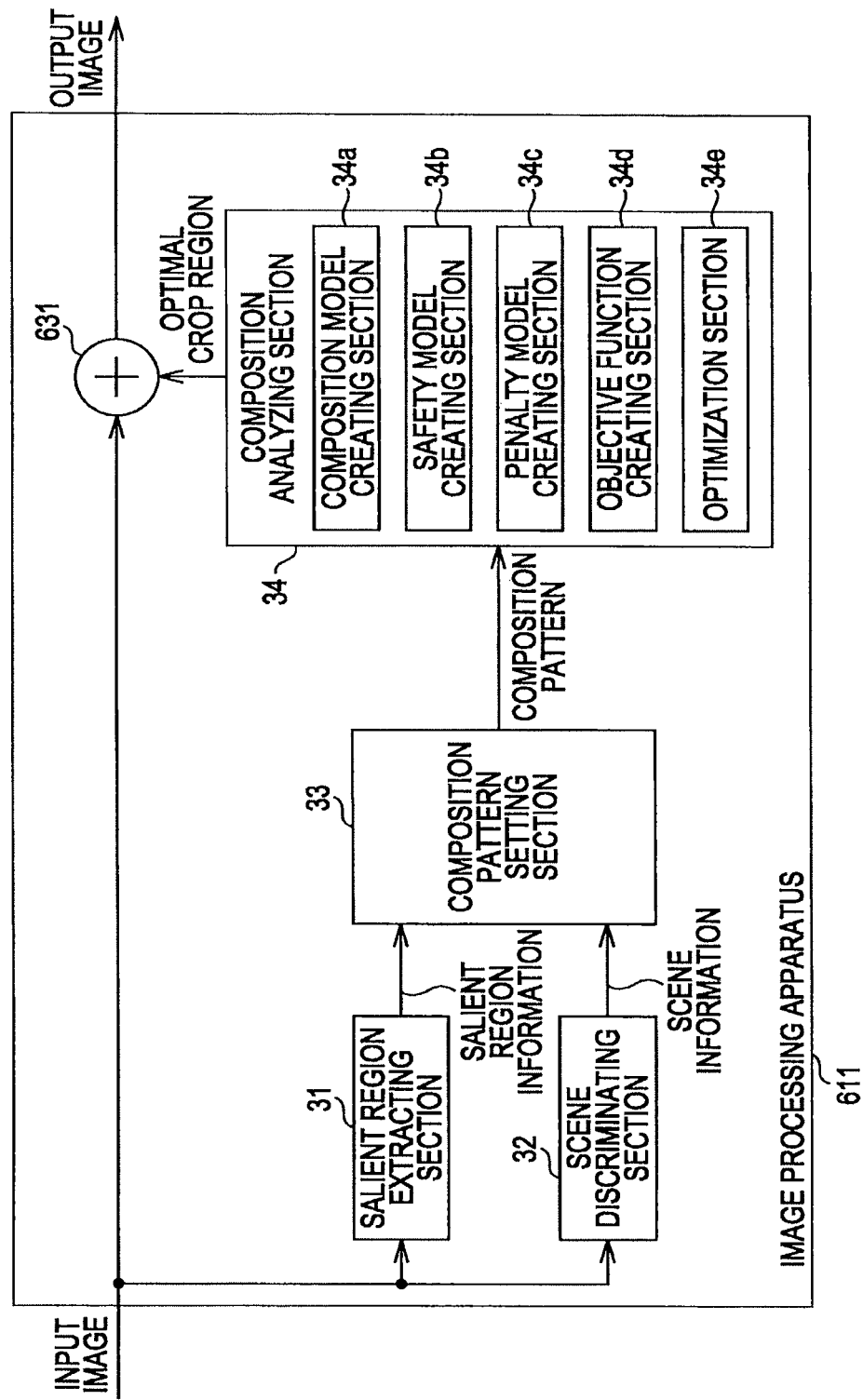
FIG. 30 is a block diagram showing still another configuration example of an image processing apparatus.

FIG. 30 shows a configuration example of an image processing apparatus configured to output an input image and information indicating an optimal crop region as a single piece of data. It should be noted that in an image processing apparatus 611 in FIG. 30, components having the same functions as those provided in the image processing apparatus 11 in FIG. 1 are denoted by the same names and the same reference numerals, and description thereof is omitted as appropriate.

That is, the image processing apparatus 611 in FIG. 30 differs from the image processing apparatus 11 in FIG. 1 in that an adding section 631 is provided instead of the image cropping section 35.

It should be noted that the composition analyzing section 34 in FIG. 30 determines, on the basis of a composition pattern from the composition pattern setting section 33, an optimal crop region in an input image, for the image to be cropped in the composition pattern, and outputs information indicating the optimal crop region to the adding section 631.

The adding section 631 adds the information indicating an optimal crop region from the composition analyzing section 34, to an inputted input image as EXIF information, and outputs the result as an output image.

[Image Cropping Process in Image Processing Apparatus]

Figure 31:
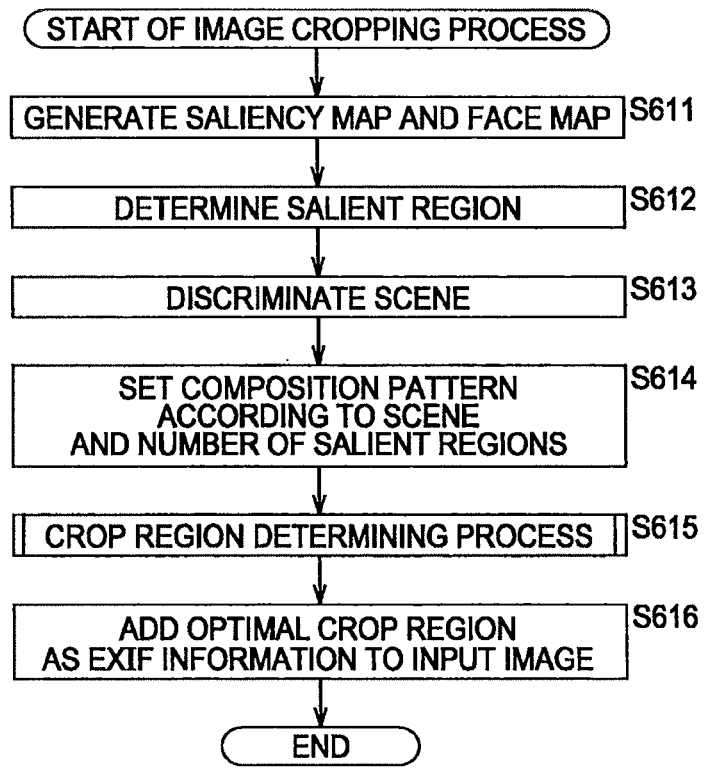
FIG. 31 is a flowchart illustrating an image cropping process in the image processing apparatus in FIG. 30.

Next, referring to the flowchart in FIG. 31, a description will be given of an image cropping process in the image processing apparatus 611 in FIG. 30. It should be noted that since the processes in steps S611 to S615 in the flowchart in FIG. 31 are the same as the processes in steps S11 to S15 described with reference to the flowchart in FIG. 3, description thereof is omitted.

That is, in step S616, the adding section 631 adds information indicating an optimal crop region from the composition analyzing section 34, to an inputted input image as EXIF information, and outputs the result as an output image.

According to the above process, since information indicating an optimal crop region can be added as EXIF information to an input image and outputted, the image of a crop region is not generated, and the capacity of an unillustrated frame memory within the image processing apparatus 611 can be reduced.

While in the foregoing the description is directed to the image processing apparatus that outputs the image of a crop region with an image captured by an image capturing apparatus or the like as an input image, the image capturing apparatus may include a configuration for determining a crop region with respect to a captured image that has been captured.

8. Eighth Embodiment

[Configuration Example of Image Capturing Apparatus]

Figure 32:
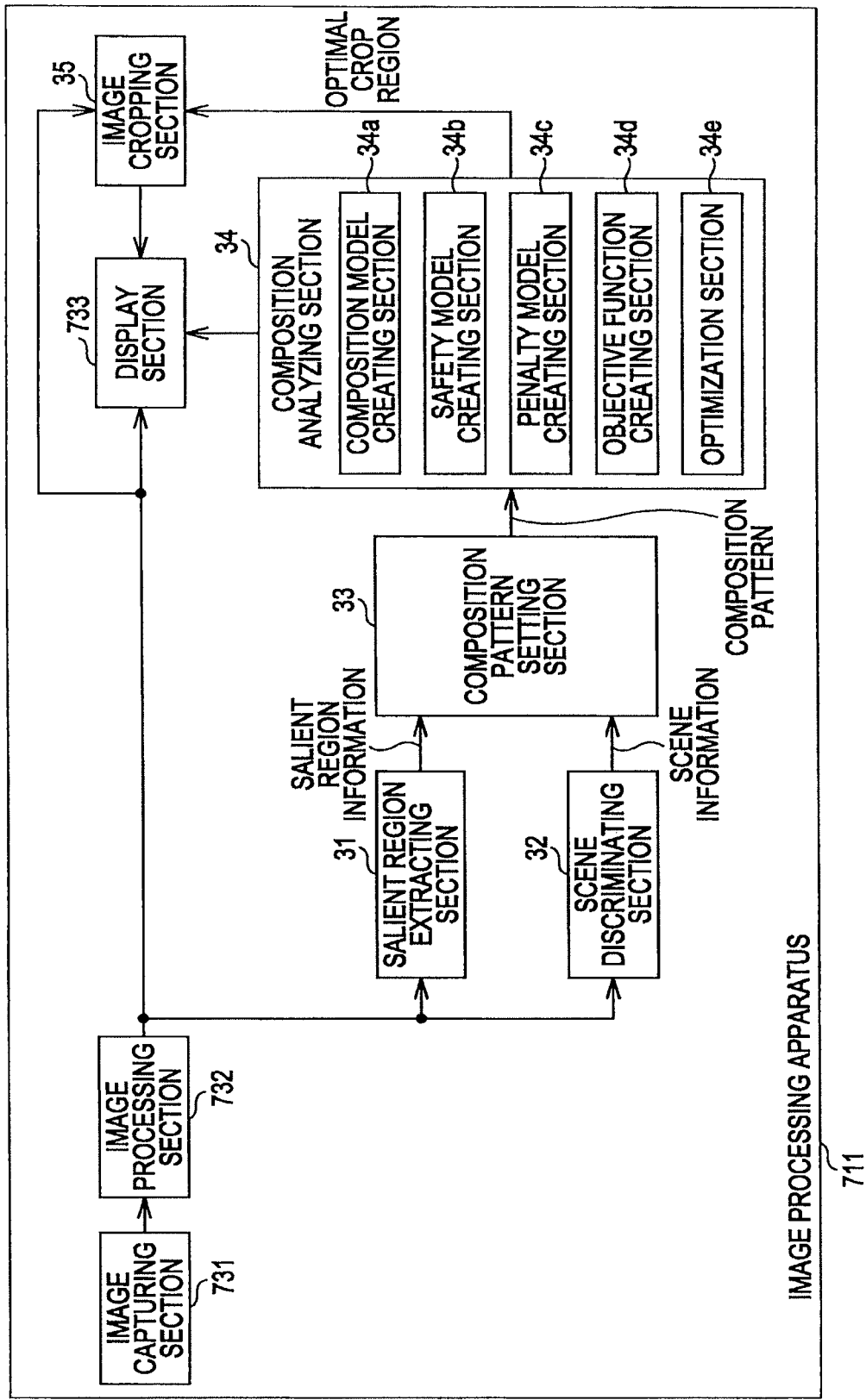
FIG. 32 is a block diagram showing a functional configuration example of an embodiment of an image capturing apparatus to which the present invention is applied.

FIG. 32 shows a configuration example of an image capturing apparatus configured to determine a crop region with respect to a captured image that has been captured. It should be noted that in an image capturing apparatus 711 in FIG. 32, components having the same functions as those provided in the image processing apparatus 11 in FIG. 1 are denoted by the same names and the same reference numerals, and description thereof is omitted as appropriate.

That is, the image capturing apparatus 711 in FIG. 32 differs from the image processing apparatus 11 in FIG. 1 in that an image capturing section 731, an image processing section 732, and a display section 733 are additionally provided.

It should be noted that the composition analyzing section 34 in FIG. 32 determines, on the basis of a composition pattern from the composition pattern setting section 33, an optimal crop region in an input image, for the image to be cropped in the composition pattern, and supplies the optimal crop region to the image cropping section 35 and the display section 733.

The image capturing section 731 is configured to include an optical lens, an imaging device, and an A/D (Analog/Digital) conversion section (none of which is shown). In the image capturing section 731, the imaging device receives light made incident on the optical lens and performs photoelectric conversion to thereby capture a subject, and the obtained analog image signal is subjected to A/D conversion. The image capturing section 731 supplies digital image data (captured image) obtained as a result of the A/D conversion to the image processing section 732.

The image processing section 732 applies image processing such as noise removal to the captured image from the image capturing section 731, and supplies the resulting image to the salient region extracting section 31, the scene discriminating section 32, the image cropping section 35, and the display section 733.

The display section 733 displays a box indicating an optimal crop region from the composition analyzing section 34, or displays the image of an optimal crop region cropped by the image cropping section 35, on the captured image from the image processing section 732.

[Image Cropping Process in Image Capturing Apparatus]

Figure 33:
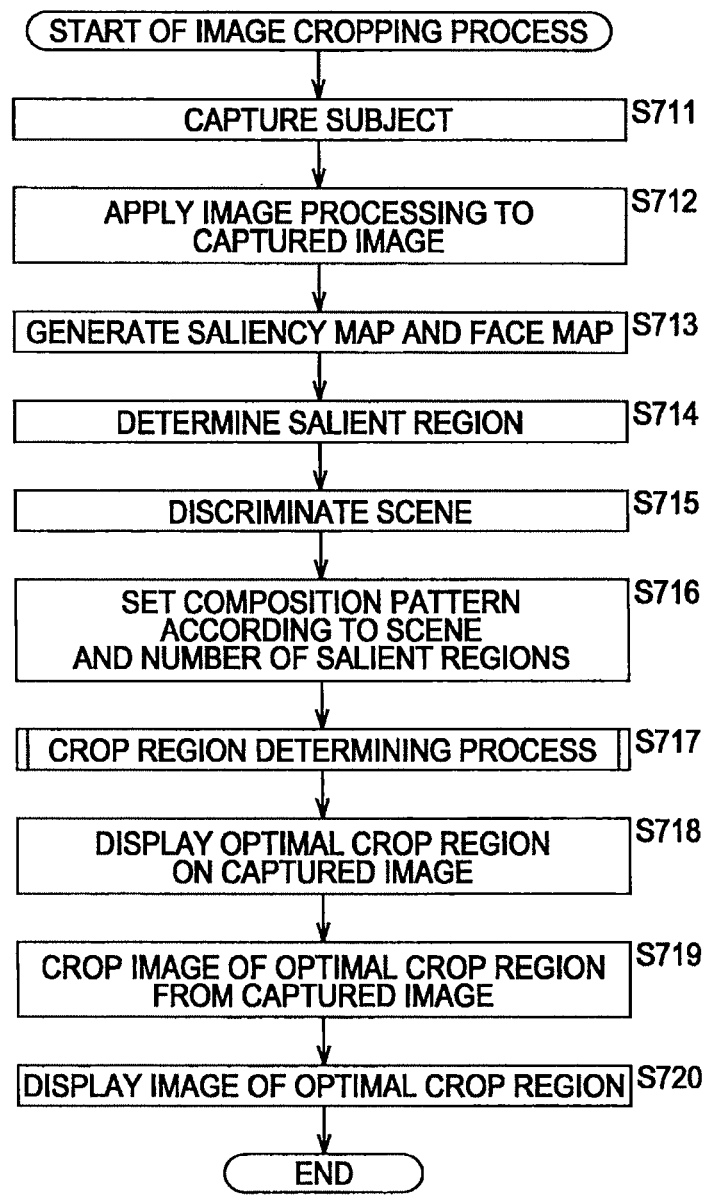
FIG. 33 is a flowchart illustrating an image cropping process in the image capturing apparatus in FIG. 32.

Next, referring to the flowchart in FIG. 33, a description will be given of an image cropping process in the image capturing apparatus 711 in FIG. 32. It should be noted that since the processes in steps S713 to S717 in the flowchart in FIG. 33 are the same as the processes in steps S11 to S15 described with reference to the flowchart in FIG. 3, description thereof is omitted.

That is, in step S711, the image capturing section 731 captures a subject, and supplies the obtained captured image to the image processing section 732.

In step S712, the image processing section 732 applies image processing such as noise removal to the captured image from the image capturing section 731, and supplies the resulting image to the salient region extracting section 31, the scene discriminating section 32, the image cropping section 35, and the display section 733.

In step S718, the display section 733 displays a box indicating an optimal crop region from the composition analyzing section 34, on the captured image from the image processing section 732. At this time, for example, when an unillustrated operation input section is operated by the user, and an operation signal indicating an instruction for cropping the image of the optimal crop region is supplied to the image cropping section 35, the processing proceeds to step S719.

In step S719, the image cropping section 35 crops the image of the optimal crop region from the captured image from the image processing section 732, on the basis of the optimal crop region from the composition analyzing section 34.

In step S720, the display section 733 displays the image of the optimal crop region cropped by the image cropping section 35.

According to the above process, a crop region can be determined on the basis of a composition pattern that is associated with the number of salient regions in a captured image and the scene of the captured image. Since a salient region is determined even when the subject is other than a person, it is possible to crop an image with an optimal composition even for a subject other than a person. Also, since the composition pattern is set on the basis of the number of salient regions and the scene, it is possible to crop an image with an optimal composition irrespective of the category of a captured image.

While in the foregoing the description is directed to the configuration in which an optimal crop region is determined irrespective of in which direction a subject included in a salient region is oriented, an optimal crop region may be determined in accordance with the orientation of a subject.

9. Ninth Embodiment

[Configuration Example of Image Processing Apparatus]

Figure 34:
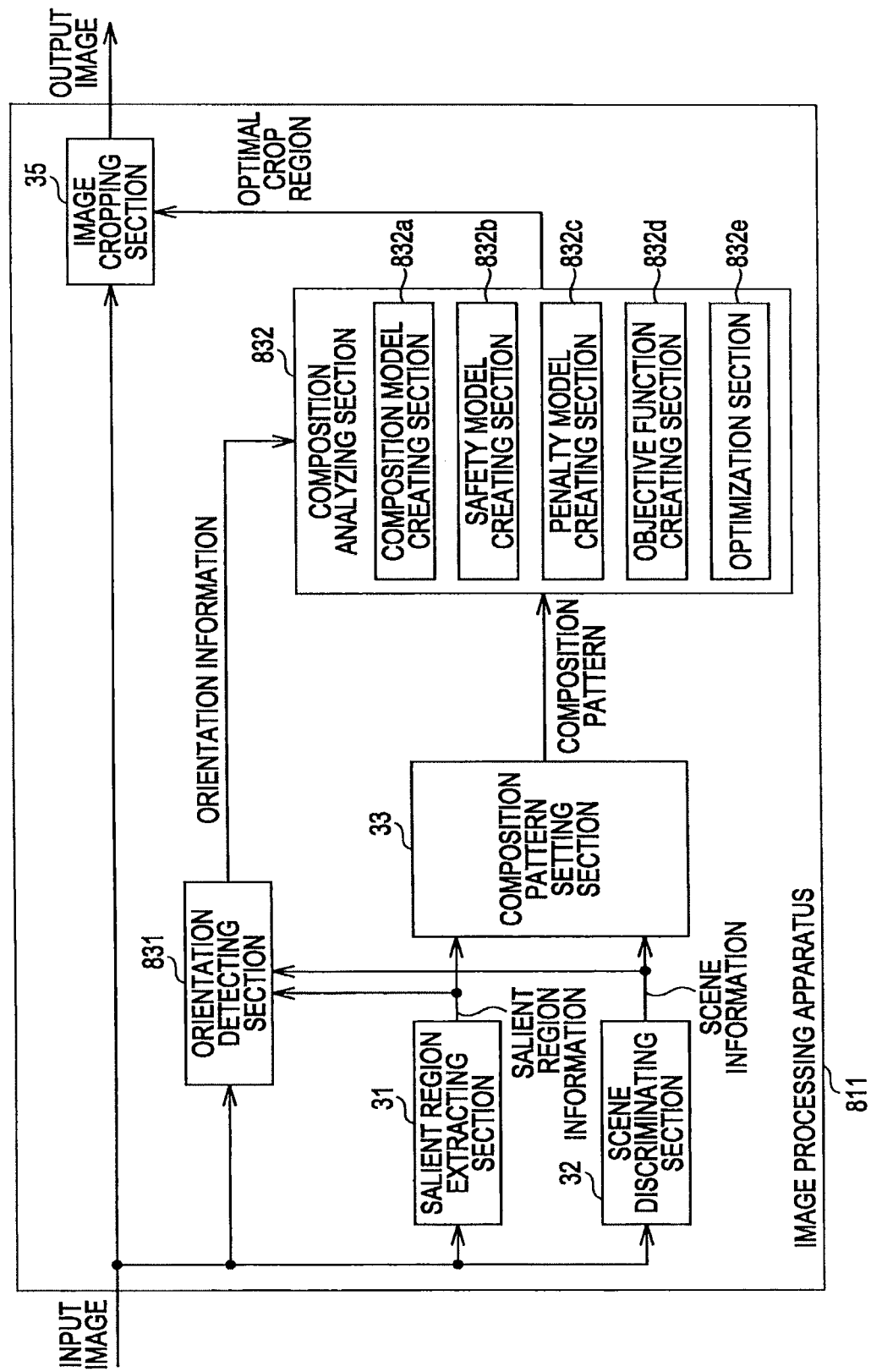
FIG. 34 is a block diagram showing still another configuration example of an image processing apparatus.

FIG. 34 shows a configuration example of an image processing apparatus configured to determine an optimal crop region in accordance with the orientation of a subject. It should be noted that in an image processing apparatus 811 in FIG. 34, components having the same functions as those provided in the image processing apparatus 11 in FIG. 1 are denoted by the same names and the same reference numerals, and description thereof is omitted as appropriate.

That is, the image processing apparatus 811 in FIG. 34 differs from the image processing apparatus 11 in FIG. 1 in that an orientation detecting section 831 is additionally provided, and that a composition analyzing section 832 is provided instead of the composition analyzing section 34.

It should be noted that in FIG. 34, the salient region extracting section 31 extracts a salient region to which attention is directed in an input image, and supplies salient region information indicating the salient region to the composition pattern setting section 33 and the orientation detecting section 831. Also, the scene discriminating section 32 discriminates the scene of an input image, supplies scene information indicating a scene, which is obtained as a result of the discrimination, to the composition pattern setting section 131 together with the input image, and also supplies the scene information to the orientation detecting section 831.

The orientation detecting section 831 detects the orientation of a subject included in the salient region indicated by the salient region information from the salient region extracting section 31, and supplies orientation information indicating the orientation to the composition analyzing section 832.

On the basis of a composition pattern from the composition pattern setting section 33, and the orientation information from the orientation detecting section 831, the composition analyzing section 832 determines an optimal crop region in an input image, for the image to be cropped in the composition pattern, and supplies the optimal crop region to the image cropping section 35.

The composition analyzing section 832 includes a composition model creating section 832a, a safety model creating section 832b, a penalty model creating section 832c, an objective function creating section 832d, and an optimization section 832e. It should be noted that since the composition model creating section 832a through the objective function creating section 832d have the same functions as the composition model creating section 34a through the objective function creating section 34d in FIG. 1, respectively, description thereof is omitted.

The optimization section 832e determines a crop region that minimizes the objective function E, on the basis of the orientation information from the orientation detecting section 831, and supplies the crop region as an optimal crop region to the image cropping section 35.

[Image Cropping Process in Image Processing Apparatus]

Figure 35:
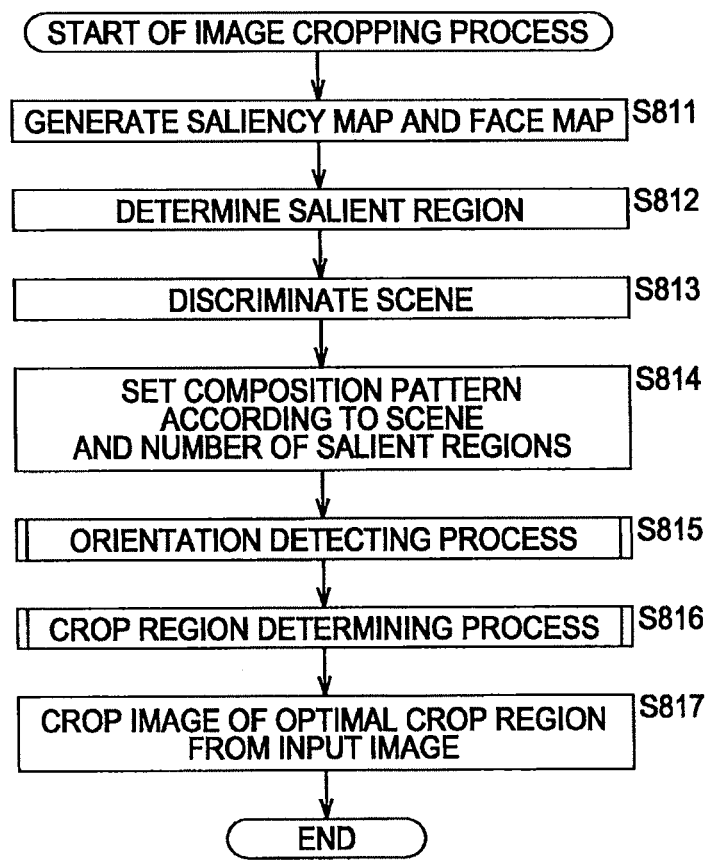
FIG. 35 is a flowchart illustrating an image cropping process in the image processing apparatus in FIG. 34.

Next, referring to the flowchart in FIG. 35, a description will be given of an image cropping process in the image processing apparatus 811 in FIG. 34. It should be noted that since the processes in steps S811 to S814, and S817 in the flowchart in FIG. 35 are the same as the processes in steps S11 to S14, and S16 described with reference to the flowchart in FIG. 3, description thereof is omitted. Also, in the image cropping process described with reference to the flowchart in FIG. 35, it is assumed that the number of subjects, that is, the number of salient regions is 1.

That is, in step S815, the orientation detecting section 831 executes an orientation detecting process to detect the orientation of a subject included in a salient region indicated by salient region information from the salient region extracting section 31, in an input image.

[Orientation Detecting Process in Orientation Detecting Section]

Figure 36:
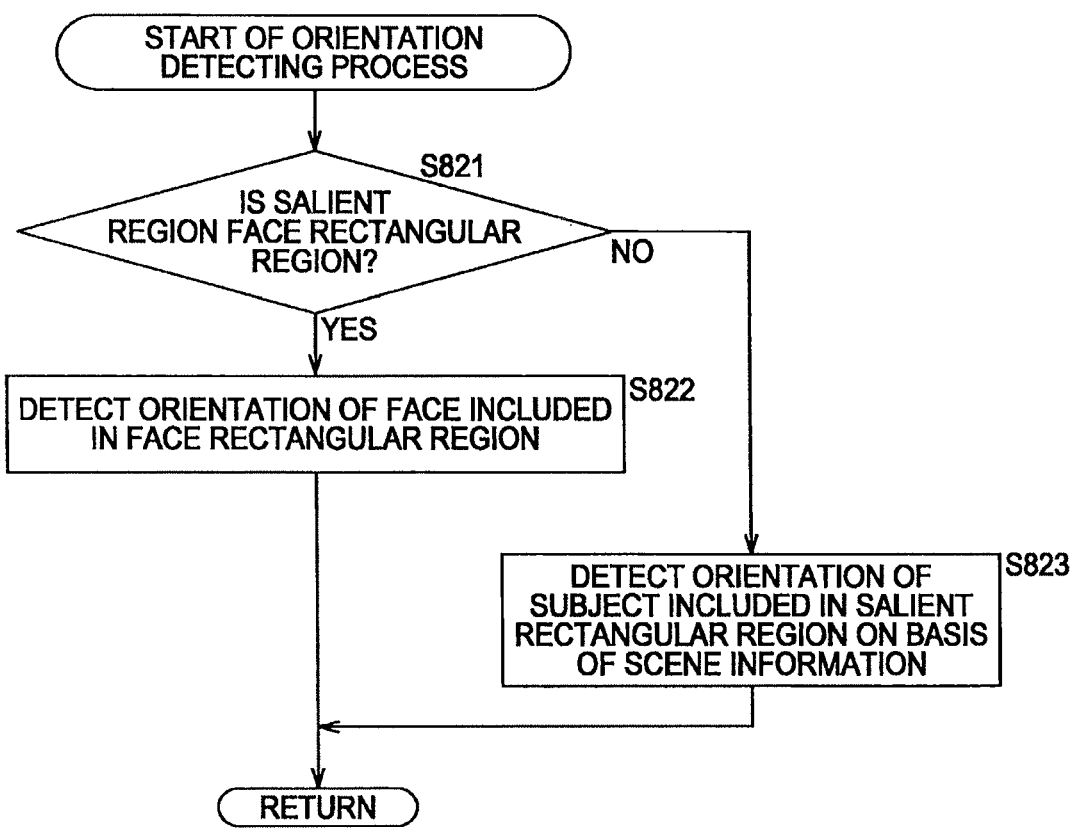
FIG. 36 is a flowchart illustrating an orientation detecting process.

Here, referring to the flowchart in FIG. 36, a description will be given of an orientation detecting process in step S815 in the flowchart in FIG. 35.

In step S821, the orientation detecting section 831 judges whether or not a salient region indicated by salient region information from the salient region extracting section 31 is a face rectangular region.

If it is judged in step S821 that the salient region is a face rectangular region, that is, if the salient region information from the salient region extracting section 31 is face-rectangular-region information, the processing proceeds to step S822.

In step S822, the orientation detecting section 831 detects the orientation of a face included in the face rectangular region indicated by the face-rectangular-region information in an input image, and supplies orientation information indicating the orientation to the composition analyzing section 832.

More specifically, for example, in a tree structure formed by previously learning face images oriented in various orientations as learning samples, the orientation detecting section 831 repeats discriminations with respect to the image of a face included in a face rectangular region, from the most upstream node toward the terminal node of the tree structure, thereby identifying (detecting) the orientation of the face. For example, the orientation detecting section 831 previously learns face images orientated in nine directions, front, up, down-left, right, up-right, down-right, up-left, and down-left, and selects the orientation of the face included in the face rectangular region from among the nine directions.

It should be noted that the orientation detecting section 831 may of course detect the orientation of a face by not only the above-mentioned technique but also other techniques.

On the other hand, if it is judged in step S821 that the salient region is not a face rectangular region, that is, if salient region information from the salient region extracting section 31 is salient-rectangular-region information, the processing proceeds to step S823.

In step S823, on the basis of scene information from the scene discriminating section 32, the orientation detecting section 831 detects the orientation of a subject included in the salient rectangular region indicated by the salient rectangular region information in the input image, and supplies orientation information indicating the orientation to the composition analyzing section 832.

More specifically, the orientation detecting section 831 stores, for every scene, templates including images in which objects that can exist in the scene are orientated in nine directions, front, up, down-left, right, up-right, down-right, up-left, and down-left, retrieves the template of an object corresponding to a subject included in a salient rectangular region, from among templates according to a scene indicated by the scene information from the scene discriminating section 32, and performs template matching on the basis of the retrieved template, thereby identifying (detecting) the orientation of the subject included in the salient rectangular region.

For example, if the scene indicated by the scene information from the scene discriminating section 32 is "Grassy Land", and the subject included in the salient rectangular region is "Flower", the orientation detecting section 831 retrieves the template of "Flower" from the templates for "Grassy Land", and performs template matching on the basis of the template, thereby identifying the orientation of the "Flower" as a subject.

It should be noted that the orientation detecting section 831 may of course detect the orientation of a subject by not only the above-mentioned technique but also other techniques.

Also, in the foregoing, the orientation detecting section 831 identifies a subject and its orientation by using the template of an object corresponding to the subject from among templates corresponding to scene information. However, for example, the orientation detecting section 831 may also judge whether or not a target object is present in an input image on the basis of a feature quantity in the input image, by using a recognizer for recognizing the target object, which is generated by executing a statistical learning process on the basis of a feature quantity, thereby identifying a subject and its orientation.

In the manner mentioned above, the orientation detecting section 831 detects the orientation of a subject included in a salient region in an input image.

Returning to the flowchart in FIG. 35, in step S816, the composition analyzing section 832 executes a crop region determining process on the basis of a composition pattern from the composition pattern setting section 33, and orientation information from the orientation detecting section 831, and determines an optimal crop region in an input image, for the image to be cropped in the composition pattern.

[Crop Region Determining Process in Composition Analyzing Section]

Here, referring to the flowchart in FIG. 37, a description will be given of a crop region determining process in step S816 in the flowchart in FIG. 35.

Figure 37:
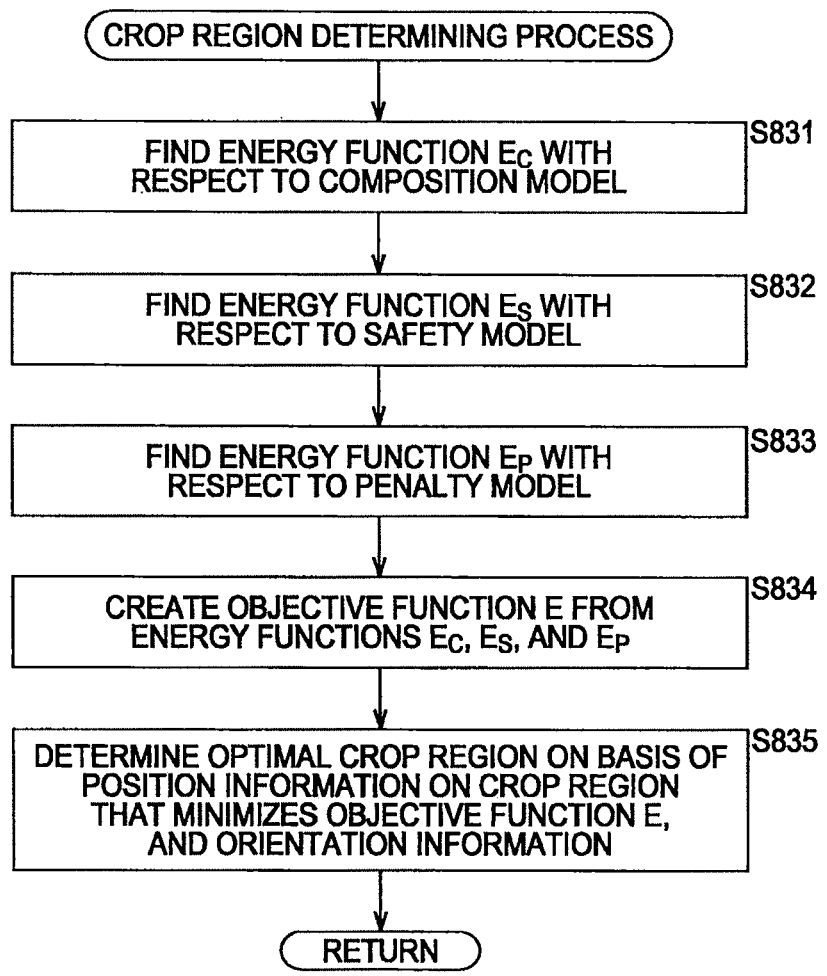
FIG. 37 is a flowchart illustrating an image cropping process in the image processing apparatus in FIG. 34.

It should be noted that since the processes in steps S831 to S834 in the flowchart in FIG. 37 are the same as the processes in steps S31 to S34 described with reference to the flowchart in FIG. 7, description thereof is omitted.

That is, in step S835, the optimization section 832*e* determines an optimal crop region on the basis of position information on a crop region that minimizes the objective function E, and orientation information from the orientation detecting section 831, and supplies the optimal crop region to the image cropping section 35.

Figure 38:
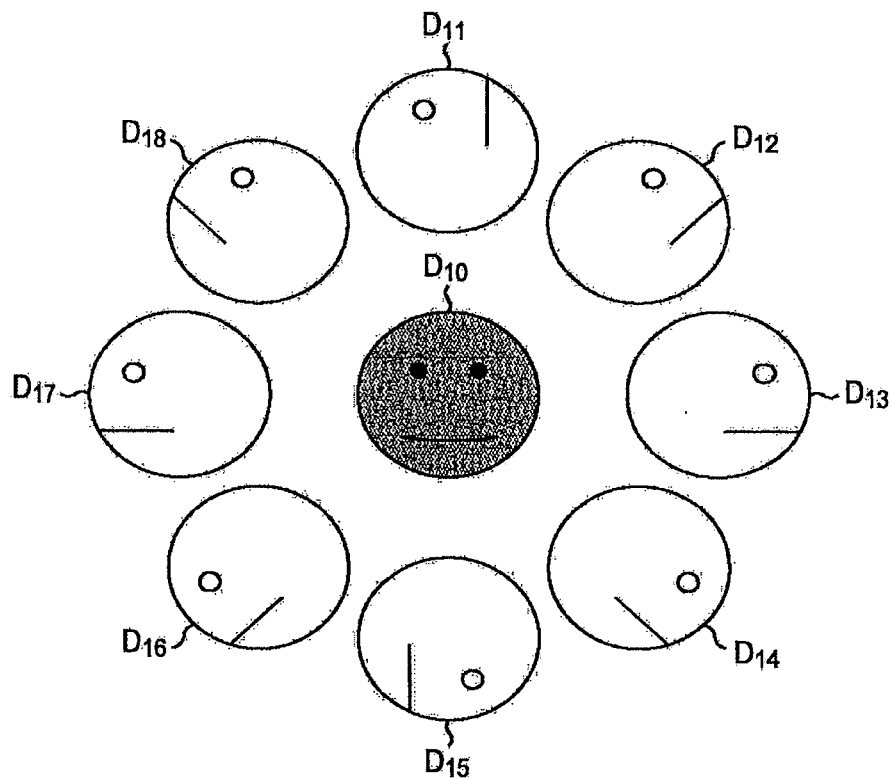
FIG. 38 is a diagram illustrating orientation information.

If a subject included in a salient region is a face, for example, one of pieces of orientation information $D_{10}$ to $D_{18}$ shown in FIG. 38 is supplied from the orientation detecting section 831 to the optimization section 832*e*. In FIG. 38, when facing the drawing, faces $D_{10}$ to $D_{18}$ that are respectively oriented front, up, up-right, right, down-right, down, down-left, left, and up-left are shown, each of which corresponding to orientation information indicating the orientation in which the face is orientated. That is, the orientation information $D_{10}$ indicates that the face is oriented front in the input image, the orientation information $D_{11}$ indicates that the face is oriented up, and the orientation information $D_{12}$ indicates that the face is oriented up-right. Likewise, the orientation information $D_{13}$ indicates that the face is oriented right, and the orientation information $D_{14}$ indicates that the face is oriented down-right. Also, the orientation information $D_{15}$ indicates that the face is oriented down, the orientation information $D_{16}$ indicates that the face is oriented down-left, the orientation information $D_{17}$ indicates that the face is oriented left, and the orientation information $D_{18}$ indicates that the face is oriented up-left.

Here, assuming that the thirds composition is set as a composition pattern, the optimization section 832*e* determines the placement of the subject (face) in the thirds composition in accordance with the orientation information $D_{10}$ to $D_{18}$, finds position information on a crop region that minimizes the objective function E, and determines an optimal crop region on the basis of the position information.

Figure 39:
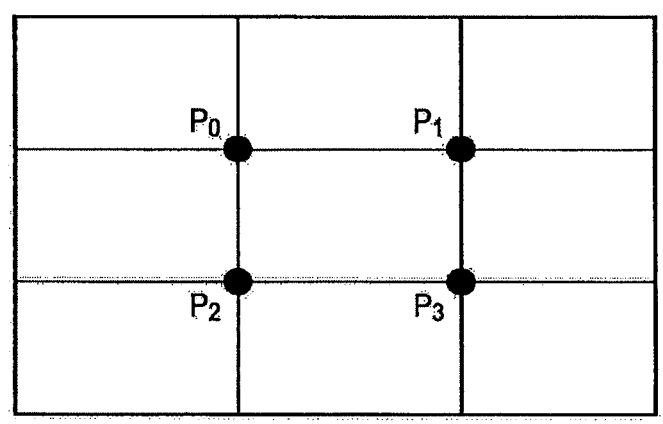
FIG. 39 is a diagram illustrating a thirds composition.

More specifically, for example, when orientation information is one of the orientation information $D_{13}$ and $D_{14}$, that is, when the face is oriented right or down-right, the optimization section 832*e* determines the placement of the face in the thirds composition shown in FIG. 39 to be on a thirds line intersection $P_0$. Also, when orientation information is one of the orientation information $D_{16}$ and $D_{17}$, that is, when the face is oriented down-left or left, the optimization section 832*e* determines the placement of the face in the thirds composition shown in FIG. 39 to be on a thirds line intersection $P_1$. Further, when orientation information is the orientation information $D_{12}$, that is, when the face is oriented up-right, the optimization section 832*e* determines the placement of the face in the thirds composition shown in FIG. 39 to be on a thirds line intersection $P_2$. Also, when orientation information is the orientation information $D_{18}$, that is, when the face is oriented up-left, the optimization section 832*e* determines the placement of the face in the thirds composition shown in FIG. 39 to be on a thirds line intersection $P_3$.

It should be noted that when orientation information is one of the orientation information $D_{10}$ and $D_{15}$, that is, when the face is oriented front or down, the optimization section 832*e* determines the placement of the face in the thirds composition shown in FIG. 39 to be on one of the thirds line intersections $P_0$ and $P_1$. Also, when orientation information is the orientation information $D_{11}$, that is, when the face is oriented up, the optimization section 832*e* determines the placement of the face in the thirds composition shown in FIG. 39 to be on one of the thirds line intersections $P_2$ and $P_3$. In this way, when two or more face placements are selected with respect to orientation information, the placement is determined to be the one that gives the smaller objective function E.

Here, the reason why there are less pieces of orientation information serving as the conditions for placing the face on the thirds line intersections $P_2$ and $P_3$ on the lower side among the thirds line intersections $P_0$ to $P_3$ in FIG. 39 is that when the subject is an entire person, it is natural for the face to be positioned toward the upper side in the composition. However, the correspondence between each orientation information and thirds line intersection can be changed arbitrarily.

In the manner as mentioned above, the optimization section 832*e* determines the placement of a face in the thirds composition in accordance with the orientation of the face. In particular, the optimization section 832*e* determines the placement of a face in such a way that the space on the side to which the face is orientated becomes large in the thirds composition. Thus, an object or landscape that lies ahead of a person's face (line of sight) as a subject can be included in the crop region, thereby making it possible to crop an image with an optimal composition which gives a greater sense of expanse.

Figure 40:
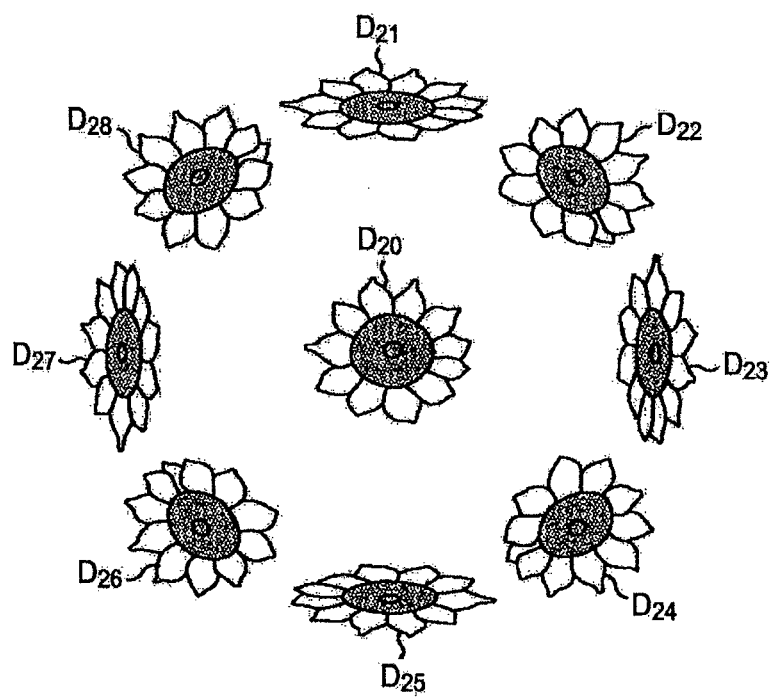
FIG. 40 is a diagram illustrating orientation information.

Also, if a subject included in a salient region is a flower, for example, one of pieces of orientation information $D_{20}$ to $D_{28}$ shown in FIG. 40 is supplied from the orientation detecting section 831 to the optimization section 832e. In FIG. 40, when facing the drawing, flowers $D_{20}$ to $D_{28}$ that are respectively oriented front, up, up-right, right, down-right, down, down-left, left, and up-left are shown, each of which corresponding to orientation information indicating the orientation in which the flower is orientated. That is, the orientation information $D_{20}$ indicates that the flower is oriented front in the input image, the orientation information $D_{21}$ indicates that the flower is oriented up, and the orientation information $D_{22}$ indicates that the flower is oriented up-right. Likewise, the orientation information $D_{23}$ indicates that the flower is oriented right, and the orientation information $D_{24}$ indicates that the flower is oriented down-right. Also, the orientation information $D_{25}$ indicates that the flower is oriented down, the orientation information $D_{26}$ indicates that the flower is oriented down-left, the orientation information $D_{27}$ indicates that the flower is oriented left, and the orientation information $D_{28}$ indicates that the flower is oriented up-left.

Then, assuming that the thirds composition is set as a composition pattern, the optimization section 832e determines the placement of the subject (flower) in the thirds composition in accordance with the orientation information $D_{20}$ to $D_{28}$, finds position information on a crop region that minimizes the objective function E, and determines an optimal crop region on the basis of the position information.

More specifically, for example, when orientation information is the orientation information $D_{24}$, that is, when the flower is oriented down-right, the optimization section 832e determines the placement of the flower in the thirds composition shown in FIG. 39 to be on the thirds line intersection $P_0$. Also, when orientation information is the orientation information $D_{26}$, that is, when the flower is oriented down-left, the optimization section 832e determines the placement of the flower in the thirds composition shown in FIG. 39 to be on the thirds line intersection $P_1$. Further, when orientation information is one of the orientation information $D_{22}$ and $D_{23}$, that is, when the flower is oriented up-right or right, the optimization section 832e determines the placement of the flower in the thirds composition shown in FIG. 39 to be on the thirds line intersection $P_2$. Also, when orientation information is one of the orientation information $D_{27}$ and $D_{28}$, that is, when the flower is oriented left or up-left, the optimization section 832e determines the placement of the flower in the thirds composition shown in FIG. 39 to be on the thirds line intersection $P_3$.

It should be noted that when orientation information is the orientation information $D_{25}$, that is, when the flower is oriented down, the optimization section 832e determines the placement of the flower in the thirds composition shown in FIG. 39 to be on one of the thirds line intersections $P_0$ and $P_1$. Also, when orientation information is one of the orientation information $D_{20}$ and $D_{21}$, that is, when the flower is oriented front or up, the optimization section 832e determines the placement of the flower in the thirds composition shown in FIG. 39 to be on one of the thirds line intersections $P_2$ and $P_3$. In this way, when two or more flower placements are selected with respect to orientation information, the placement is determined to be the one that gives the smaller objective function E.

Here, the reason why there are less pieces of orientation information serving as the conditions for placing the flower on the thirds line intersections $P_0$ and $P_1$ on the upper side among the thirds line intersections $P_0$ to $P_3$ in FIG. 39 is that it is natural for the flower to be positioned toward the lower side in the composition. However, the correspondence between each orientation information and thirds line intersection on which the flower is to be placed can be changed arbitrarily.

In the manner as mentioned above, the optimization section 832e determines the placement of a flower in the thirds composition in accordance with the orientation of the flower. In particular, the optimization section 832e determines the placement of a flower in such a way that the space on the side to which the flower is orientated becomes large in the thirds composition. Thus, an object or landscape that lies ahead of the flower as a subject can be included in the crop region, thereby making it possible to crop an image with an optimal composition which gives a greater sense of expanse.

While in the foregoing the description is directed to the configuration in which an optimal crop region is determined in accordance with the orientation of a subject, an optimal crop region may be determined in accordance with the motion of a subject as well.

10. Tenth Embodiment

[Configuration Example of Image Processing Apparatus]

Figure 41:
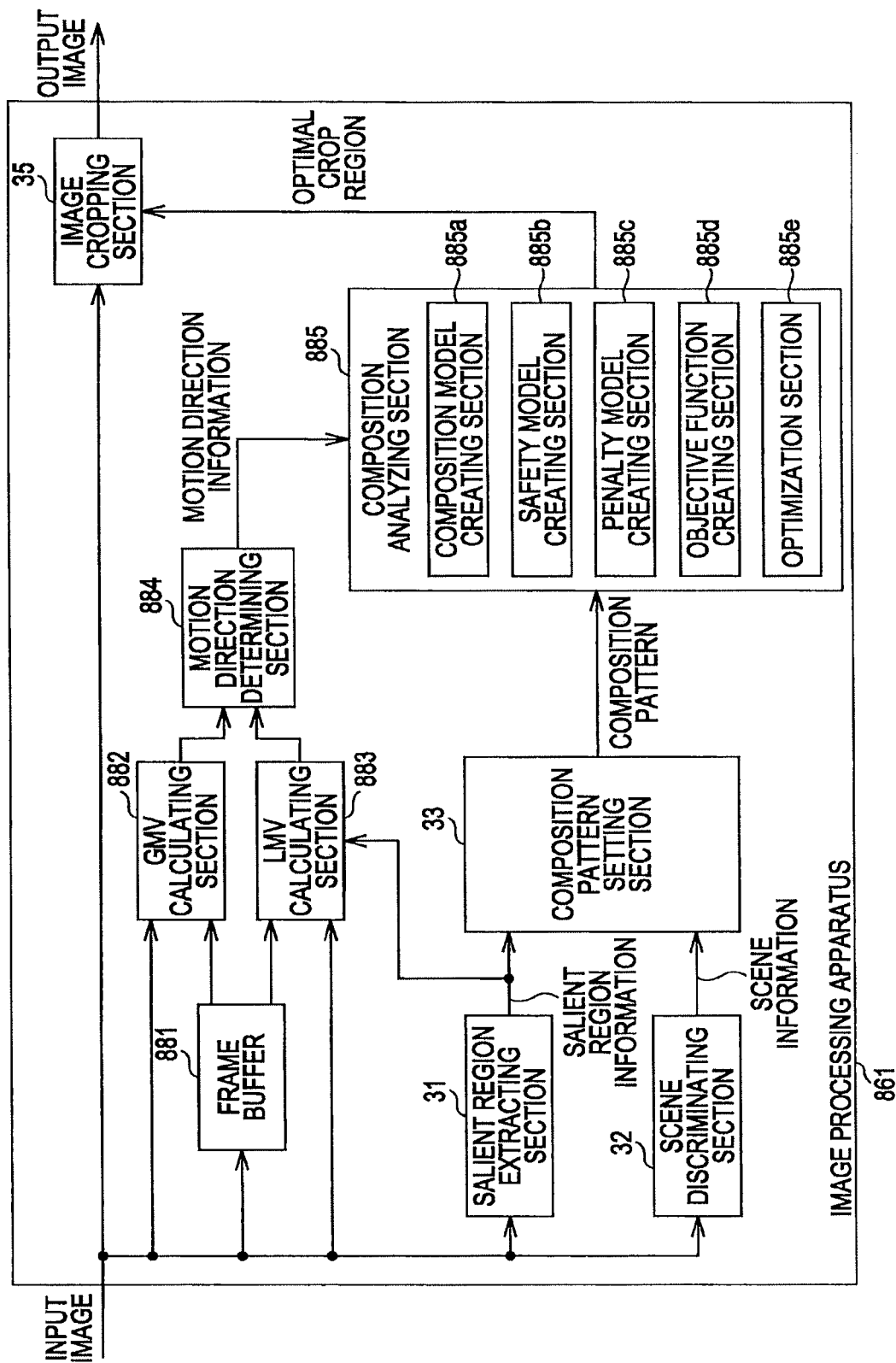
FIG. 41 is a block diagram showing still another configuration example of an image processing apparatus.

FIG. 41 shows a configuration example of an image processing apparatus configured to determine an optimal crop region in accordance with the motion of a subject. It should be noted that in an image processing apparatus 861 in FIG. 41, components having the same functions as those provided in the image processing apparatus 11 in FIG. 1 are denoted by the same names and the same reference numerals, and description thereof is omitted as appropriate.

That is, the image processing apparatus 861 in FIG. 41 differs from the image processing apparatus 11 in FIG. 1 in that a frame buffer 881, a GMV (Global Motion Vector) calculating section 882, an LMV (Local Motion Vector) calculating section 883, and a motion direction determining section 884 are additionally provided, and that a composition analyzing section 885 is provided instead of the composition analyzing section 34.

It should be noted that in FIG. 41, the salient region extracting section 31 extracts a salient region to which attention is directed in an input image, and supplies salient region information indicating the salient region to the composition pattern setting section 33 and the LMV calculating section 883.

The frame buffer 881 holds one frame's worth of input image, and supplies the input image to the GMV calculating section 882 and the LMV calculating section 883.

The GMV calculating section 882 calculates GMV indicating the motion of an image as a whole, from the input image and the input image of the immediately previous frame from the frame buffer 881 (hereinafter, referred to as "previous-frame input image"), and supplies the GMV to the motion direction determining section 884.

The LMV calculating section 883 calculates LMV indicating a local motion in a salient region indicated by salient region information from the salient region extracting section 31, from the input image and the previous-frame input image from the frame buffer 881, and supplies the LMV to the motion direction determining section 884.

The motion direction determining section 884 determines the direction of motion (motion direction) of a subject included in a salient region, on the basis of the GMV from the GMV calculating section 882 and the LMV from the LMV calculating section 883, and supplies motion direction information indicating the motion direction to the composition analyzing section 885.

On the basis of a composition pattern from the composition pattern setting section 33, and the motion direction information from the motion direction determining section 884, the composition analyzing section 885 determines an optimal crop region in the input image, for the image to be cropped in the composition pattern, and supplies the optimal crop region to the image cropping section 35.

The composition analyzing section 885 includes a composition model creating section 885a, a safety model creating section 885b, a penalty model creating section 885c, an objective function creating section 885d, and an optimization section 885e. It should be noted that since the composition model creating section 885a through the objective function creating section 885d have the same functions as the composition model creating section 34a through the objective function creating section 34d in FIG. 1, respectively, description thereof is omitted.

The optimization section 885e determines a crop region that minimizes the objective function E, on the basis of the motion direction information from the motion direction determining section 884, and supplies the crop region as an optimal crop region to the image cropping section 35.

[Image Cropping Process in Image Processing Apparatus]

Figure 42:
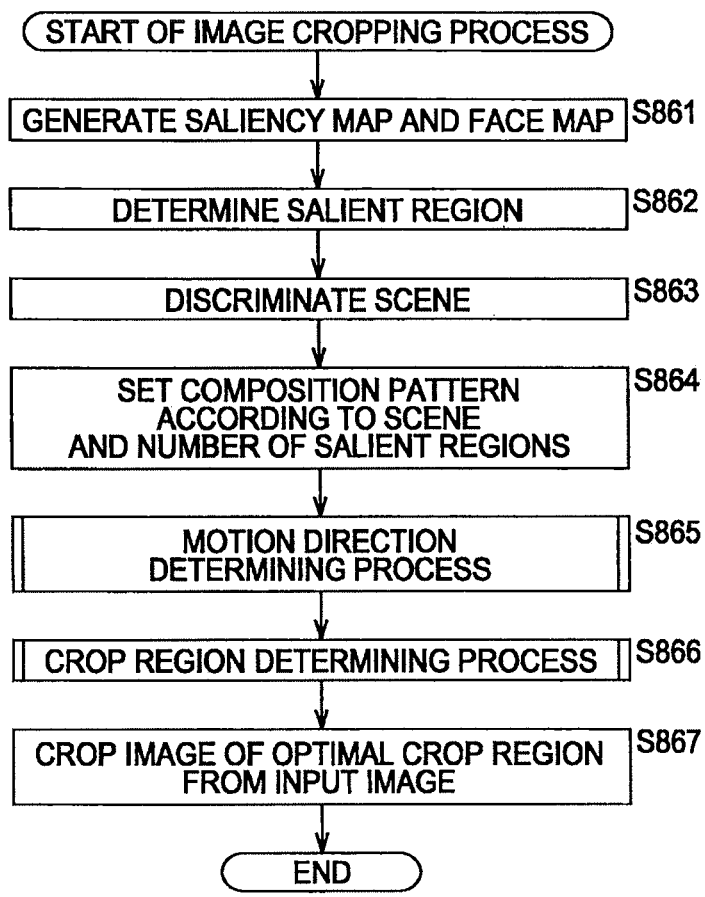
FIG. 42 is a flowchart illustrating an image cropping process in the image processing apparatus in FIG. 41.

Next, referring to the flowchart in FIG. 42, a description will be given of an image cropping process in the image processing apparatus 861 in FIG. 41. It should be noted that since the processes in steps S861 to S864, and S867 in the flowchart in FIG. 42 are the same as the processes in steps S11 to S14, and S16 described with reference to the flowchart in FIG. 3, description thereof is omitted. Also, in the image cropping process described with reference to the flowchart in FIG. 42, it is assumed that the number of subjects, that is, the number of salient regions is 1.

That is, in step S865, the motion direction determining section 884 executes a motion direction determining process to determine the motion direction of a subject included in a salient region indicated by salient region information from the salient region extracting section 31, in an input image.

[Motion Direction Determining Process in Motion Direction Determining Section]

Figure 43:
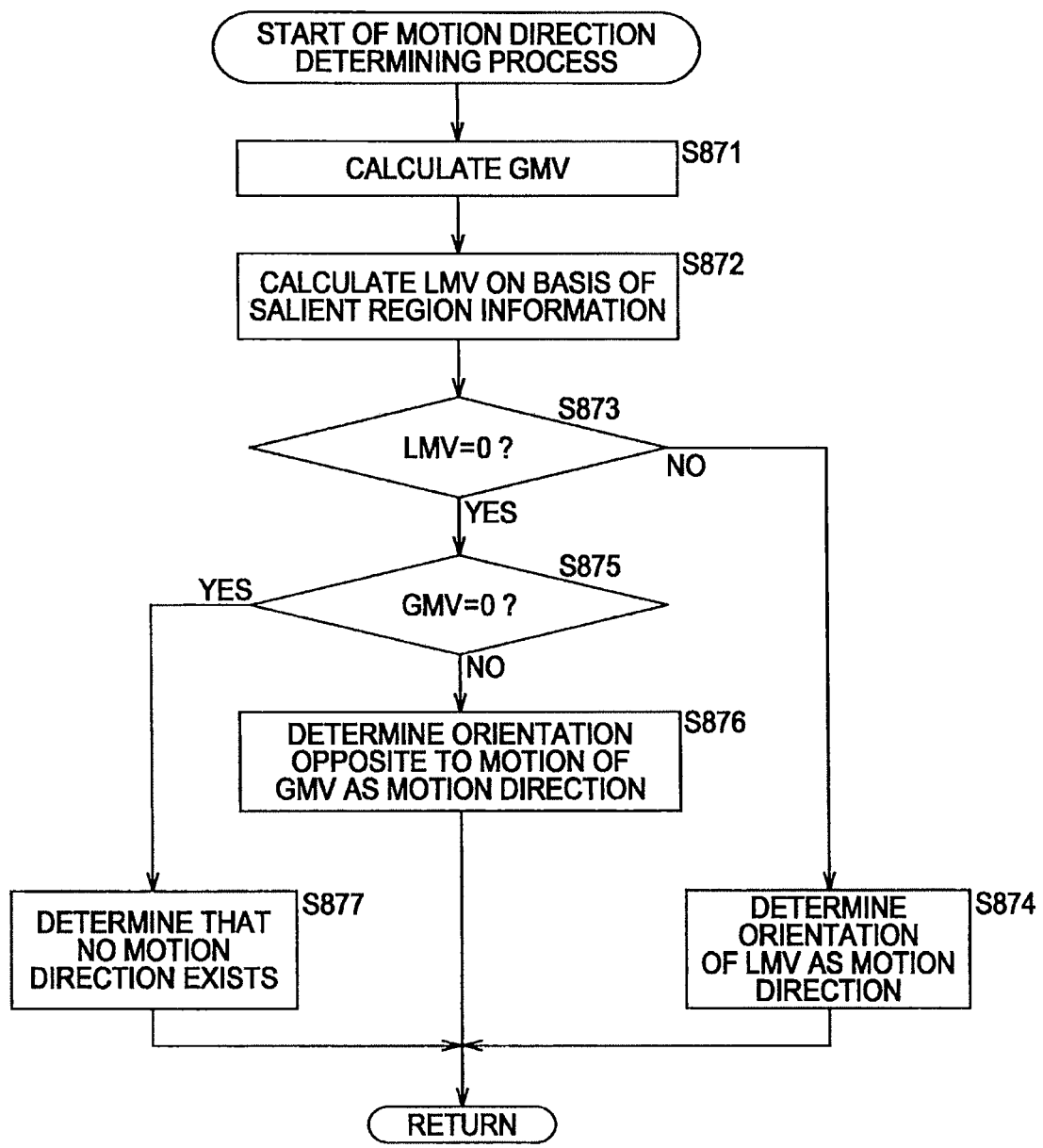
FIG. 43 is a flowchart illustrating a motion direction determining process.

Here, referring to the flowchart in FIG. 43, a description will be given of a motion direction determining process in step S865 in the flowchart in FIG. 42.

In step S871, the GMV calculating section 882 computes GMV from an input image, and a previous-frame input image from the frame buffer 881, and supplies the GMV to the motion direction determining section 884.

In step S872, the LMV calculating section 883 calculates the LMV of a salient region indicated by salient region information from the salient region extracting section 31, from the input image and the previous-frame input image from the frame buffer 881, and supplies the LMV to the motion direction determining section 884.

In step S873, the motion direction determining section 884 judges whether or not the LMV is 0 or substantially O.

If it is judged in step S873 that the LMV is not 0 or substantially 0, that is, if there is sufficient motion in the subject included in the salient region, the processing proceeds to step S874, and the motion direction determining section 884 determines the orientation of the LMV as the motion direction, and supplies motion direction information indicating the motion direction to the composition analyzing section 885.

On the other hand, if it is judged in step S873 that the LMV is 0 or substantially 0, that is, if there is absolutely or substantially no motion in the subject included in the salient region, the processing proceeds to step S875, and the motion direction determining section 884 judges whether or not the GMV is 0 or substantially O.

If it is judged in step S875 that the GMV is not 0 or substantially 0, that is, if there is sufficient motion in the image as a whole, the processing proceeds to step S876, and the motion direction determining section 884 determines an orientation opposite to the orientation of the GMV as the motion direction of the subject, and supplies motion direction information indicating the motion direction to the composition analyzing section 885.

The state in step S875 represents a state in which although there is motion in the input image as a whole, there is no motion in the subject included in the salient region, for example, a state in which the background is moving while the subject remains still. In this case, the subject is moving in an orientation opposite to the orientation of the motion of the background, relative to the background. That is, relatively speaking, an orientation opposite to the orientation of the GMV is the motion direction of the subject.

On the other hand, if it is judged in step S875 that the GMV is 0 or substantially 0, that is, if there is absolutely or substantially no motion in the image as a whole, the processing proceeds to step S877, and the motion direction determining section 884 determines that no motion direction exists, and supplies motion direction information indicating that no motion direction exists to the composition analyzing section 885.

In the manner as mentioned above, the motion direction determining section 884 determines the motion direction of a subject included in a salient region in an input image. It should be noted that in the above process, the motion direction determining section 884 determines the motion direction to be, for example, one of the following nine kinds: none, up, down, left, right, up-right, down-right, up-left, and down-left.

Returning to the flowchart in FIG. 42, in step S866, the composition analyzing section 885 executes a crop region determining process on the basis of a composition pattern from the composition pattern setting section 33, and motion direction information from the motion direction determining section 884, and determines an optimal crop region in an input image, for the image to be cropped in the composition pattern.

[Crop Region Determining Process in Composition Analyzing Section]

Here, referring to the flowchart in FIG. 44, a description will be given of a crop region determining process in step S866 in the flowchart in FIG. 42.

Figure 44:
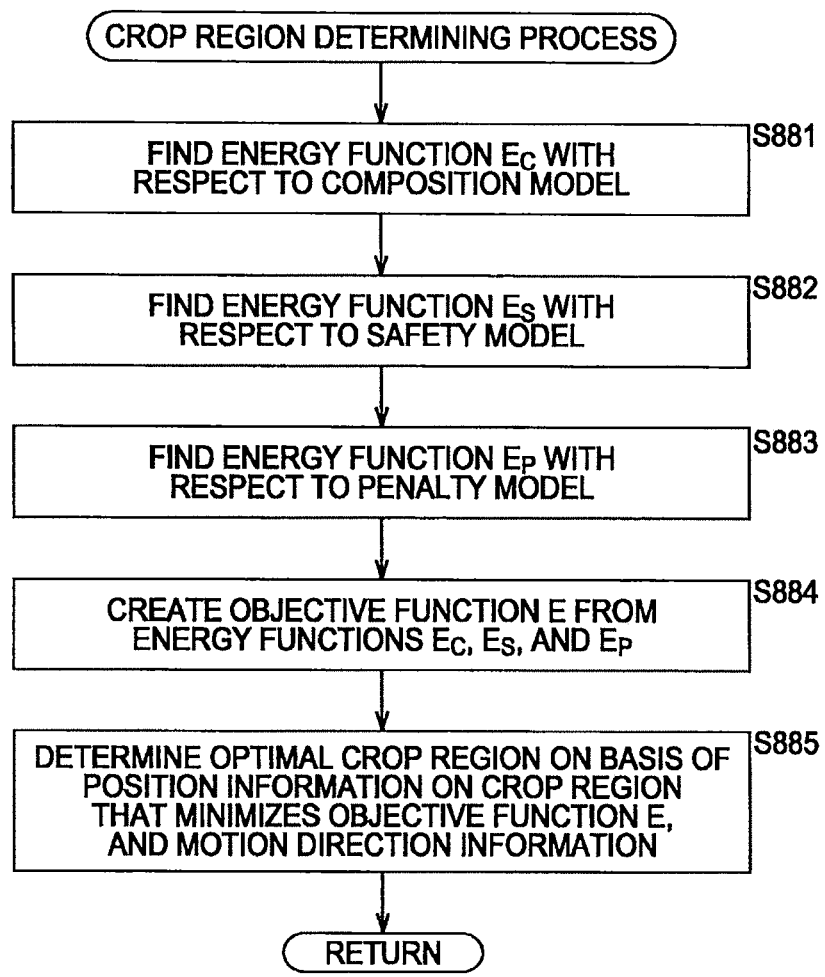
FIG. 44 is a flowchart illustrating an image cropping process in the image processing apparatus in FIG. 41.

It should be noted that since the processes in steps S881 to S884 in the flowchart in FIG. 44 are the same as the processes in steps S31 to S34 described with reference to the flowchart in FIG. 7, description thereof is omitted.

That is, in step S885, the optimization section 885e determines an optimal crop region on the basis of position information on a crop region that minimizes the objective function E, and motion direction information from the motion direction determining section 884, and supplies the optimal crop region to the image cropping section 35.

Figure 45:
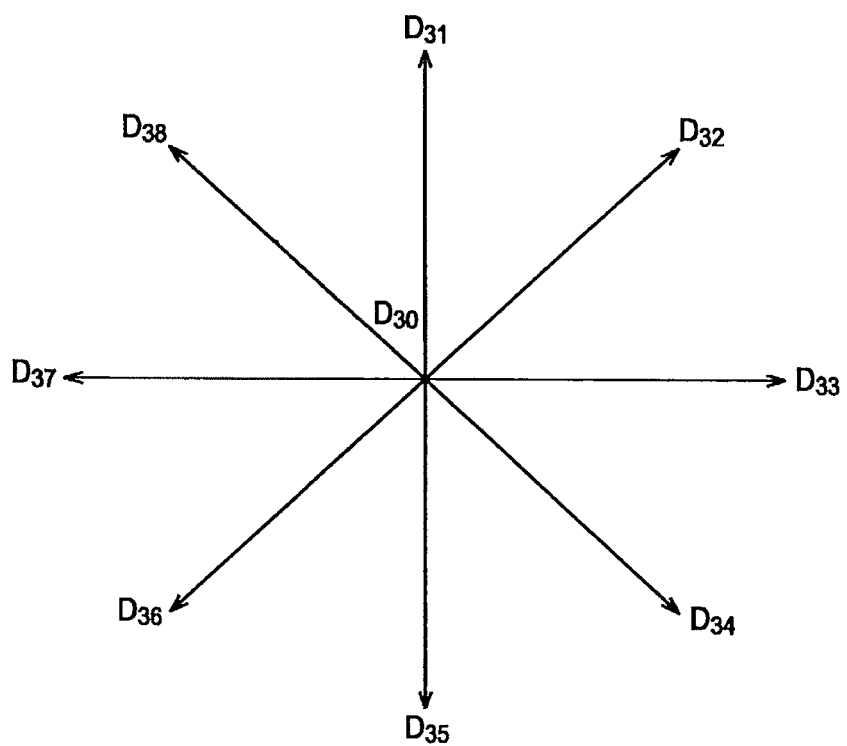
FIG. 45 is a diagram illustrating motion direction information.

More specifically, for example, one of pieces of motion direction information $D_{30}$ to $D_{38}$ shown in FIG. 45 is supplied from the motion direction detecting section 884 to the optimization section 885e. In FIG. 45, arrows indicating motions in up, up-right, right, down-right, down, down-left, left, and up-left directions are shown, the arrows including their starting points respectively corresponding to the motion direction information $D_{30}$ to $D_{38}$. That is, the motion direction information $D_{30}$ indicates that no subject's motion direction exists in the input image, the motion direction information $D_{31}$ indicates that the motion direction is up, and the motion direction information $D_{32}$ indicates that the motion direction is up-right. Likewise, the motion direction information $D_{33}$ indicates that the motion direction is right, and the motion direction information $D_{34}$ indicates that the motion direction is down-right. Also, the motion direction information $D_{35}$ indicates that the motion direction is down, the motion direction information $D_{36}$ indicates that the motion direction is down-left, the motion direction information $D_{37}$ indicates that the motion direction is left, and the motion direction information $D_{38}$ indicates that the motion direction is up-left.

Here, assuming that the thirds composition (FIG. 39) is set as a composition pattern, the optimization section 885e determines the placement of a subject in the thirds composition in accordance with the motion direction information $D_{30}$ to $D_{38}$, finds position information on a crop region that minimizes the objective function E, and determines an optimal crop region on the basis of the position information.

More specifically, for example, when motion direction information is the motion direction information $D_{34}$, that is, when the subject's motion direction is down-right, the optimization section 885e determines the placement of the subject in the thirds composition shown in FIG. 39 to be on the thirds line intersection $P_0$. Also, when motion direction information is the motion direction information $D_{36}$, that is, when the subject's motion direction is down-left, the optimization section 885e determines the placement of the subject in the thirds composition shown in FIG. 39 to be on the thirds line intersection $P_1$. Further, when motion direction information is one of the motion direction information $D_{32}$, that is, when the subject's motion direction is up-right, the optimization section 885e determines the placement of the subject in the thirds composition shown in FIG. 39 to be on the thirds line intersection $P_2$. Also, when motion direction information is $D_{38}$, that is, when the subject's motion direction is up-left, the optimization section 885e determines the placement of the subject in the thirds composition shown in FIG. 39 to be on the thirds line intersection $P_3$.

It should be noted that when motion direction information is the motion direction information $D_{31}$, that is, when the subject's motion direction is up, the optimization section 885e determines the placement of the subject in the thirds composition shown in FIG. 39 to be on one of the thirds line intersections $P_2$ and $P_3$. Also, when motion direction information is the motion direction information $D_{33}$, that is, when the subject's motion direction is right, the optimization section 885e determines the placement of the subject in the thirds composition shown in FIG. 39 to be on one of the thirds line intersections $P_0$ and $P_2$. Further, when motion direction information is the motion direction information $D_{35}$, that is, when the subject's motion direction is down, the optimization section 885e determines the placement of the subject in the thirds composition shown in FIG. 39 to be on one of the thirds line intersections $P_0$ and $P_1$. Also, when motion direction information is the motion direction information $D_{37}$, that is, when the subject's motion direction is left, the optimization section 885e determines the placement of the subject in the thirds composition shown in FIG. 39 to be on one of the thirds line intersections $P_1$ and $P_3$.

Also, when motion direction information is the motion direction information $D_{30}$, that is, when no subject's motion direction exists, the optimization section 885e determines the placement of the subject in the thirds composition shown in FIG. 39 to be on one of the thirds line intersections $P_0$ to $P_3$. That is, when there is no motion in the subject, the placement of the subject in the thirds composition may be any one of the thirds line intersections.

In this way, when two or more subject placements are selected with respect to motion direction information, the placement is determined to be the one that gives the smaller objective function E.

In the manner as mentioned above, the optimization section 885e determines the placement of a subject in the thirds composition in accordance with the motion direction of the subject. In particular, the optimization section 885e determines the placement of a subject in such a way that the space in the direction to which the subject moves becomes large in the thirds composition. Thus, an object or landscape that lies ahead in the direction of movement of the subject can be included in the crop region, thereby making it possible to crop an image with an optimal composition which gives a greater sense of expanse.

It should be noted that while in the foregoing the description is directed to the placement of a subject in the thirds composition (FIG. 39), it is also possible to place a subject in accordance with the orientation or motion of the subject in not only the thirds composition but also in other compositions such as the contrasting composition (Composition B) and the pattern composition (Composition H) shown in FIG. 6.

Also, while in the foregoing the description is based on the assumption that the number of subjects, that is, the number of salient regions is 1, even when the number of subjects is two or more, the two or more subjects are placed in accordance with their respective orientations or motion directions.

The series of processes described above can be either executed by hardware or executed by software. If the series of processes is to be executed by software, a program constituting the software is installed into a computer embedded in dedicated hardware, or into, for example, a general purpose personal computer or the like that can execute various functions when installed with various programs, from a program-recording medium.

FIG. 46 is a block diagram showing a hardware configuration example of a computer that executes the above-mentioned series of processes.

In the computer, a CPU (Central Processing Unit) 901, a ROM (Read Only Memory) 902, and a RAM (Random Access Memory) 903 are connected to each other via a bus 904.

The bus 904 is further connected with an input/output interface 905. The input/output interface 905 is connected with an input section 906 made of a keyboard, a mouse, a microphone, or the like, an output section 907 made of a display, a speaker, or the like, a storing section 908 made of a hard disk, a non-volatile memory, or the like, a communication section 909 made of a network interface or the like, and a drive 910 for driving removable media 911 such as a magnetic disc, an optical disc, a magneto-optical disc, or a semiconductor memory.

In the computer configured as described above, the above-mentioned series of processes is performed by the CPU 901 loading a program stored in the storing section 908 into the RAM 903 via the input/output interface 905 and the bus 904, and executing the program, for example.

The program executed by the computer (CPU 901) is provided by being recorded on the removable media 911 that is package media made of, for example, a magnetic disc (including a flexible disc), an optical disc (such as a CD-ROM (Compact Disc-Read Only Memory) or a DVD (Digital Versatile Disc)), a magneto-optical disc, or a semiconductor memory or the like, or via a wired or wireless transmission medium such as a local area network, Internet, or digital satellite broadcast.

Then, the program can be installed into the storing section 908 via the input/output interface 905, by mounting the removable media 911 in the drive 910. Also, the program can be received by the communication section 909 via a wired or wireless transmission medium, and installed into the storing section 908. Alternatively, the program can be pre-installed into the ROM 902 or the storing section 908.

It should be noted that the program executed by the computer may be a program in which processes are performed in a time-series fashion in the order as described in this specification, or may be a program in which processes are performed at necessary timing such as when invoked.

Also, embodiments of the present invention are not limited to the above-described embodiments, and various modifications are possible without departing from the scope of the present invention.

EXPLANATION OF REFERENCE NUMERALS

11 image processing apparatus, 31 salient region extracting section, 32 scene discriminating section, 33 composition pattern setting section, 34 composition analyzing section, 34a composition model creating section, 34b safety model creating section, 34c penalty model creating section, 34d objective function creating section, 34e optimization section, 35 image cropping section, 51 saliency calculating section, 52 salient-rectangular-region determining section, 53 face-rectangular-region determining section, 111 image processing apparatus, 131 composition pattern setting section, 211 image processing apparatus, 231 composition analyzing section, 231a composition model creating section, 231b safety model creating section, 231c penalty model creating section, 231d objective function creating section, 231e optimization section, 232 display section, 233 operation input section, 311 image processing apparatus, 331 panorama discriminating section, 332 composition analyzing section, 332a composition model creating section, 332b safety model creating section, 332c penalty model creating section, 332d objective function creating section, 332e optimization section, 631 adding section, 711 image capturing apparatus, 811 image processing apparatus, 831 orientation detecting section, 832 composition analyzing section, 832e optimization section, 861 image processing apparatus, 881 frame buffer, 882 GMV calculating section, 883 LMV calculating section, 884 motion direction determining section, 885 composition analyzing section, 885e optimization section

The invention claimed is:

1. An image processing apparatus comprising:
   a composition setting section configured to set a composition pattern corresponding to an input image, on the basis of the number of regions to which attention is directed in the input image, and a scene category of the input image, wherein the input image is classified into one of a predetermined scene categories; and
   a crop region determining section configured to determine at least one of a plurality of crop regions in the input image which is optimal for an image to be cropped in the composition pattern from the input image, on the basis of the composition pattern.

2. The image processing apparatus according to claim 1, further comprising a crop region selecting section configured to select a crop region from the plurality of crop regions.

3. The image processing apparatus according to claim 2, further comprising a cropping section configured to crop the selected crop region from the input age.

4. The image processing apparatus according to claim 2, wherein the crop region selecting section is configured to select the crop region so that a center position of a smallest rectangular region including all of the regions to which attention is directed in the input image approaches a center of the selected crop region in the input image.

5. The image processing apparatus according to claim 4, wherein the crop region selecting section is configured to select the crop region so that the crop region becomes larger, and that a common region between the smallest rectangular region and the selected crop region becomes larger.

6. The image processing apparatus according to claim 2, wherein the crop region selecting section is configured to select the crop region so that the selected crop region does not lie off the input image.

7. The image processing apparatus according to claim 2, further comprising:
   a panorama determining section configured to determine whether or not the input image is a panoramic image, by comparing an aspect ratio of the input image with a predetermined threshold, and
   wherein the crop region selecting section selects the crop region from the plurality of crop regions on the basis of the composition pattern, in case the input image is determined as a panoramic image.

8. The image processing apparatus according to claim 2, further comprising:
   an information adding section configured to add information indicating the crop region selected by the crop region selecting section, to the input image as EXIF information.

9. The image processing apparatus according to claim 1, further comprising:
   a region extracting section configured to extract each of the regions to which attention is directed in the input image; and
   a scene classifying section configured to classify the input image into one of the predetermined scene categories.

10. The image processing apparatus according to claim 1, further comprising a user interface for selecting a composition pattern by a user.

11. The image processing apparatus according to claim 1, further comprising:
    a scene classifying section configured to classify the input image into one of the predetermined scene categories based on a feature quantity obtained from a frequency conversion on the input image.

12. The image processing apparatus according to claim 1, further comprising a user interface for selecting a crop region among the plurality of crop regions provided as candidates of crop region.

13. An image processing method comprising:
    setting a composition pattern corresponding to an input image, on the basis of the number of regions to which attention is directed in the input image, and a scene category of the input image, wherein the input image is classified into one of a predetermined scene categories; and
    determining a plurality of crop regions in the input image which is optimal for an image to be cropped in the composition pattern from the input image, on the basis of the composition pattern.

14. The image processing method according to claim 13, further comprising selecting a crop region from the plurality of crop regions.

15. The image processing method according to claim 14, further comprising cropping the selected crop region from the input image.

16. The image processing method according to claim 14, further comprising:
- determining whether or not the input image is a panoramic image, by comparing an aspect ratio of the input image with a predetermined threshold, and
- selecting the crop region comprises selecting the crop region on the basis of the composition pattern, if it is judged that the input image is a panoramic image.

17. The image processing method according to claim 14, further comprising:
- adding information indicating the selected crop region to the input image as EXIF information.

18. The image processing method according to claim 13, further comprising:
- extracting each of the regions to which attention is directed in the input image; and
- classifying the input image into one of the predetermined scene categories.

19. The image processing method according to claim 13, further comprising selecting the crop region so that a center position of a smallest rectangular region including all of the regions to which attention is directed in the input image approaches a center of the selected crop region in the input image.

20. The image processing method according to claim 19, further comprising selecting the crop region so that the selected crop region becomes larger, and a common region between the smallest rectangular region and the selected crop region becomes larger.

21. The image processing method according to claim 13, further comprising selecting the crop region so that the selected crop region does not lie off the input image.

22. The image processing method according to claim 13, further comprising providing a user interface for selecting a composition pattern by a user.

23. The image processing method according to claim 13, further comprising:
- classifying the input image into one of the predetermined scene categories based on a feature quantity obtained from a frequency conversion on the input image.

* * * * *